(12) United States Patent
Kinzenbaw et al.

(10) Patent No.: US 11,122,733 B2
(45) Date of Patent: Sep. 21, 2021

(54) MULTIPLE AGRICULTURAL PRODUCT APPLICATION METHOD AND SYSTEMS

(71) Applicant: Kinze Manufacturing, Inc., Williamsburg, IA (US)

(72) Inventors: Jon E. Kinzenbaw, Williamsburg, IA (US); Merlan J. Rolffs, Pella, IA (US); Matthew J. Wilhelmi, Parnell, IA (US); Dustan Hahn, Tampa, FL (US); Derrick Becker, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 233 days.

(21) Appl. No.: 16/274,824

(22) Filed: Feb. 13, 2019

(65) Prior Publication Data
US 2019/0174670 A1    Jun. 13, 2019

Related U.S. Application Data

(63) Continuation of application No. 15/466,960, filed on Mar. 23, 2017, now Pat. No. 10,257,975, which is a
(Continued)

(51) Int. Cl.
*A01C 21/00* (2006.01)
*A01C 7/04* (2006.01)
(Continued)

(52) U.S. Cl.
CPC .......... *A01C 21/005* (2013.01); *A01C 7/044* (2013.01); *A01C 7/046* (2013.01); *A01C 7/102* (2013.01);
(Continued)

(58) Field of Classification Search
CPC ....... A01C 21/005; A01C 7/046; A01C 7/102; A01C 7/16; A01C 7/044; A01C 7/20;
(Continued)

(56) References Cited

U.S. PATENT DOCUMENTS

| 4,592,484 A | 6/1986 | Pregermain |
| 4,779,765 A | 10/1988 | Neumeyer |

(Continued)

FOREIGN PATENT DOCUMENTS

| EP | 0100723 | 2/1984 |
| EP | 2480063 B1 | 4/2014 |

OTHER PUBLICATIONS

Kinze Manufacturing, Inc., PCT/US2014/054284, "Notification of Transmittal of The International Search Report and The Written Opinion of the International Searching Authority, or the Declaration" dated Dec. 18, 2014.

*Primary Examiner* — Christopher J. Novosad
(74) *Attorney, Agent, or Firm* — McKee, Voorhees & Sease, PLC

(57) ABSTRACT

A planter includes a plurality of row units. The row units include metering systems, which can include multiple seed meters at a particular row unit, as well as a queuing system. The metering systems including more than one seed meters are configured such that the seed meters will plant a different seed types or varieties. The operation of one or more of the seed meters at a time will provide for the planting of a particular seed variety. The invention provides for on-the-go changing of a seed being planted by changing the operation of one or more of the seed meters at each of the row units and provides for almost infinite variation among the row units for planting particular seed varieties or not planting at all.

18 Claims, 77 Drawing Sheets

Related U.S. Application Data continuation of application No. 14/478,249, filed on Sep. 5, 2014, now Pat. No. 9,629,305.

(60) Provisional application No. 61/874,113, filed on Sep. 5, 2013, provisional application No. 61/938,010, filed on Feb. 10, 2014, provisional application No. 61/975,047, filed on Apr. 4, 2014.

(51) Int. Cl.
*A01C 7/10* (2006.01)
*A01C 7/20* (2006.01)
*A01C 19/02* (2006.01)
*A01C 7/16* (2006.01)

(52) U.S. Cl.
CPC ................. *A01C 7/16* (2013.01); *A01C 7/20* (2013.01); *A01C 7/206* (2013.01); *A01C 19/02* (2013.01)

(58) Field of Classification Search
CPC ......... A01C 7/206; A01C 19/02; A01C 19/00; A01C 21/00; A01C 7/042; A01C 7/04; A01C 7/00; A01C 7/10; A01C 7/08
See application file for complete search history.

(56) References Cited

U.S. PATENT DOCUMENTS

| | | |
|---|---|---|
| 5,170,730 A | 12/1992 | Swallow |
| 5,913,915 A | 6/1999 | McQuinn |
| 5,915,313 A | 6/1999 | Bender et al. |
| 6,070,539 A | 6/2000 | Flamme et al. |
| 6,122,581 A | 9/2000 | McQuinn |
| 6,142,086 A | 11/2000 | Richard |
| 6,193,175 B1 | 2/2001 | Andersson et al. |
| 6,198,986 B1 | 3/2001 | McQuinn |
| 6,516,733 B1 | 2/2003 | Sauder et al. |
| 6,527,205 B2 | 3/2003 | Andersson et al. |
| 6,626,120 B2 | 9/2003 | Bogner et al. |
| 6,748,885 B2 | 6/2004 | Sauder |
| 6,834,600 B1 | 12/2004 | Clewell et al. |
| 6,845,724 B2 | 1/2005 | Mayerle et al. |
| 7,021,224 B2 | 4/2006 | Mayerle et al. |
| 7,140,310 B2 | 11/2006 | Mayerle et al. |
| 7,347,149 B2 | 3/2008 | Mayerle et al. |
| 7,353,760 B2 | 4/2008 | Mayerle et al. |
| 7,380,733 B2 | 6/2008 | Owenby et al. |
| 7,418,908 B2 | 9/2008 | Landphair et al. |
| 7,467,698 B2 | 12/2008 | Dillman |
| 7,497,176 B2 | 3/2009 | Dillman |
| 7,555,990 B2 | 7/2009 | Beaujot |
| 7,565,871 B2 | 7/2009 | Audette |
| 7,647,875 B2 | 1/2010 | Landphair et al. |
| 7,673,572 B2 | 3/2010 | Deppermann et al. |
| 7,690,440 B2 | 4/2010 | Dean et al. |
| 7,925,404 B2 | 4/2011 | Dillman |
| 7,938,075 B1 | 5/2011 | Glendenning et al. |
| 7,980,187 B2 | 7/2011 | Audette |
| 8,141,504 B2 | 3/2012 | Dean et al. |
| 8,145,396 B2 | 3/2012 | Dillman |
| 8,151,719 B2 | 4/2012 | Audette |
| 8,275,526 B2 | 9/2012 | Dillman |
| 8,371,238 B2 | 2/2013 | Dean et al. |
| 8,375,873 B2 | 2/2013 | Nelson et al. |
| 8,375,874 B2 | 2/2013 | Peterson et al. |
| 8,434,416 B2 | 5/2013 | Kowalchuk et al. |
| 8,522,700 B2 | 9/2013 | Landphair |
| 8,601,962 B2 | 12/2013 | Kowalchuk et al. |
| 8,671,857 B2 | 3/2014 | Kowalchuk et al. |
| 8,733,257 B2 | 5/2014 | Beaujot et al. |
| 8,942,894 B2 | 1/2015 | Garner et al. |
| 8,948,980 B2 | 2/2015 | Garner et al. |
| 9,096,264 B2 | 8/2015 | Connors et al. |
| 9,179,594 B2 | 11/2015 | Graham |
| 9,351,441 B2 | 5/2016 | Kowalchuk et al. |
| 9,622,402 B2 | 4/2017 | Kinzenbaw |
| 9,629,305 B2 | 4/2017 | Kinzenbaw et al. |
| 9,750,178 B2 | 9/2017 | Kinzenbaw et al. |
| 9,763,380 B2 | 9/2017 | Hahn et al. |
| 9,901,026 B2 | 2/2018 | Kinzenbaw et al. |
| 10,206,327 B2 * | 2/2019 | Hahn .................... A01C 7/046 |
| 10,225,977 B2 * | 3/2019 | Kinzenbaw .......... A01C 21/005 |
| 10,244,674 B2 * | 4/2019 | Kinzenbaw ............ A01C 7/206 |
| 10,257,975 B2 * | 4/2019 | Kinzenbaw .............. A01C 7/16 |
| 10,667,462 B2 * | 6/2020 | Kinzenbaw ............ A01C 7/206 |
| 2008/0047475 A1 | 2/2008 | Stehling et al. |

\* cited by examiner

MULTIPLE AGRICULTURAL PRODUCT APPLICATION METHOD AND SYSTEMS

CROSS REFERENCE TO RELATED APPLICATIONS

This application is a Continuation Application of U.S. Ser. No. 15/466,960, filed on Mar. 23, 2017. U.S. Ser. No. 15/466,960 is a Continuation Application of U.S. Ser. No. 14/478,249, filed on Sep. 5, 2014 (now U.S. Pat. No. 9,629,305, issued Apr. 25, 2017), and claims priority under 35 U.S.C. § 119 to provisional application U.S. Ser. No. 61/874,113, filed Sep. 5, 2013, provisional application U.S. Ser. No. 61/938,010, filed Feb. 10, 2014, and provisional application U.S. Ser. No. 61/975,047, filed Apr. 4, 2014. Each of these patent applications are herein incorporated by reference in their entirety.

FIELD OF THE INVENTION

The present invention relates generally to the application of agricultural products by use of agricultural implements. More particularly, but not exclusively, the invention relates to methods, systems, and apparatuses for applying at least one of two or more agricultural products to a field by use of an agricultural implement based upon a characteristic of the field. The invention can also be used to dispense refuge or pollen donation in preselected locations throughout a field.

BACKGROUND OF THE INVENTION

An agricultural row crop planter is a machine built for precisely distributing seed into the ground. The row crop planter generally includes a horizontal toolbar fixed to a hitch assembly for towing behind a tractor or other implement. Row units are mounted to the toolbar. In different configurations, seed may be stored at individual hoppers on each row unit, or it may be maintained in a central hopper and delivered to the row units on an as needed basis. The row units include ground-working tools for opening and closing a seed furrow, and a seed metering system for distributing seed to the seed furrow.

In its most basic form, the seed meter includes a housing, a seed disk, and a seed chute. The housing is constructed such that it creates a reservoir to hold a seed pool. The seed disk resides within the housing and rotates about a generally horizontal central axis. As the seed disk rotates, it passes through the seed pool where it picks up individual seeds. The seeds are subsequently dispensed into the seed chute where they drop into the seed furrow.

There have been many ways in which the seed planting process has been adapted in order to increase the amount of yield per acre. For example, instead of treating an entire farm as the same throughout and planting a single type of seed or seed hybrid, there has been a push for planting multiple types of seed to account for differences in soil characteristics, such as moisture content and nutrient level, as well as climate variances. The seed hybrid is selected to provide for the highest yield according to the different conditions throughout the farms. In addition, the hybrids may be configured to treat pest resistance to certain traits found in some, but not all, hybrids.

Therefore, there is a need in the art for an agricultural planter that allows for a user to plant different seed hybrids or varieties in locations of a field based upon known field characteristics in an on-the-go manner. There is also a need in the art for a planter to allow for a larger number of seed varieties to be planted based upon the field characteristics and with a more accurate location than has been heretofore accomplished.

SUMMARY OF THE INVENTION

Thus, it is a principle object, feature, and/or advantage of the present invention to overcome deficiencies in the art.

It is another object, feature, and/or advantage of the present invention to provide an agricultural implement that allows the planting of a plurality of seed varieties to be accurately planted at field locations based upon known field characteristics.

It is yet another object, feature, and/or advantage of the present invention to provide an agricultural implement for planting a field that provides for on-the-go selection and planting of a number of seed hybrids or varieties.

It is still another object, feature, and/or advantage of the present invention to provide an agricultural implement that includes a system that allows for planting different seed varieties or hybrids within seconds and/or feet of travel.

It is a further object, feature, and/or advantage of the present invention to provide systems to provide different seed varieties or hybrids to the seed meters at each row unit.

It is yet a further object, feature, and/or advantage of the present invention to provide a seed delivery system for an agricultural system that automatically provides at least one of a variety of seed to a row unit based upon the location of the row unit in a field.

These and/or other objects, features, and advantages of the present invention will be apparent to those skilled in the art. The present invention is not to be limited to or by these objects, features and advantages. No single embodiment need provide each and every object, feature, or advantage.

Accordingly, the present invention provides for various apparatuses, systems, means, and methods for planting one or a combination of a plurality of seed hybrid varieties and/or hybrids in different locations of a field. For example, a field may include locations with variations of soil characteristics, weather conditions, etc. Such characteristics may include soil moisture content, amount of sunshine, wind, or rain, soil fertility, CEC, PH, likelihoods of water retention or flooding, etc. The varying soil characteristics can affect the overall yield of a crop. Seed hybrids have been developed which account for different growing conditions in order to provide the highest possible yield based upon the different conditions and/or characteristics. However, this may not be the same throughout the field. The present invention provides methods and means for providing on-the-go changing of seed varieties and/or hybrids to provide for the highest possible yield per acre in a field having various characteristics and/or soil conditions. The on-the-go changing of seed type, variety, and/or hybrid will allow for up-to-date planting of the various seed varieties as the conditions change based upon location in the field.

Therefore, the invention provides a location based determination of a type of seed variety and/or hybrid for planting in a field. The location may be determined using a positioning system, such as known GPS technology. A field can be mapped based upon known characteristics, such as historical data. For example, the field may be mapped according to historical data to include the soil nutrient content, amount of rain, amount of sunshine, and other factors to determine the growing conditions for the varying locations of the field. When a tractor and planter are moving through a field, the location determination will provide for updated data for determining the proper seed, variety and/or hybrid to plant at the updated locations in the field. The positioning system will communicate to a seed delivery system, seed source, one of multiple seed meters, or other system to indicate which of the plurality of available seed hybrids is to be planted at the current location of the planter in the field. The location, and thus type of seed to be planted, will be continually updated by the positioning system while the implement moves through the field. This on-the-go updating of the planting parameters will allow a farmer to continue planting in a normal manner, while ensuring that the seed hybrid appropriate for the field conditions will be planted.

The positioning system can be operatively connected to a seed delivery system, such as a bulk fill system, air seed delivery system, individual hopper system, or some combination thereof. The positioning and seed delivery systems can provide the different types of seed hybrids to one or more seed meters, wherein the seed meter delivers the seed to the ground. Various exemplary aspects of the present invention provide for different ways of delivering one or more of the various seed hybrids from the bulk fill or individual hoppers to the one or more seed meters. In addition, the present invention includes that the systems, methods, and means of the invention provide for automatic, on-the-go selection of one or more of the various types of seed hybrids to the one or more seed meters for planting the different seed varieties as needed. For example, the present invention contemplates that one or more seed varieties may be planted within seconds and/or feet of a different seed variety and/or hybrid while the tractor and planter are moving through a field. Thus, the planting of the different hybrids and/or refuge may be accomplished near instantaneously. As the soil characteristics and conditions change, the selected seed hybrid having growing conditions ideal for the soil condition and/or characteristic can be planted, while ensuring that the seed variety can be changed as the soil conditions and/or characteristics change.

Therefore, according to a method of the present invention, an implement is provided along with a tractor. The implement may be a planting implement (planter) and the tractor connects to the planting implement for moving through a field. The tractor and/or planter include or are connected to a positioning system. The positioning system provides up-to-date location in the field, and may be a GPS or other type of positioning system. The agricultural implement includes a plurality of row units, each having a metering system, and at least one product storage unit operatively attached to the row units. At least one agricultural product is applied (planted) to the field as the implement moves through the field being pulled by the tractor. The positioning system determines and updates the location of the implement in the field. Based upon the said updated location of the implement in the field, the system selects one or more of the plurality of agricultural products to be applied to the field based upon a characteristic of the location of the field.

For example, the characteristic may be characteristics of the soil and/or climate at the particular location of the implement in the field, which can be based upon historical data. The one or more agricultural products may be selected and moved from the at least one product storage unit to the row units based upon the location of the field and can include a seed delivery system.

Figure 1:
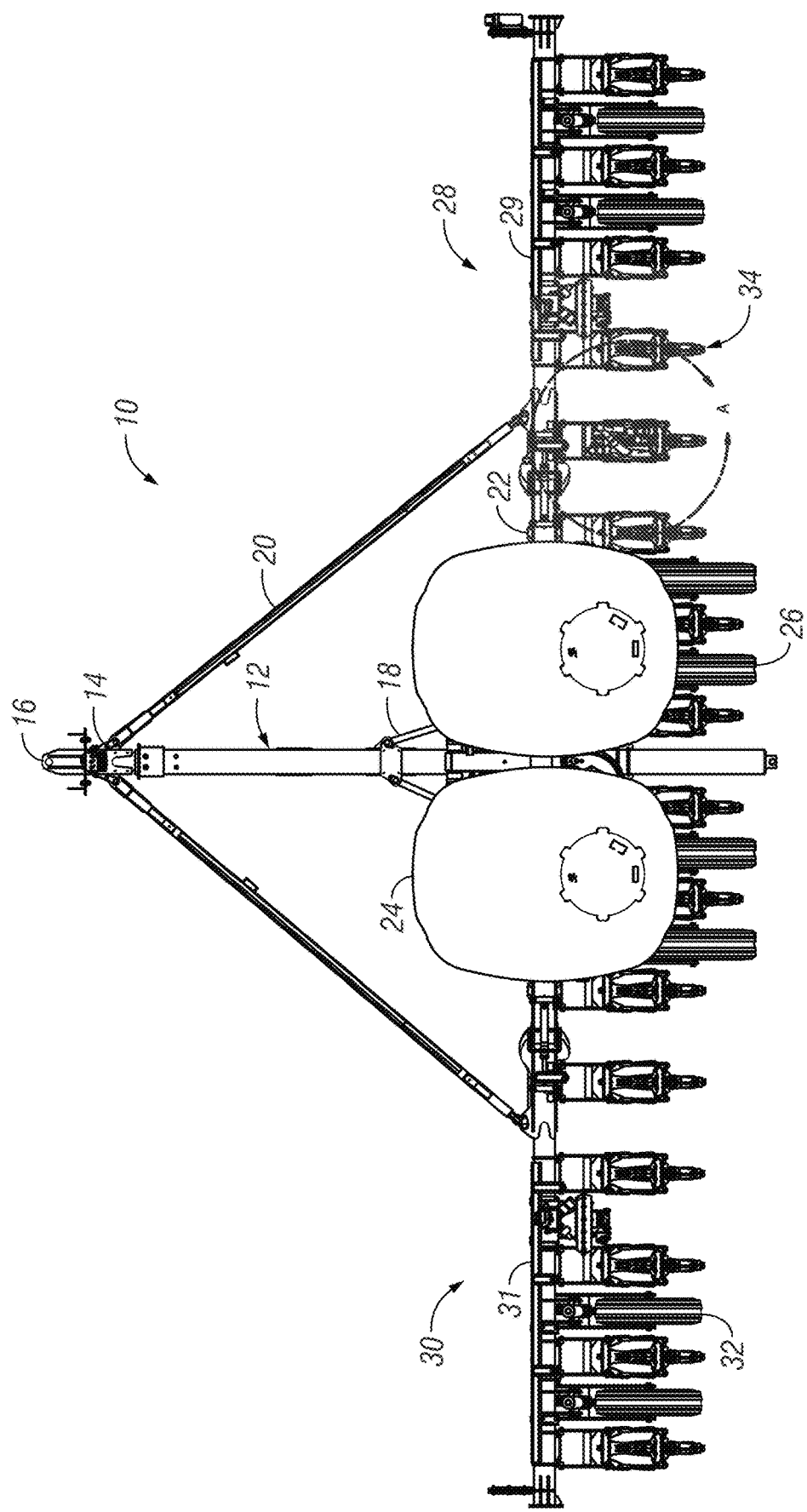
FIG. 1 is a top view of a planting implement.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

FIG. 1 is a top view of an agricultural planter 10. An example of a planter that may be utilized with the various aspects of the invention is further shown and described in U.S. patent application Ser. No. 13/927,177, which is hereby incorporated in its entirety. The planter 10 of FIG. 1 includes a tongue 12, which may be a telescoping tongue such that the planter is a front or rear folding planter. However, the exact nature of the planter is not to be limiting to the invention. The tongue 12 includes a first end 14 in an opposite second end. The first end 14 includes a hitch 16 for connecting the planter 10 to a tractor (not shown) or other vehicle for pulling the planter 10 through a field and for transporting the planter to different locations. The planter 10 shown in FIG. 1 is a front folding planter with telescoping tongue 12 and a pair of draft links 20 extending between a first wing 28 and the tongue 12, as well as from the second wing 30 to the tongue 12. The draft links 20 connect the wings to the tongue such that when the wings fold towards one another by operation of cylinders 18, the draft links 20 will extend the telescoping tongue 12 to lengthen the tongue so that the wing sections 28, 30 are able to be folded generally adjacent one another.

Opposite the hitch 16 of the tongue 12 is a main or central frame 22. The main frame 22 extends generally perpendicular to the tongue 12. The frame 22, which also may be known as a toolbar, can include a housing or support for a plurality of central tanks or hoppers 24. The hoppers 24, which may also be known as bulk fill hoppers, house material, such as seed, insecticide, fertilizer, or the like, which is distributed through a system to individual row units. For example, the bulk fill hoppers can be operatively connected to an air seed delivery system for delivering seed from the hoppers to seed meters of individual row units along the frame and wings. Such an air seed delivery system is disclosed in U.S. Pat. No. 8,448,585, which is hereby incorporated in its entirety. The central frame or toolbar also includes a plurality of row units extending therefrom for distributing the material to the field.

In other words, the row units plant the seed or otherwise provide the material to the field. A plurality of transport wheels 26 extend from the main frame and are used to transport the planter in and to or from the field. The transport wheels 26 also support the planter.

Extending generally from opposite sides of the main frame is first and second wings 28, 30. The first wing includes a first frame or toolbar 29, while the second wing 30 includes a second frame or toolbar 31. Extending from the frames is a plurality of row units 34. Such row units will be further described with regard to the figures. A plurality of wing wheels 32 are also included and extend from the wings to aid in maneuvering the planter. The number of row units used with the implement may vary depending on the size of the implement, the requirements of a field, the type of material being distributed to the field, and the like. The number of row units of a planter is not to be limiting to the invention, and the invention contemplates any number of row units for use with a planter.

Furthermore, it should be appreciated that, while a plurality of central tanks 24 are shown, any number may be included or else a single tank with multiple sections to separate different types of material may also be included and contemplated by the invention. According to some aspects of the invention, the number of tanks corresponds to the number of different seed types, varieties, and/or hybrids that are to be planted by the planter. Furthermore, it is also contemplated that the individual row units include row unit hoppers to provide the material at the row units themselves. In such a situation, the air seed delivery will not be required for the seed varieties stored in the row unit hoppers and not in the bulk tanks. Again, the number of hoppers at the row units can correspond to the number of different seed types, varieties, and/or hybrids that are to be planted by the planter.

As will be understood, the invention provides numerous methods, systems, assemblies, and the like for providing a planter 10 that is able to plant one of a plurality of seed varieties, types, hybrids, or the like, through a field without having to change the planter or material in the storage. As more information is obtained as to particular types, varieties, and/or hybrids, of seeds being able to plant in different conditions, it may be ideal to plant a particular seed hybrid at a known location in a field based on said conditions. For example, a part of a field that does not receive as much water, such as by rain, may require a seed that is able to grow with less water. However, that same seed may not be ideal for planting at the location in the field that does receive more water. Therefore, for some fields, it may be ideal for two different hybrid or seed types to be planted based upon its known information as to field conditions. Planting seed based upon known field conditions and other information will allow a farmer to obtain the highest yield for their crop, which will provide numerous benefits, advantages, and the like.

The planters and components thereof according to the invention will provide for on-the-go changing of seed hybrids in population. The change in seed hybrid being planted may be conducted within a single seed drop, such that there is substantially no gap or overlap when switching from one seed variety or hybrid to another. Such a planter will allow farmers to maximize yield in every part of their field without having to compromise a particular area based on the conditions. For example, in parts of the field with high productivity soil, a "racehorse" or high yield potential seed variety can be utilized, whereas a "workhorse" type seed variety can be used in less productive areas. In fields with poor drainage, a variety that can handle moisture can be planted in the lower areas, where the more productive variety used in field locations of the higher elevation. The various aspects of the invention will allow for farmers to make such on-the-go changing and will provide the opportunity to achieve the highest possible yield. However, while some aspects of the invention disclose the possibility of switching between two seed types, varieties, and/or hybrids, it should also be appreciated that the inventions are not limited to only two. It is contemplated that any plurality of seed types can be hypothetically planted using the concepts herein disclosed, and the invention is not to be limited to the specific aspects.

Figure 2:
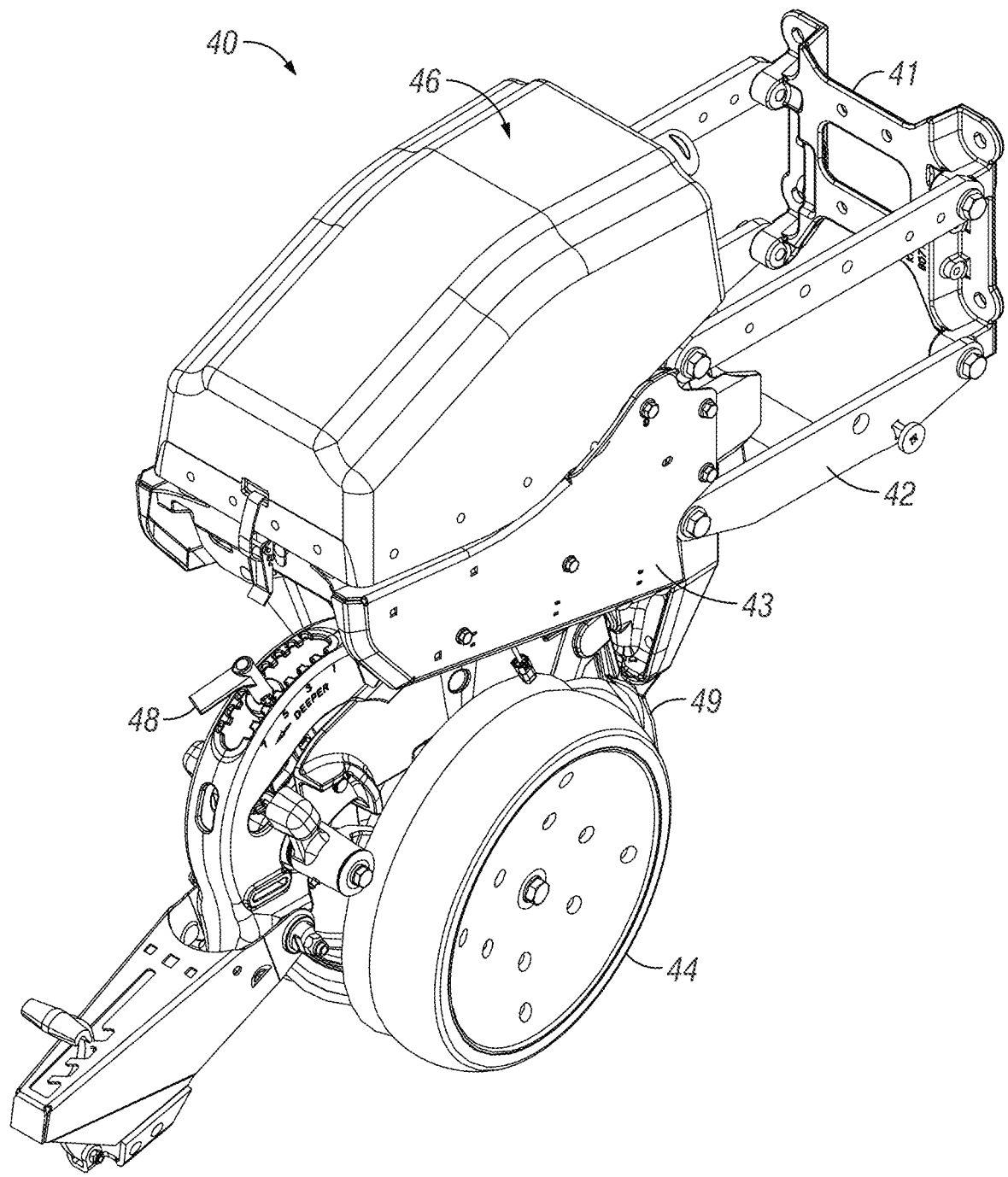
FIG. 2 is a perspective view of a row unit including aspects of the invention.
Figure 3:
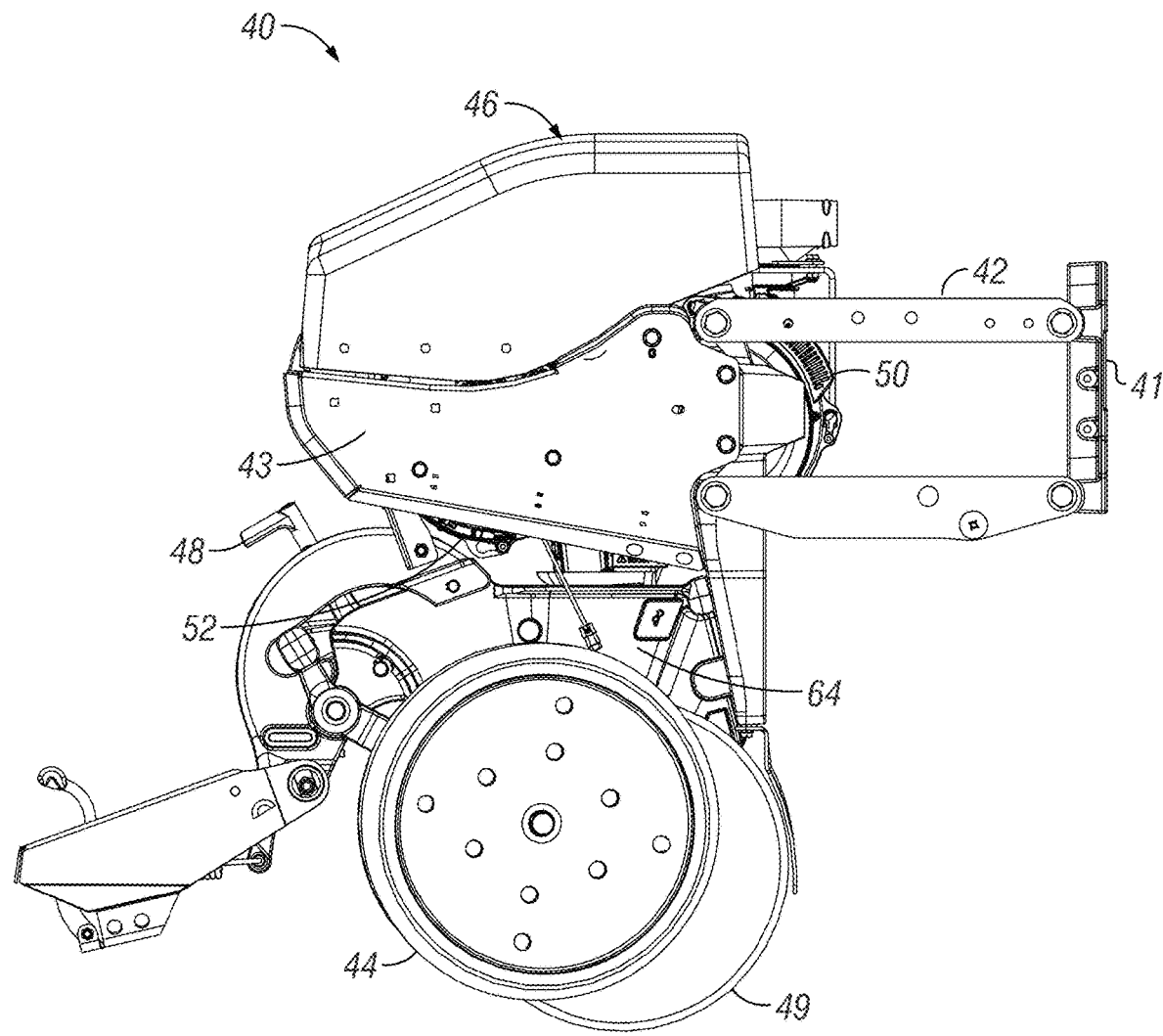
FIG. 3 is side elevation view of the row unit of FIG. 2.
Figure 4:
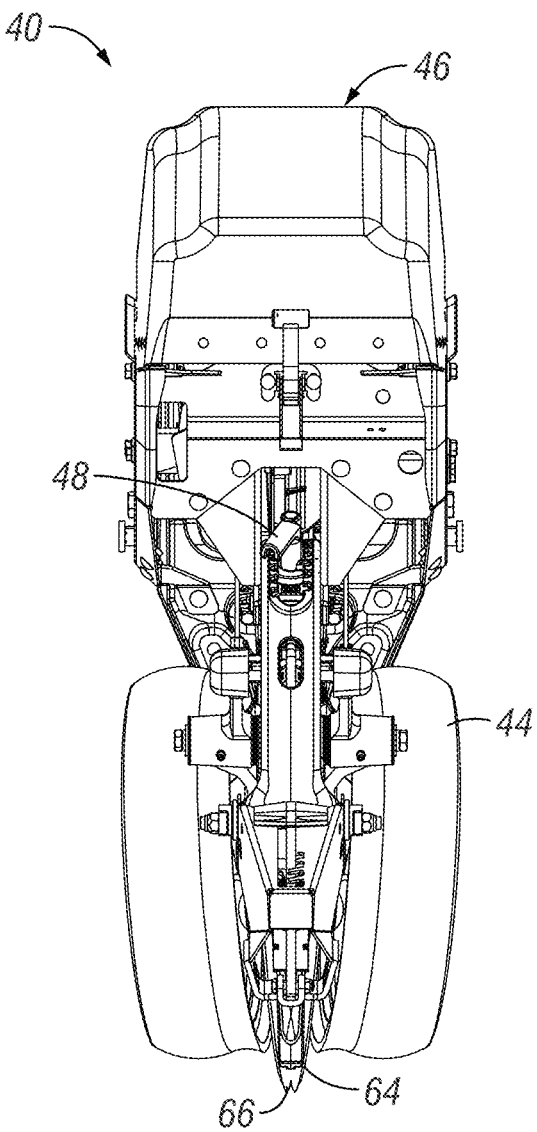
FIG. 4 is a rear view of the row unit of FIG. 2.

FIGS. 2-4 disclose a row unit 40 for use with a planter 10 as shown and described. The row unit 40 can be attached to the planter in known ways. For example, as shown in the figures, a mount 41 is provided for connecting the row unit 40 to a frame or toolbar of a planter. This can be a central toolbar or a wing toolbar. Extending generally from the mount is a linkage system 42, which attaches the row unit to the mount. The linkage 42 also allows for movement of the row unit in a field, and can also include down force members, such as that disclosed in U.S. application Ser. No. 13/457,815, hereby incorporated by reference in its entirety. Additional aspects of a row unit such as that shown and described include a frame 43, gauge wheels 44, a depth adjustment mechanism 48, and opener disks 49. The opener or coulter disks 49 open a furrow in the ground for placing a seed to be planted. The gauge wheels 44 work with the depth adjustment mechanism 48 to set the depth of the furrow being created by the opener disks 49. Thus, the adjustment of the depth adjustment mechanism 48 will manipulate the gauge wheels 44 to change and/or set the depth of the furrow created by the opener wheels 49. A seed metering device is also connected to and positioned at the row unit 40. The metering device is covered in the figures by a seed meter cover 46. The cover 46 aids in protecting the metering device from items that may damage the meter and will enhance the efficiency of the metering system.

The row unit 40 shown in the figures includes a substantially static metering device such as that shown in FIGS. 5-9. As shown in the figures, the metering device includes a first seed meter 50 and a second seed meter 52. The dual seed meter system of the row unit 40 will allow at least two different seed types, varieties, and/or hybrids to be planted at a single row unit 40. As mentioned, this will provide numerous benefits, advantages, and the like for planting. The seed meters 50, 52 can be air seed meters of the kind shown and described in U.S. patent application Ser. No. 13/829,726, which is hereby incorporated in its entirety. However, other types of seed meters, including mechanical, brush, finger, or the like may also be used with the invention. When an air seed meter is used, the seed meter can be either positive or negative pressure such that the seed is attached to the disk within the meter housing as the disk rotates based upon the air pressure differential created by the positive or negative pressure source.

Figure 5:
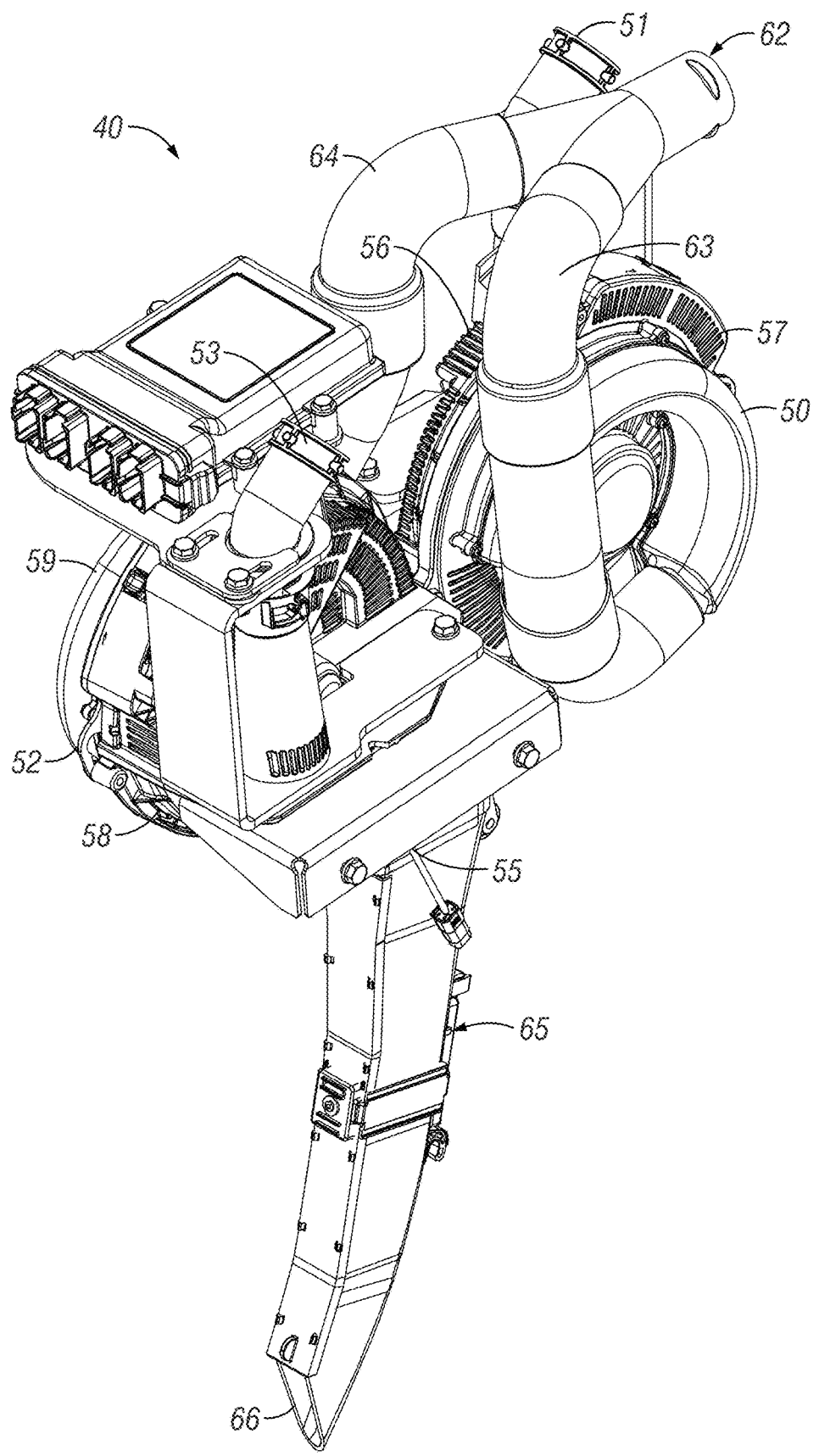
FIG. 5 is a perspective view of showing components of a row unit including aspects of the invention.
Figure 6:
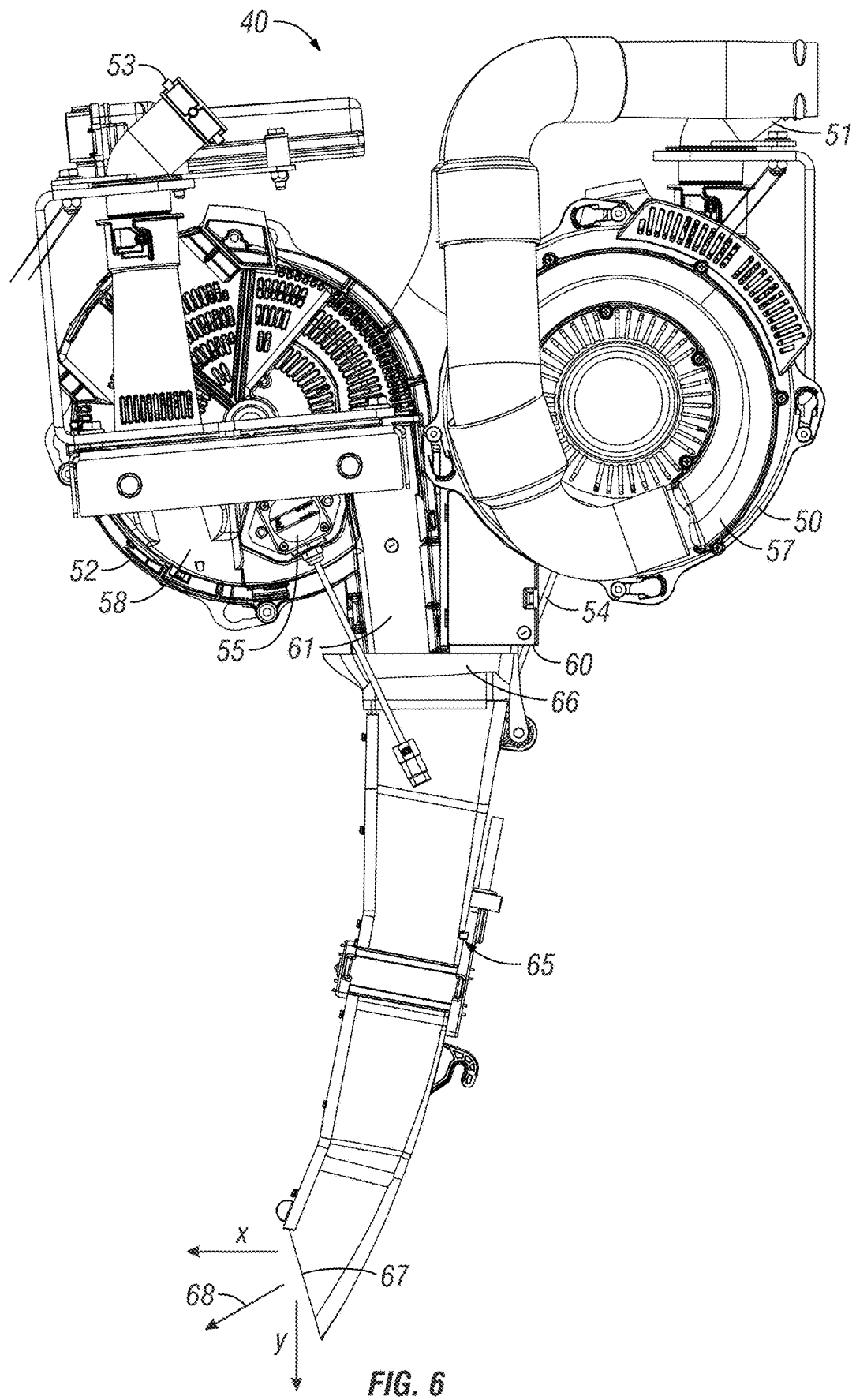
FIG. 6 is a side elevation view of the row unit of FIG. 5.
Figure 7:
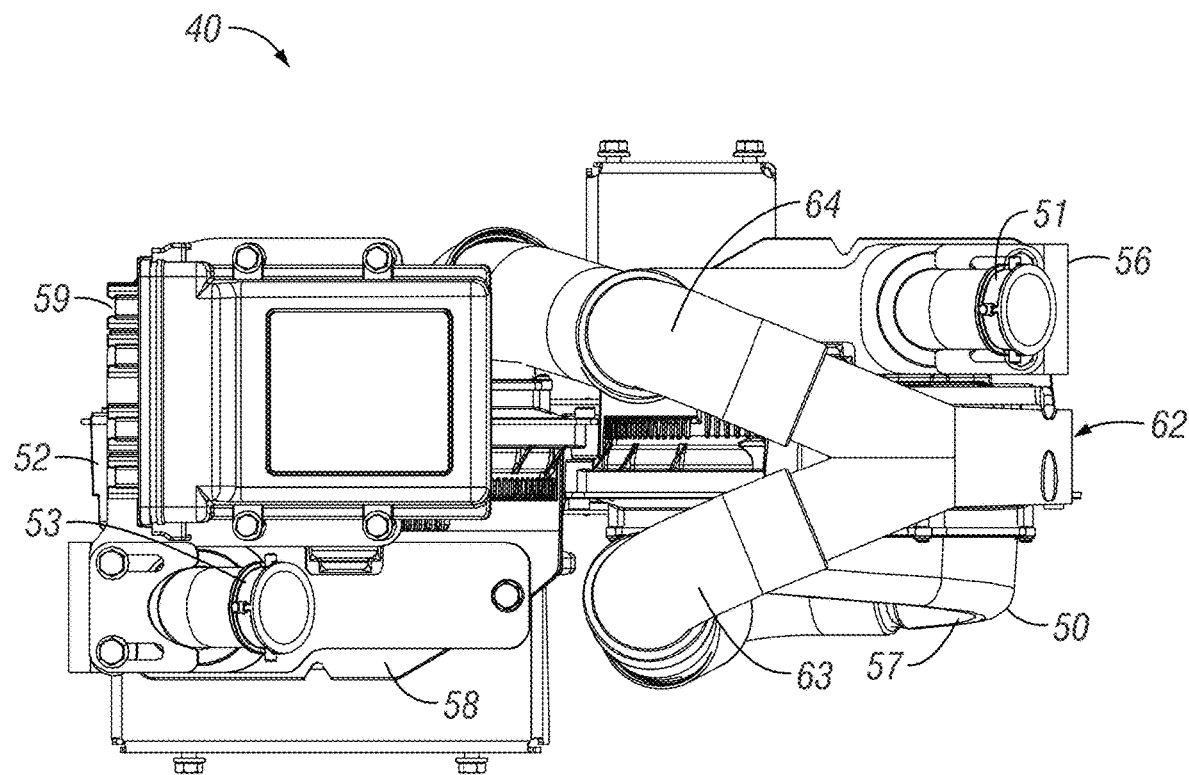
FIG. 7 is a top plan view of the row unit of FIG. 5.
Figure 8:
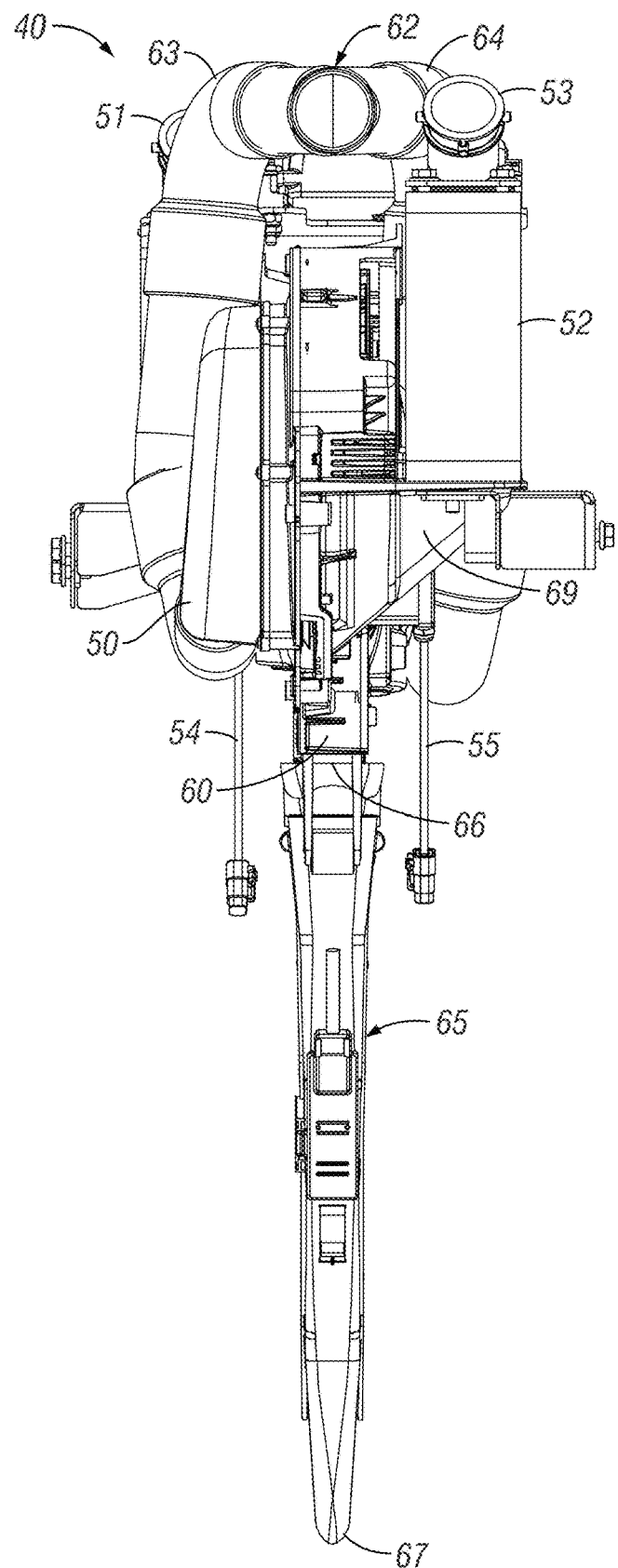
FIG. 8 is a rear view of the row unit of FIG. 5.
Figure 9:
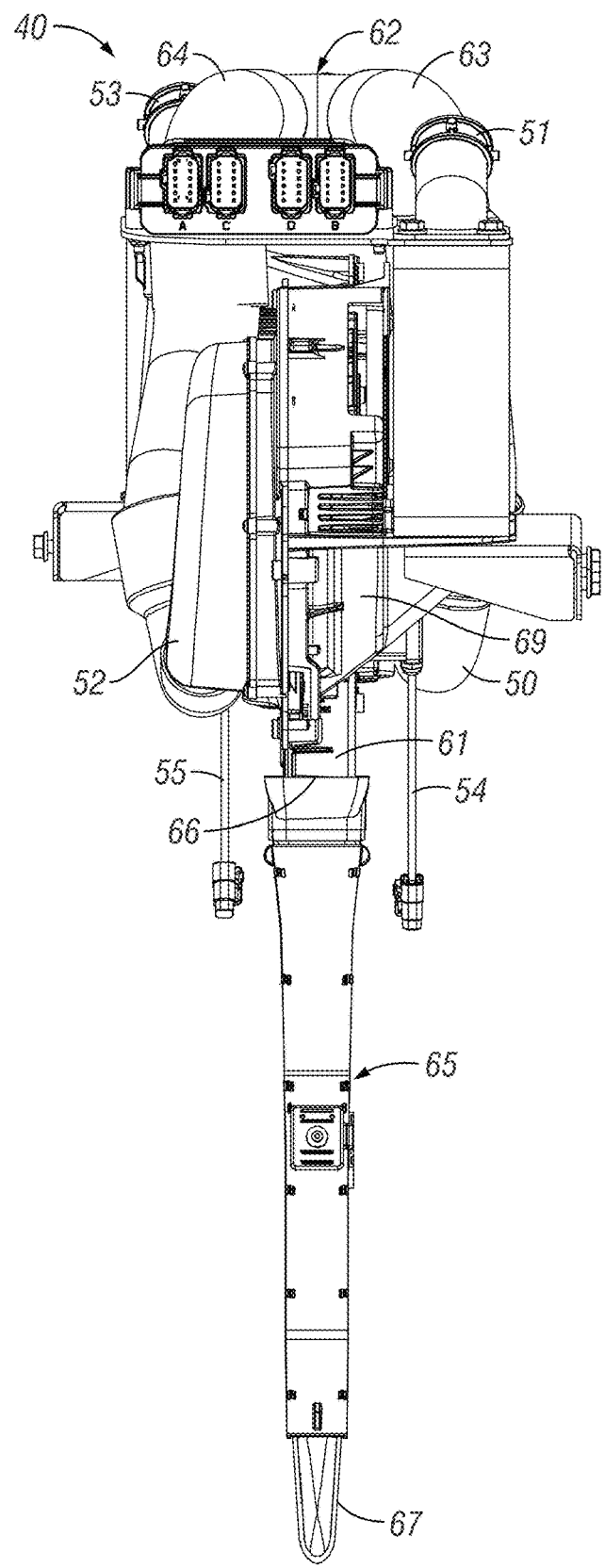
FIG. 9 is a front view of the row unit of FIG. 5.
Figure 10:
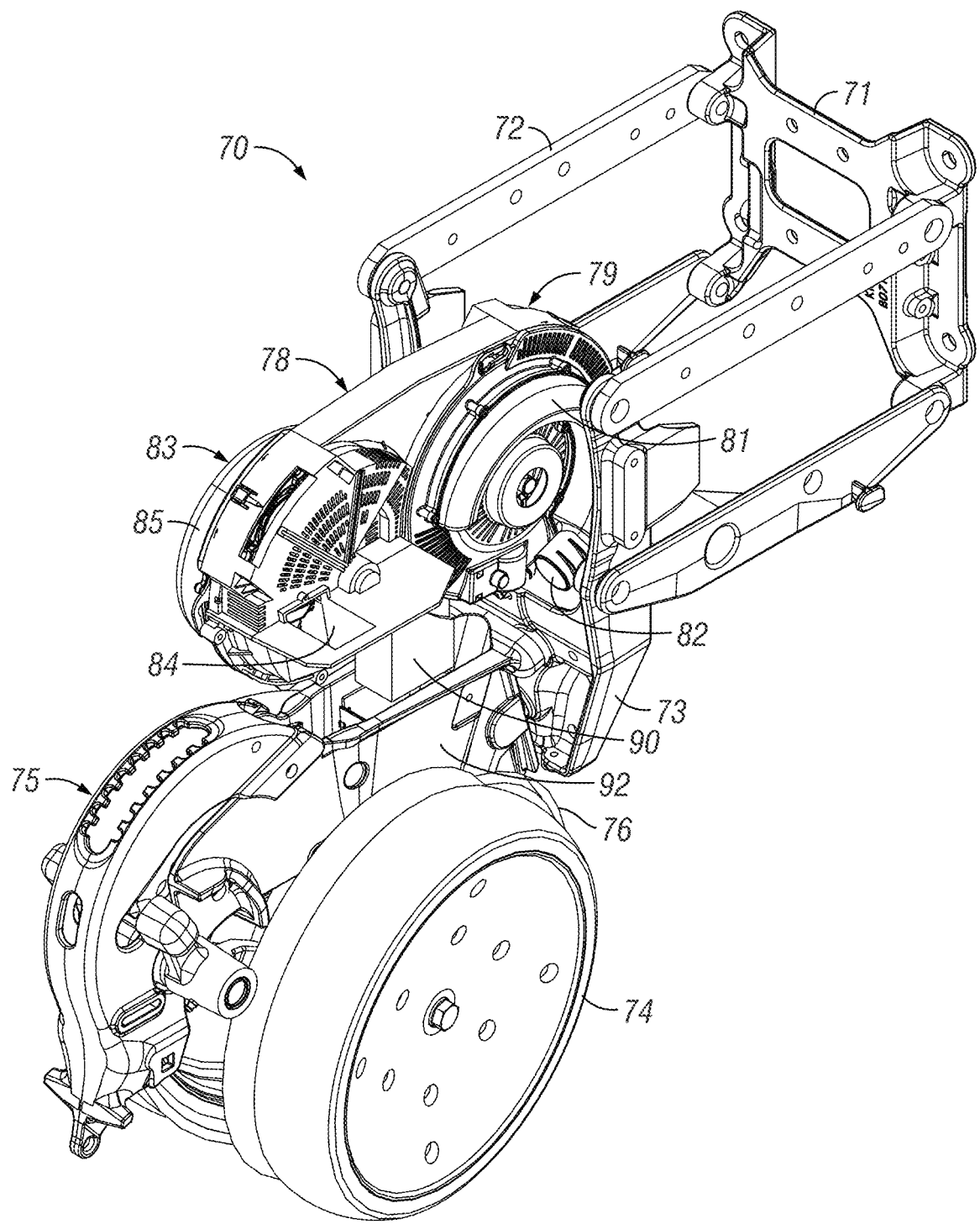
FIG. 10 is a perspective view of another row unit including aspects of the invention.
Figure 11:
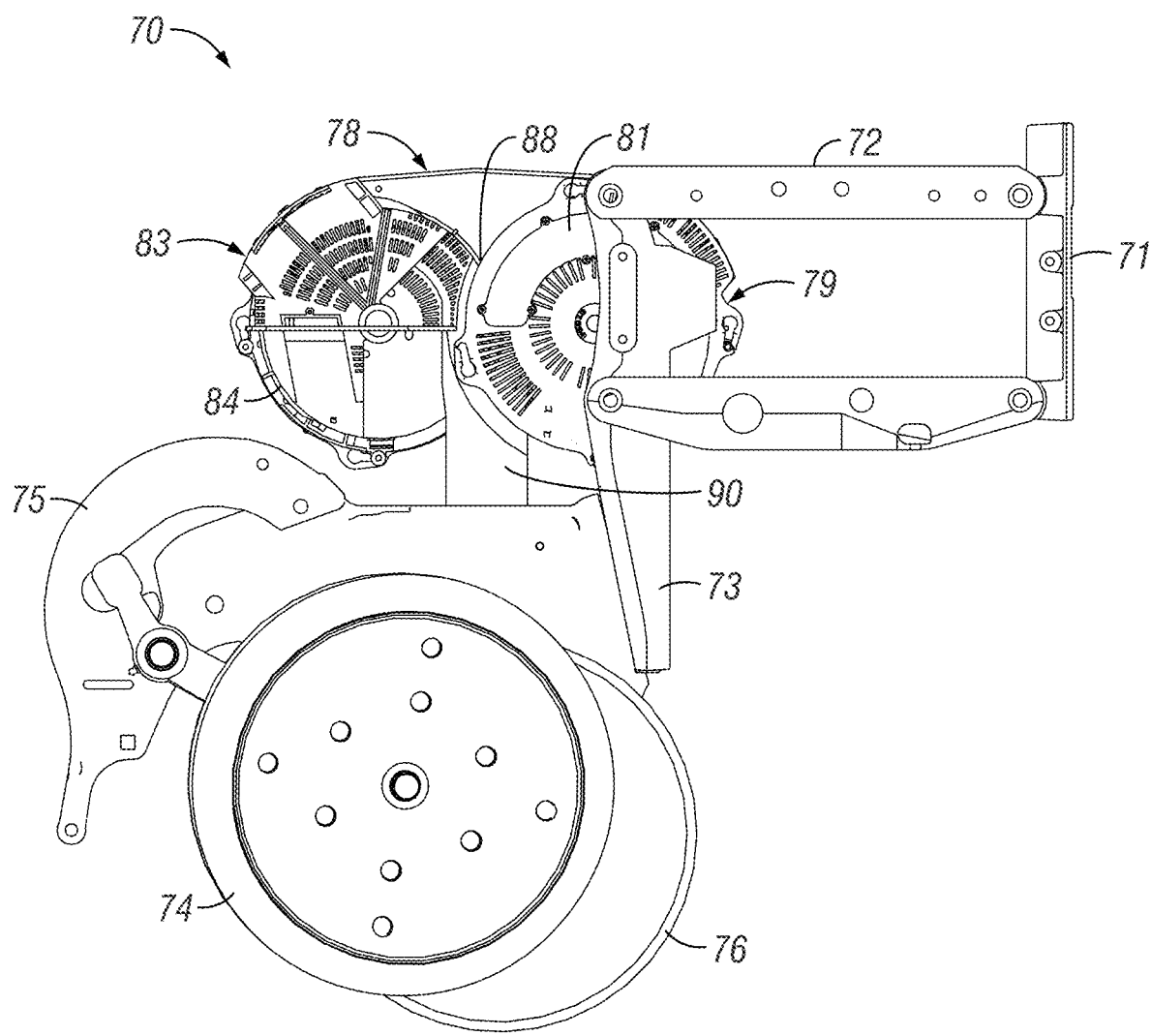
FIG. 11 is a side elevation view of the row unit of FIG. 10.
Figure 12:
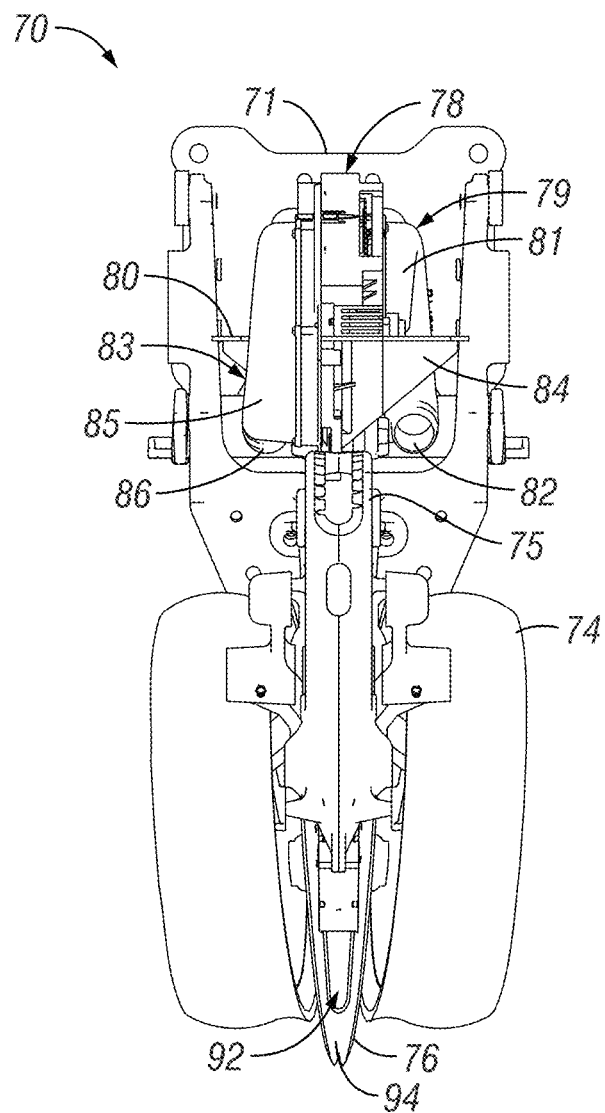
FIG. 12 is a rear view of the row unit of FIG. 10.
Figure 13:
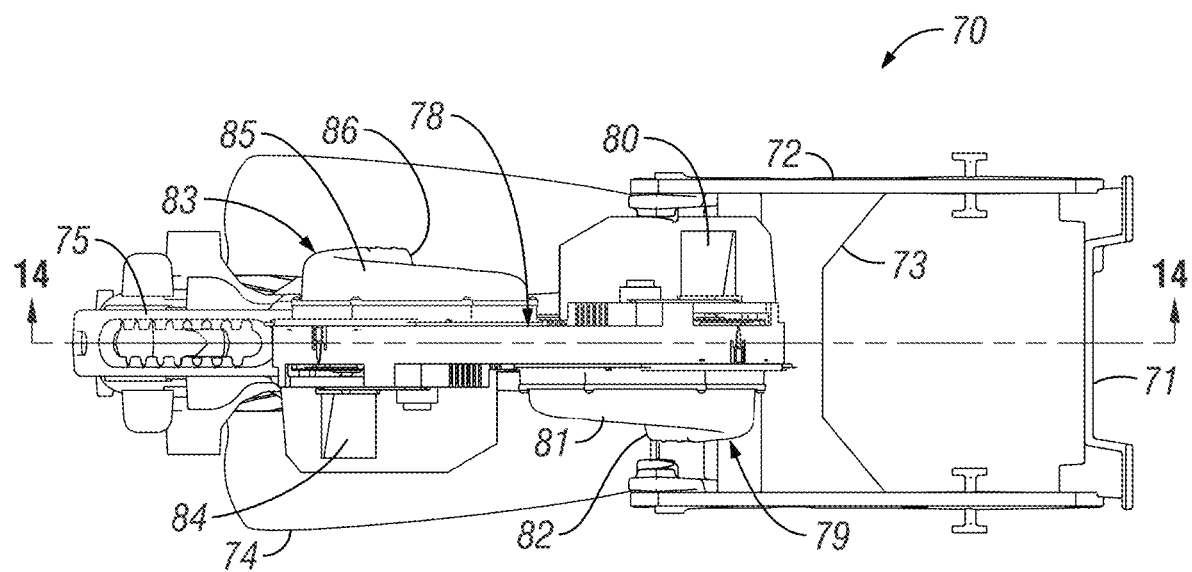
FIG. 13 is a top plan view of the row unit of FIG. 10.

As shown best in FIGS. 5 and 6, the seed meters of the row unit 40 are positioned generally fore and aft of one another and can be referred to as inline multi-hybrid seed meters. For example, the first seed meter 50 is positioned generally in front of the second seed meter 52, as shown in FIG. 7. The alignment of the inline seed meters provides that the row unit will not increase in width due to the addition of a second seed meter at the row unit. The first seed meter 50 includes a seed meter housing comprising a seed side 56 and a vacuum side 57. Seed is added to the seed side 56 of the housing and collects in a seed pool, which may be shown by reference numeral 69 in FIG. 9. The seed pool 69 is adjacent a seed disk (not shown). The seed disk rotates within the housing and includes a plurality of radially spaced seed cells comprising a seed path. An air source, such as a vacuum source, may be attached to the vacuum side 57 or another portion of the seed meter 50 to provide a negative pressure source within the seed housing. As the seed disk rotates within the housing, the negative pressure at the seed cells causes seed of the seed pool to be attached to the rotating disk at the seed cells. The seed is rotated through a singulating device (not shown) that provides a single seed at each seed cell along the seed path. The seed continues along the rotation to an area of no pressure differential where the seed is released from the seed cell and is directed towards an exit 60, which is shown in the figures to be a seed chute. After a seed leaves the chute 60, it is directed by a seed-to-ground mechanism, which is shown in the figures to be a seed tube 65, to the furrow created by the opener disks. Once in the bottom of the furrow, the soil is moved back over the seed to plant the seed in the ground of a field.

As shown in the figures, the first seed meter 50 is oriented such that the seed chute is in the rear of the meter 50 and at least partially over an opening 66 of the seed tube 65.

The second seed meter 52 is oriented in an opposite manner such that a seed chute 61 of the second seed meter 52 is oriented towards the front of the meter and substantially adjacent the first seed chute 60. Therefore, the seed chutes 60, 61 are substantially adjacent one another and both are at least partially positioned over the seed tube entrance 66 such that seed that is metered by either of the seed meters 50, 52 can be directed into and through the seed tube 65 for planting.

The second seed meter 52 also includes a seed side of the housing 58 and a vacuum side 59. It is shown in FIG. 6 that the vacuum side of the first housing 57 is on the same side as the seed side 58 of the housing of the second meter 52. Therefore, the seed meters are oriented generally opposite one another such that the seed chutes 60, 61, can both be positioned at least partially over the seed tube entrance 66. When a particular seed type, variety, and/or hybrid is to be planted by one of the seed meters, the seed meter can be activated and seed can be exited therefrom knowing that seed from either meter will be directed through the seed tube and towards the ground for planting. It is contemplated that both seed meters can be operated at the same time such that when alternating or a different seed is to be planted, the seed can be switched for planting on-the-go as the planter moves through the field, with subsequent seeds being able to be of different types, varieties, and/or hybrids.

To operate the seed meters, a first motor 54 is operatively attached to the first meter 50, and a second motor 55 is operatively attached to the second meter 52. As is disclosed in U.S. patent application Ser. No. 13/829,726, the motors can be connected to an interior of the seed disk to rotate the seed disk in the meter housing. Therefore, having a dedicated motor for each of the first and second meters 50, 52 allows for each of the meters to be independently driven such that they can be activated on the ready to meter the seed associated with each meter to be planted as determined by the location in the field.

Furthermore, as can be understood, each seed meter can be associated with a separate and dedicated seed type, variety, and/or hybrid. The first seed meter 50 includes a meter inlet 51, and the second seed meter 52 includes a seed inlet 53. The inlets 51, 53 are shown to be portions of a hose that can be connected to an air seed delivery system or other seed delivery system. The seed meters can be divided with a seed from separate tanks, such as separate bulk tanks on the planter. When only two types of seed are to be planted in a field, the first seed meter 50 can be dedicated to receive a first seed type or variety, and a second seed meter 52 can be configured to receive and be dedicated for planting a separate seed type or variety. This can be provided by the seed inlets 51, 53 that direct the particular type of seed into the seed pools of the seed meters.

Furthermore, as has been mentioned, the seed meters shown in FIGS. 2-9 are shown to be air seed meters and in particular, vacuum seed meters. To provide the vacuum pressure for each of the meters, a vacuum splitter 62 may be utilized. The splitter 62 is configured to connect to a vacuum source, such as on the planter. A hose can be connected to the inlet of the splitter 62. The splitter 62 branches into first and second hoses 63, 64, which are connected to the respective first and second seed meters to provide the vacuum pressure within the seed meter housings. Thus, the splitter 62 allows for a planter to not have to increase the number of vacuum hoses on the planter, while still providing vacuum pressure for separate seed meters at the single row unit. It is contemplated both that the vacuum pressure to both meters be maintained at all times, or a baffle or other member can be included in the hoses to selectively allow the vacuum pressure to be provided to only one of the seed meters at a time. The invention is not to be limited to either situation.

Additional aspects of the row unit 40 as shown in the figures includes that the motors 54, 55 for the respective first and second seed meters 50, 52 can be adapted and configured with the ground speed of the planter as it moves through the field to adjust or otherwise dictated the seed drop rate, which is a function of planter speed and target population.

As shown in FIG. 6, the seed flow will be directed in a direction as shown by the arrows 68 as it exits the seed tube 65. With some of the aspects of the seed-to-ground systems of the invention, the seed traveling in the direction of the arrow 68 can be manipulated such that it experiences substantially zero relative velocity with the ground. The seed-to-ground systems can manipulate such speed of the seed after it has been metered by one of the plurality of seed meters and en route to the formed furrow, such as by increasing or decreasing the speed of the seed through the seed-to-ground system. As is known, an angular velocity includes an X component and a Y component. The Y component will be substantially equal to the gravity, while the X component will be substantially equal to the ground speed of the planter as it moves through the field. Using these known values, a system can be configured such that the seed exiting in the direction of the arrow 68 from the seed tube 65 can experience relatively zero velocity as it is dropped from the seed tube 65 and is directed towards the bottom of the furrow. This will provide that the seed will experience little to no bounce, roll, or other movement in the furrow such that ideal placement and/or spacing is provided between subsequent and adjacent seeds that are planted.

Having the first and second seed meters 50, 52 with dedicated motors 54, 55 will allow all of the meters of all of the row units to be independently controlled such that the planting can be adjusted as the speed of the planter is changed through a field, and including when a planter turns. The independent control of each of the seed meters at each of the row units allows some or all or the seed meters at some or all of the row units to be turned off when needed, while allowing others to be sped up, slowed down, or maintained. For example, if going over a waterway or other non-planting location, the seed meters of specific row units can be shut off via the motors, such that no seed is planted over said waterway, while on the opposite side of the planter, the row units can continue planting as normal. During a turn, the row units at the interior of the turn can be turned off or slowed down, while the seed meters at the generally exterior or outer radius of the turn can be sped up as needed such that the spacing is maintained for the subsequent seeds. The speed of the meters may also be varied to provide different seed populations based on field conditions, soil characteristics, or other variables which may impact the desired plant density for different areas within a field. In addition to the ideal spacing and independent control, each of the row units including the first and second meters 50, 52 can be planting either the same or different seed types, varieties, and/or hybrids on-the-go, and can continuously change the seed being planted to account for the field conditions at the location of the planter. All this is provided with the row unit 40 as shown and described.

Other changes may also be provided. For example, in some planters, each seed meter 50, 52 of each row unit 40 can include its own hopper that is filled before planting and when empty. Such systems do not utilize a central hopper or air seed delivery or other type of seed delivery, and include dedicated hoppers at the row units themselves. Thus, having dedicated hoppers for each seed meter, with each hopper for each meter including a different hybrid than the other at a particular row unit will allow the same benefits to be obtained. Furthermore, a single hopper with compartments dedicated for different seed types, hybrids, and/or varieties at a particular row unit such that a particular seed is able to be planted by a seed meter is also to be included and contemplated as part of the invention. Still other modifications are also included to be as part of the invention.

It should also be appreciated that, while one row unit 40 is shown in the figures, each of the row units of the planter shown in FIG. 1 can include the row unit 40 having the first and second inline seed meters as shown in the figures, such that each row unit is able to plant a plurality of hybrids, seed types, or seed varieties on-the-go as the planter moves through the field. Furthermore, while two seed meters are shown with a particular row unit, additional meters can be added such that more than two seed meters are positioned at each row unit to be selectively operated to plant one of a plurality of seed varieties. It is also possible to utilize different systems (e.g. utilizing a hopper system for one hybrid and a bulk seed delivery system for a second hybrid) in combination to provide multiple hybrid planting capability.

FIGS. 10-14 show another row unit 70 including aspects of the invention for providing that multiple or a plurality of seed types, varieties, and/or hybrids to be planted at a particular row unit with the seed types changing as the planter moves through the field. Similar to the row unit 40 as shown and described, the row unit 70 includes first and second meters 79, 83 that are substantially inline with one another in a fore and aft manner, and which are substantially static. For example, the seed meters, while capable of some movement, do not move to differentiate alignment with a seed tube or other seed-to-ground delivery system when switching from the use of one meter to the other.

As shown in the figures, the row unit 70 includes many of the similar components as that previously shown and described. For example, the row unit includes a mount 71 for attaching to a planter toolbar and a linkage 72 extending therefrom. The row units also include a frame 73, opening wheels 76, gauge wheels 74, and a depth adjustment mechanism 75. Thus, the row unit can be adjusted and operates as previously disclosed.

However, as shown in FIGS. 10-14, the row unit 70, which is but one of a plurality of row units for use on a planter, such as that shown in FIG. 1, includes a first and second meter 79, 83, with the first meter 79 forward of the second meter 83. However, alternatively to the row unit 40, the seed meters of the row unit 70 include a shared housing member 78. The shared housing 78 provides the seed disk or the seed side of the meter housing for both the first and second seed meters. A vacuum or other air pressure housing side, which is shown as reference numeral 81 for the first seed meter 79, and 85 for the second seed meter 83, is attachable to the single shared housing 78 to enclose a seed disk, singulator, and other components (not shown) for each of the seed meters. Therefore, the seed meter of the row unit 70 provides a streamlined and more efficiently designed row unit 70, which is able to take up less space, while still providing the ability to change the planting of different seed types or varieties in and on-the-go manner.

As mentioned, the first seed meter 79 includes an area for receiving seed that may be known as a first seed pool 80. The seed is collected in the seed pool and is distributed to the meter by a system, such as an air seed delivery system. The seed disk within the seed meter will rotate such that seed cells agitate seed in the pool and, along with the pressure source, attach a seed to the seed cells. The rotation of the disk continues as the seed is passed through a singulating device and towards an area of substantially no pressure differential such that the seed is released from the first seed disk at the seed exit or chute 90, which can be seen in FIG. 14 to be a shared seed exit.

Likewise, the second seed meter 83 also includes a seed pooling area 84 for collecting a different seed type, variety, or hybrid within the pool 84. The second seed disk within the second seed meter 83 passes through said seed pool and a singulating device and towards an area of little to no pressure differential therein. At said location, seed in the second seed meter 83 is released from the seed disk such that the seed is passed through the shared seed chute 90 of the seed meter housing 78. Thus, depending on the seed meter that is activated to meter the desired seed type, hybrid, or variety, will provide for which seed is to be planted. The first seed meter may be dedicated to plant a first seed type and the second seed meter 83 may be dedicated to plant the second seed type. For example, the first seed meter may be associated with a workhorse seed while the second seed meter is associated with a racehorse type seed. The ever-changing field conditions as the planter moves through a field will dictate which seed is to be planted by which seed meter. Furthermore, as the seed meters have a shared housing 78 with a shared seed exit 90, the seed will always be directed at approximately the same location such that it is passed through the entrance 93 of the seed tube 92 and towards its exit 94, where it is directed in a manner such as that by the arrow 95 in FIG. 14 towards the furrow in the ground.

To operate the separate seed meters 79, 83, the meters will be associated with dedicated seed motors, which may be electrically driven seed motors similar to those shown with regard to the row unit 40 as previously disclosed. The motors can independently operate the rotation of the disks within the seed meters such that a particular disk is rotating to plant a desired seed. Other precautions and additions to the invention may include that both motors be rotating at all times but that only one seed be planted by a particular meter and associated with a desired trait for providing the yield at a particular location in the field as well. However, having a dedicated motor for each meter will allow the disk to be instantaneously operated upon the change for a seed to be planted. For example, when the first seed meter is planting seed in a continuous manner, the second seed disk of the second seed meter 83 may not be in operation. However, when the planter recognizes a need to change the type of seed to be planted based upon known information, the second seed meter can be instantaneously operated by the activation of the second motor to begin rotation of the second disk through the seed pool to begin planting the second seed type or variety.

Furthermore, the first and second seed meters can be connected to air sources, such as vacuum sources in a similar manner to the row unit 40 as previously disclosed. A vacuum hose can be connected to a splitter mechanism, which is then connected to air inlets or vacuum inlets of the vacuum sides 81, 85 of the seed meters to provide a constant source of vacuum pressure within the shared meter housings. The constant vacuum pressure within the housing will ensure that seed is always to be attached to the seed disks when needed.

Figure 14:
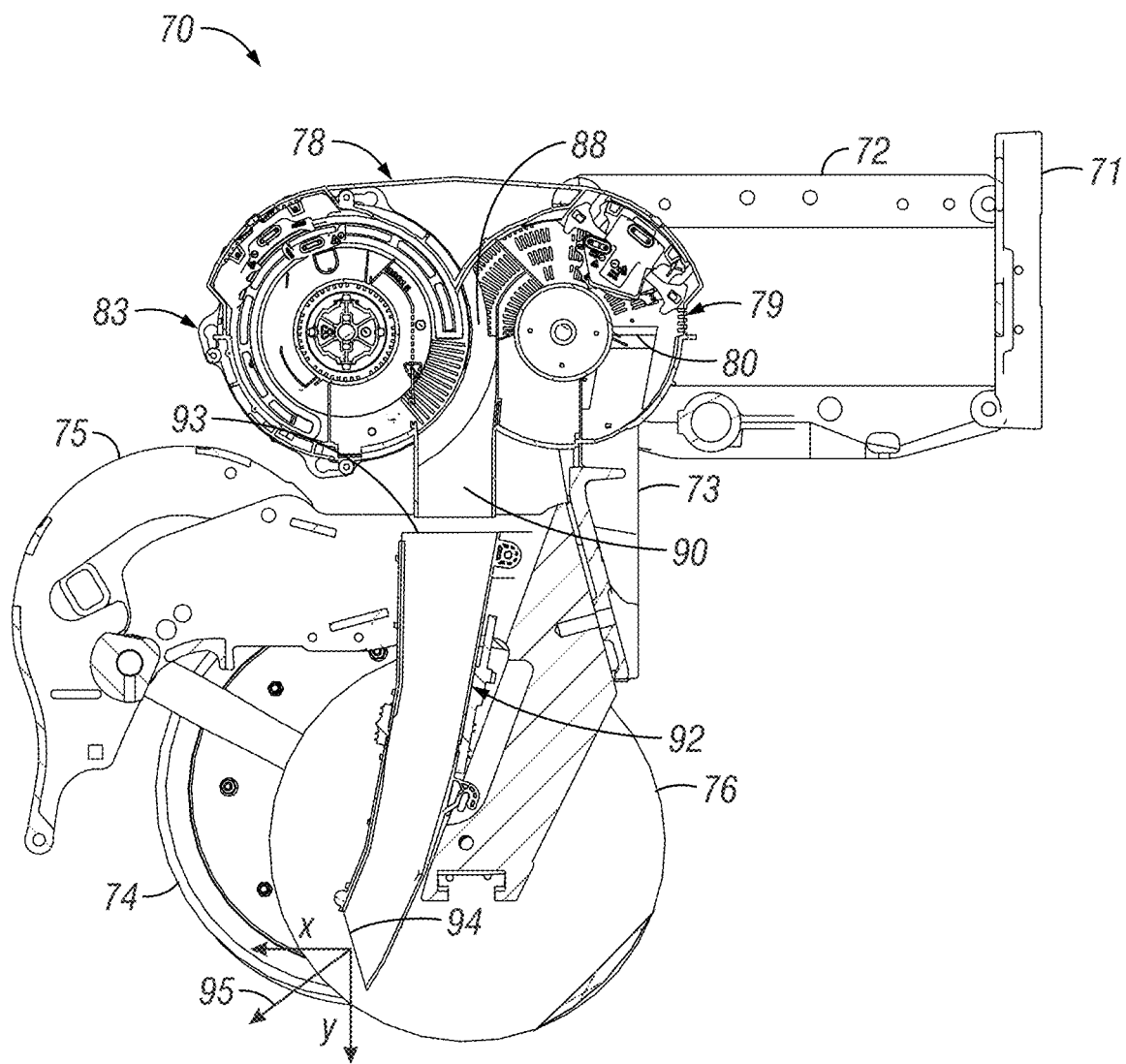
FIG. 14 is a sectional view of the row unit of FIG. 10 about line 14-14 of FIG. 13.

Additional advantages of the row unit 70 shown in the figures include that the seed meters be positioned such that they are oppositely facing one another and with the seed disk rotating in opposite manners. For example, as shown in FIG. 14, the seed disk associated with the first seed meter 79 will rotate in a counter clockwise manner and the seed disk associated with a second seed meter 83 will operate in a clockwise manner according to the view of FIG. 14. This will allow the release point for each of the meters to be at the shared seed chute 90 and above the entrance 93 of the seed tube 92. Therefore, no matter which seed meter is being operated, the seed should fall at substantially the same location from either meter. This is due in part to a partial overlap 88 of the seed meters and disks housed within. As shown best in FIG. 14, a portion of the seed disks will overlap with one another with enough spacing such that there is little to no interference between the seed disks. The overlap provides a shared or common release point relative to the seed chute and tube 90, 92 such that the seed will fall in a manner with the least amount of bounce through the seed tube 92 as the seed approaches the exit 94 in the direction of the arrow 95. Thus, the streamline design of the shared housing 78 as shown in the figures provides additional advantages for a row unit 74 providing a system that can plant multiple or a plurality of types, varieties, or hybrids of seed from a planter while the planter travels through a field.

In addition, similar to previously disclosed, each of the row units of the planter can include a row unit 70 with a shared housing 78 and first and second seed meters 79, 83. The independent control of the meters at each of the row units will allow the planting to be as streamlined as possible with ideal spacing between such seeds planted in the furrow. Additional benefits and advantages obvious to those skilled in the art are also to be included.

Furthermore, as mentioned, the seed provided to each of the meters 79, 83 of the row unit 70 can be provided in any number of ways. An air seed delivery system can be utilized such that seed is transported from separate or shared central hoppers or bulk tanks to each of the meters. For example, two hoppers may be utilized with each hopper containing a separate seed variety. Each hopper may include its own air seed delivery system which connects to only one of the meters at each row unit. The other hopper can be operably connected to the opposite or other seed meter at the row unit such that each hopper supplies seed to only one of the meters at a row unit. This will aid in keeping the seed variety separate, while also providing a more efficient manner of planting the desired seed at the desired time through the field.

Figure 15:
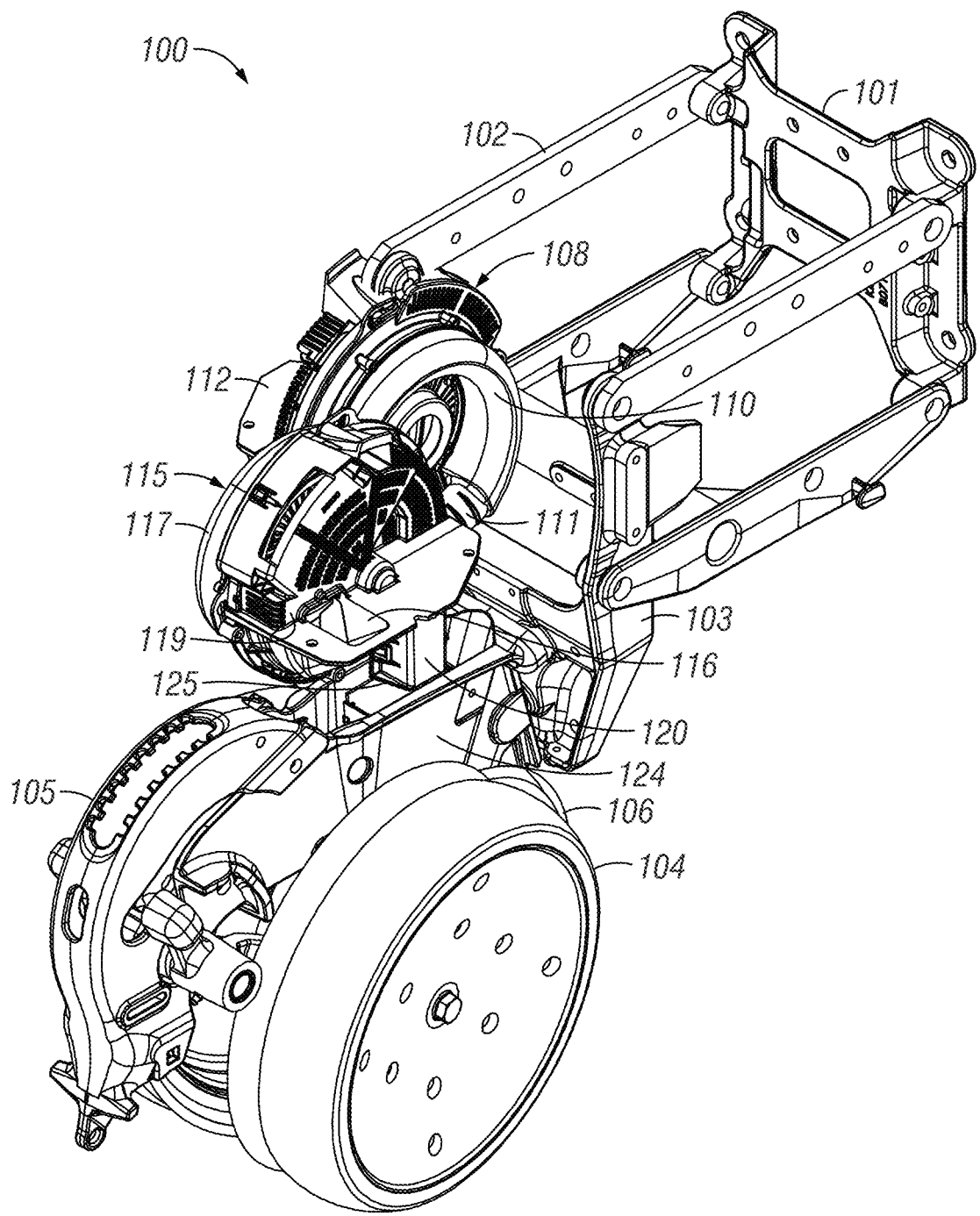
FIG. 15 is a perspective view of another row unit including aspects of the invention.
Figure 16:
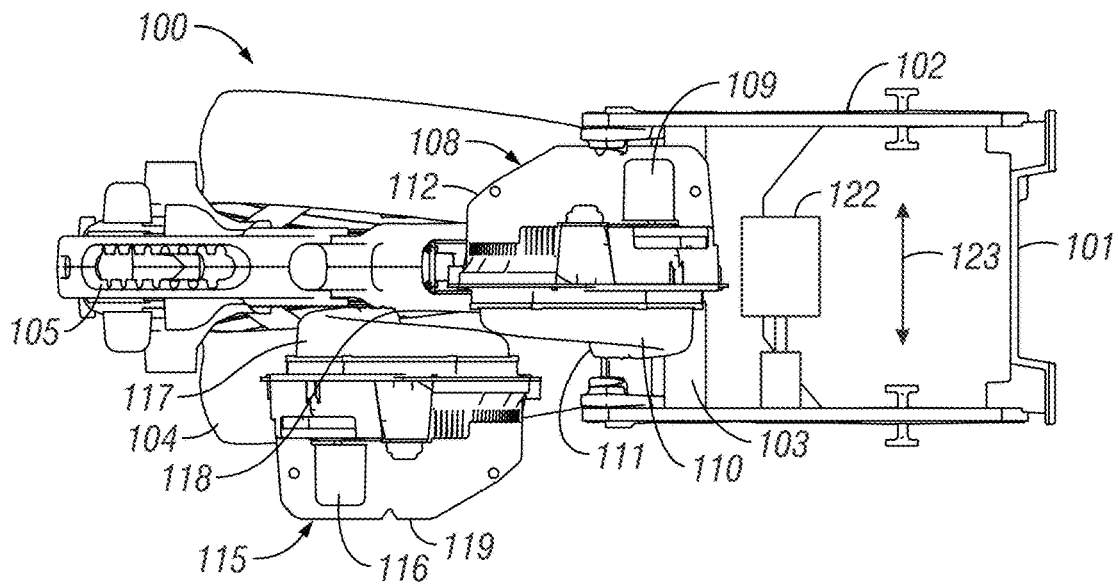
FIG. 16 is a top plan view of the row unit of FIG. 15.
Figure 17:
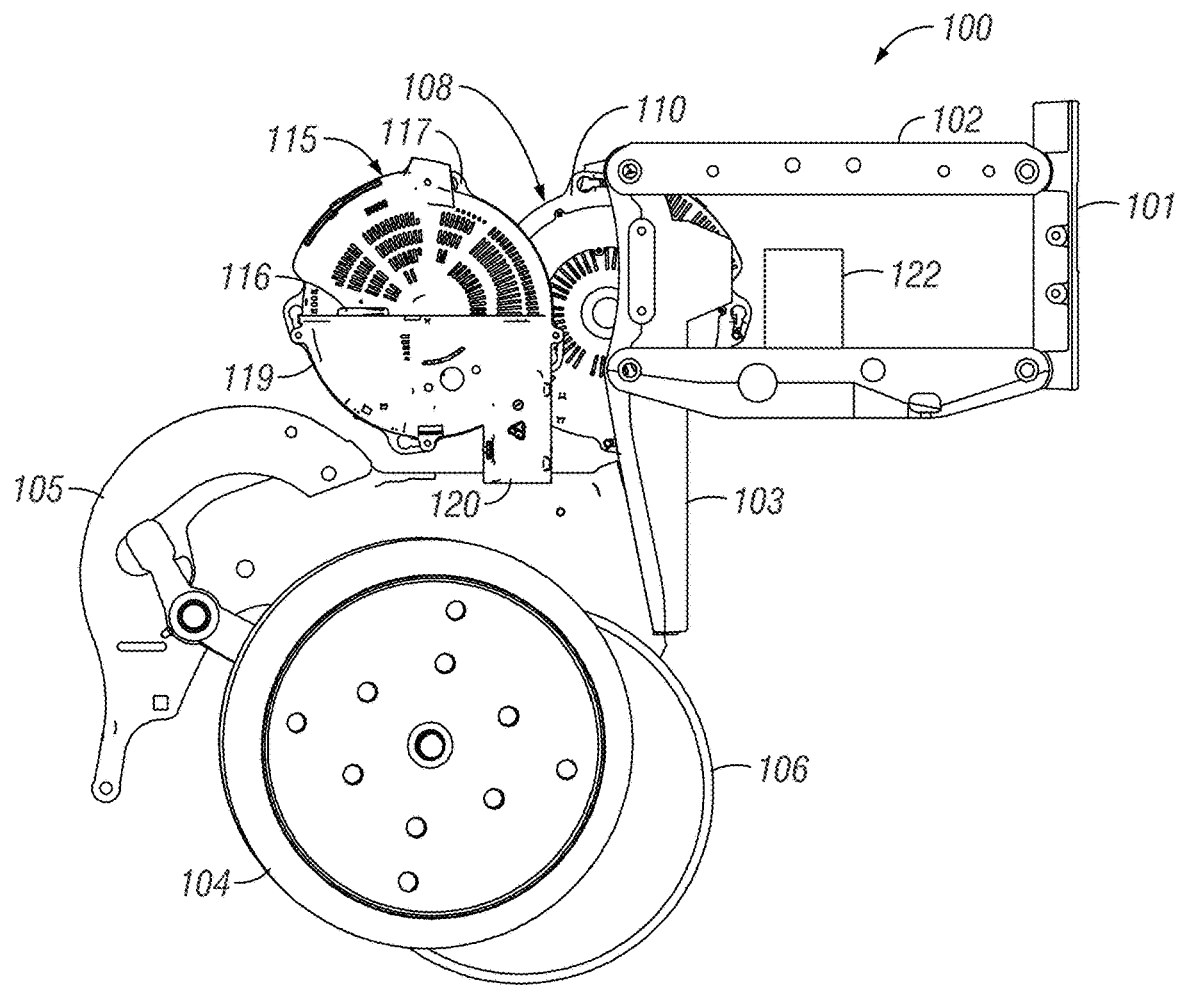
FIG. 17 is a side elevation view of the row unit of FIG. 15.
Figure 18:
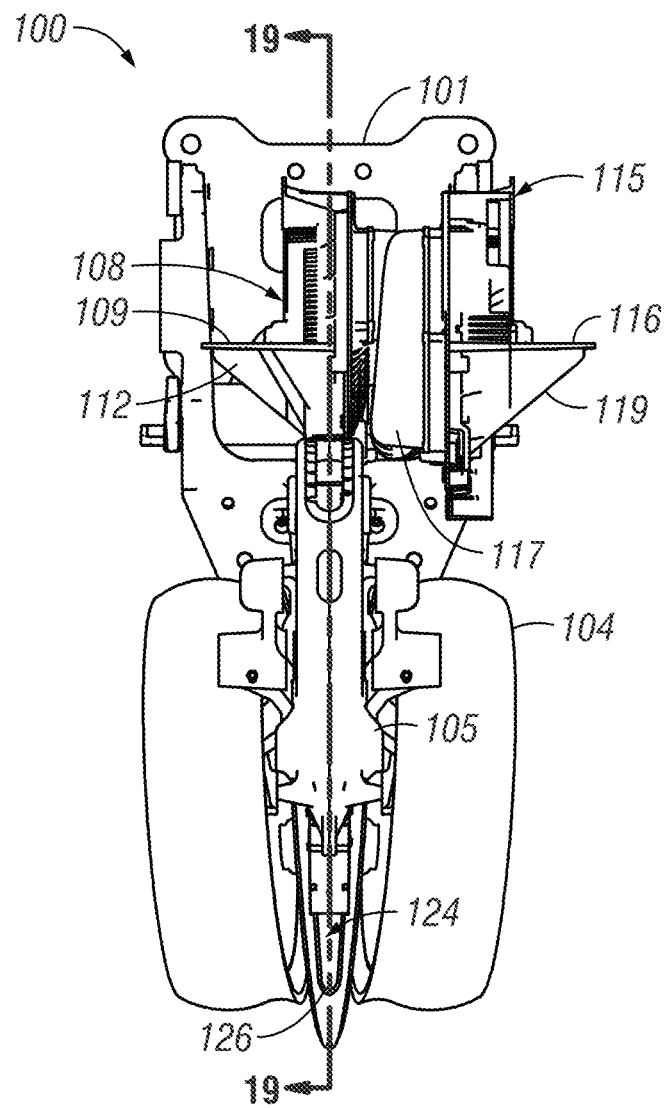
FIG. 18 is a rear view of the row unit of FIG. 15.

FIG. 15 is a perspective view of yet another row unit 100 capable of planting one of a plurality of separate seed types, varieties, or the like by a planter in the field in an on-the-go manner such that a desired seed variety is planted which accounts for field conditions, such as moisture content, soil type, soil temperature, and the like. While the previous row units have included systems in which the seed meters are substantially static and fixed in place above a shared or common seed tube or other seed-to-ground delivery system, the row unit 100 discloses a system that is more dynamic. For example, the row unit 100 shown in FIG. 15 includes a dynamic system in which a plurality of seed meters can be translated or otherwise moved in a direction to selectively align one or said plurality of seed meters with a seed-to-ground delivery system, such as a seed tube, to plant the seed associated with the aligned seed meter. When a separate or different seed type, hybrid, and/or variety is to be planted, the meters are dynamically translated such that a different seed meter associated with the different seed type, variety, or hybrid is aligned with the seed-to-ground system to singulate and meter the seed through the seed-to-ground delivery system and into a created furrow. The system allows for a constant on-the-go changing of meters aligned with the seed to the ground delivery system such that the different seed types can be planted without having to change the seed in a seed tank, hopper, or the like.

As shown in FIGS. 15-23, the row unit 100 includes many of the standard row unit components, including a mount 101, a linkage 102, a frame 103, gauge wheels 104, a depth adjustment mechanism 105, and opener disks 106. As has been disclosed, these components support the row units and create a furrow for planting the seed therein.

While it is to be appreciated that the row unit 100 is capable of supporting any number of seed meters associated with any number of a plurality of different seed types, the embodiment shown in the figures includes two seed meters. A first seed meter 108 is shown with a second seed meter 115. The first seed meter is at least partially forward of the second seed meter 115. The fore and aft positioning of the seed meters will allow the row unit to be maintained as little width as needed to support the plurality of row units. Furthermore, and similar to previous row units, the seed meters of the row unit 100 are positioned such that they are opposite one another, as will be understood, such that the seed chutes or other exits of the seed meters will be substantially adjacent to one another such that the meters will need the least amount of movement or translation to substantially align or at least partially align the seed chute of the desired seed meter with the seed-to-ground delivery system.

The row unit 100 includes a first seed meter 108. The first seed meter is similar to those previously disclosed in that its housing includes a vacuum side 110 and a seed side 112. The seed side of the housing 112 includes an inlet for accepting seed to collect in a seed pool 109. The vacuum housing 110 of the seed meter 108 includes a vacuum inlet 111 for attaching to a vacuum source. Furthermore, the seed meter 108 includes a seed chute or exit 113 for directing seed that has been released from a seed disk towards the seed-to-ground delivery system, in this case, a seed tube 124.

The second seed meter 115 includes similar components in that it includes a housing comprising a vacuum housing side 117 and a seed housing side 119. The seed side of the housing 119 includes an inlet for seed to create a seed pool 116, while the vacuum housing side 117 includes a vacuum inlet 118 for connecting to a vacuum or other air source for providing air to the interior of the housing such that seed is attached to a seed disk rotated therein. Additional components not shown will be a first motor operably connected to the first seed meter 108 to independently and selectively drive the seed disk rotation therein, and a second dedicated motor operably attached to the second seed meter 115 such that the dedicated motor of the second seed meter can selectively rotate the seed disk housed within as well. The operation of the seed meters will be substantially similar to those previously disclosed and that the seed disk rotates through the seed pool, through a singulator, and to an area of little to no pressure differential where the seed is released from a seed disk and is directed by a seed chute 120 towards a seed-to-ground delivery system.

Figure 19:
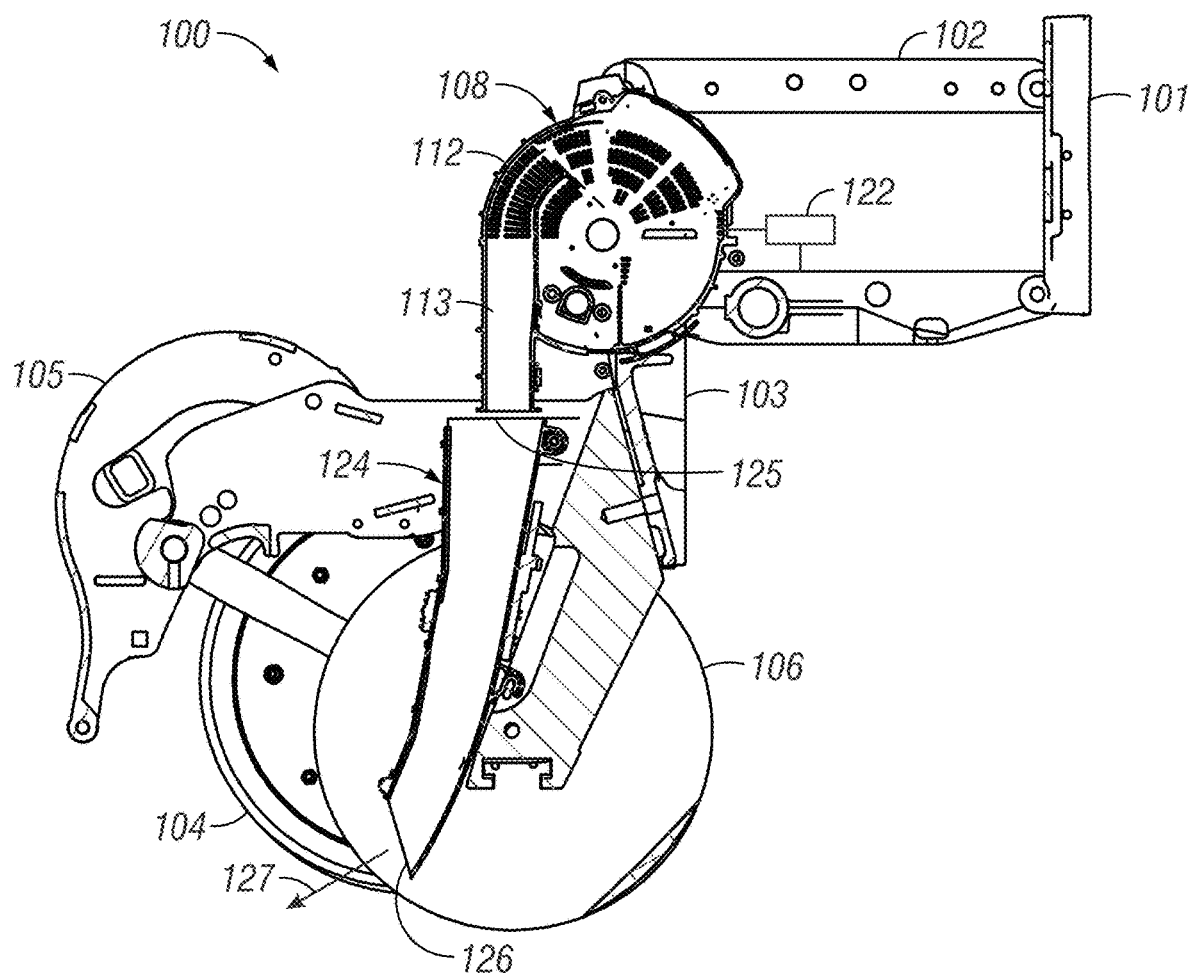
FIG. 19 is a sectional view of the row unit of FIG. 15 about line 19-19 of FIG. 18.
Figure 20:
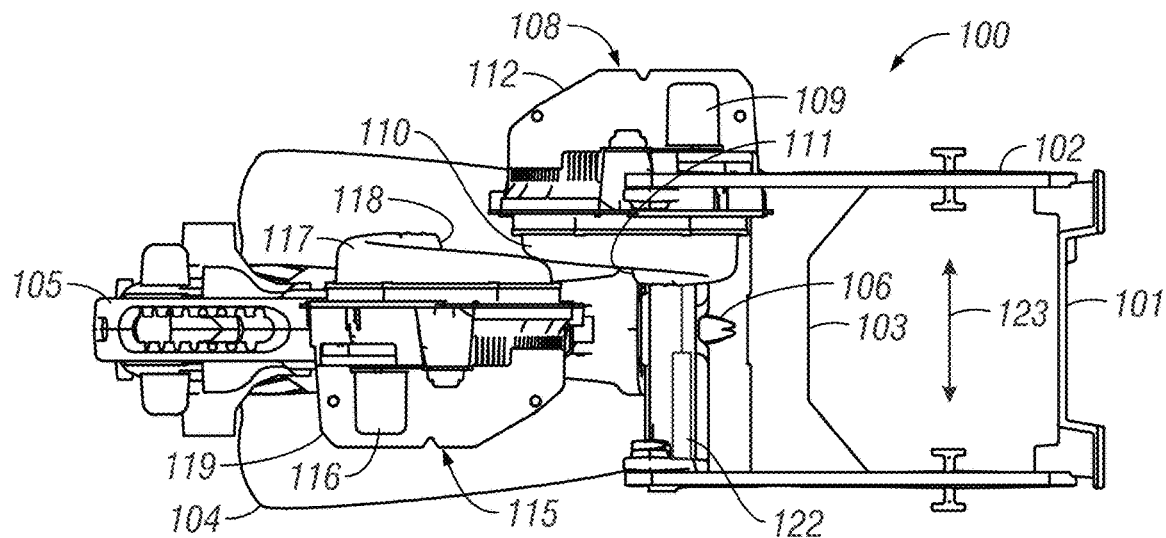
FIG. 20 is a top plan view of the row unit of FIG. 15 with the seed meters translated.
Figure 21:
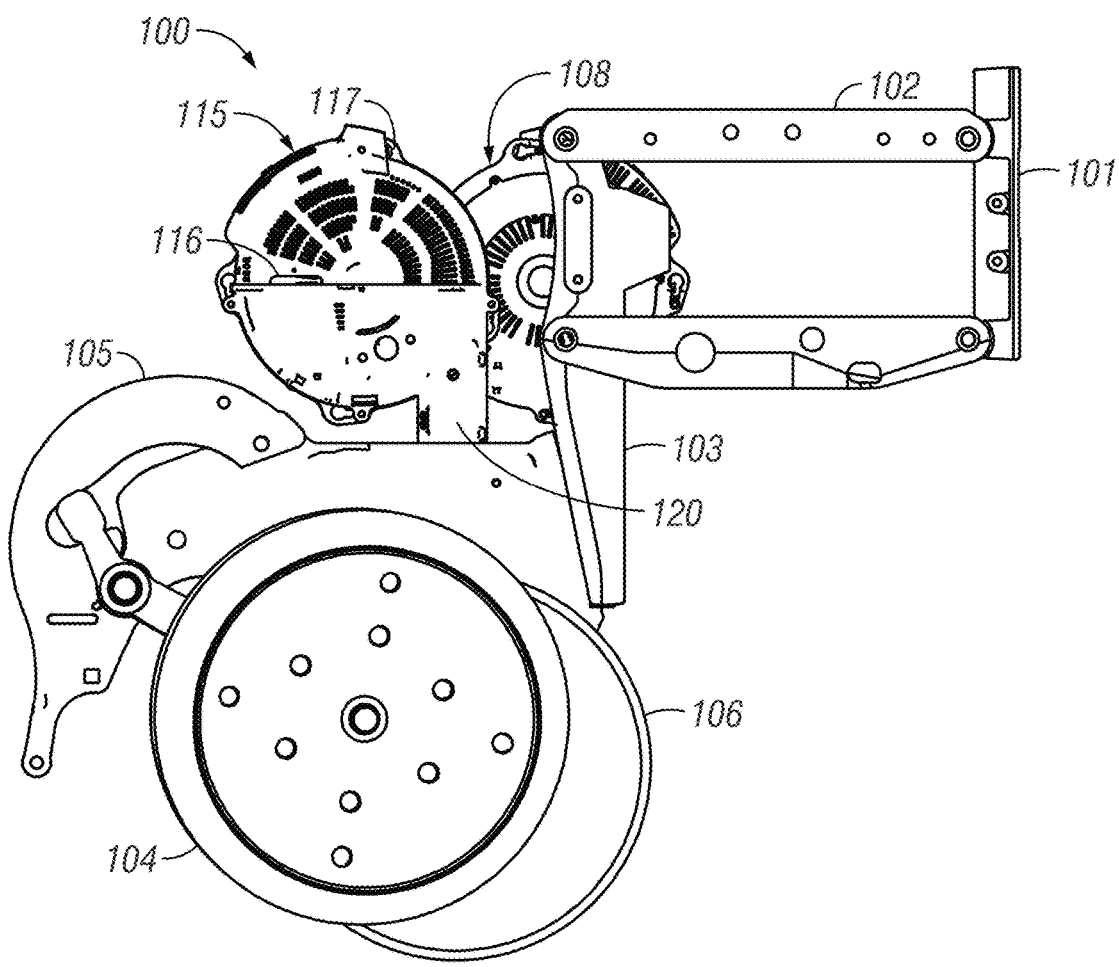
FIG. 21 is a side elevation view of the row unit of FIG. 15 with the seed meters translated.
Figure 22:
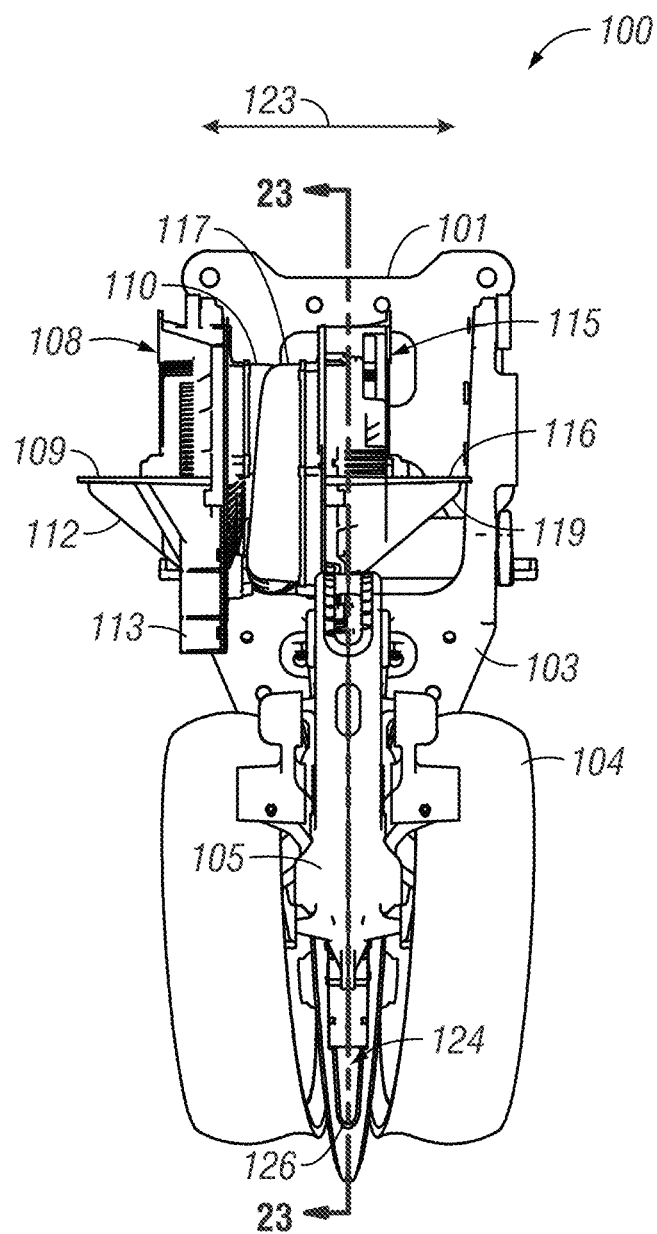
FIG. 22 is a rear view of the row unit of FIG. 15 with the seed meters translated.
Figure 23:
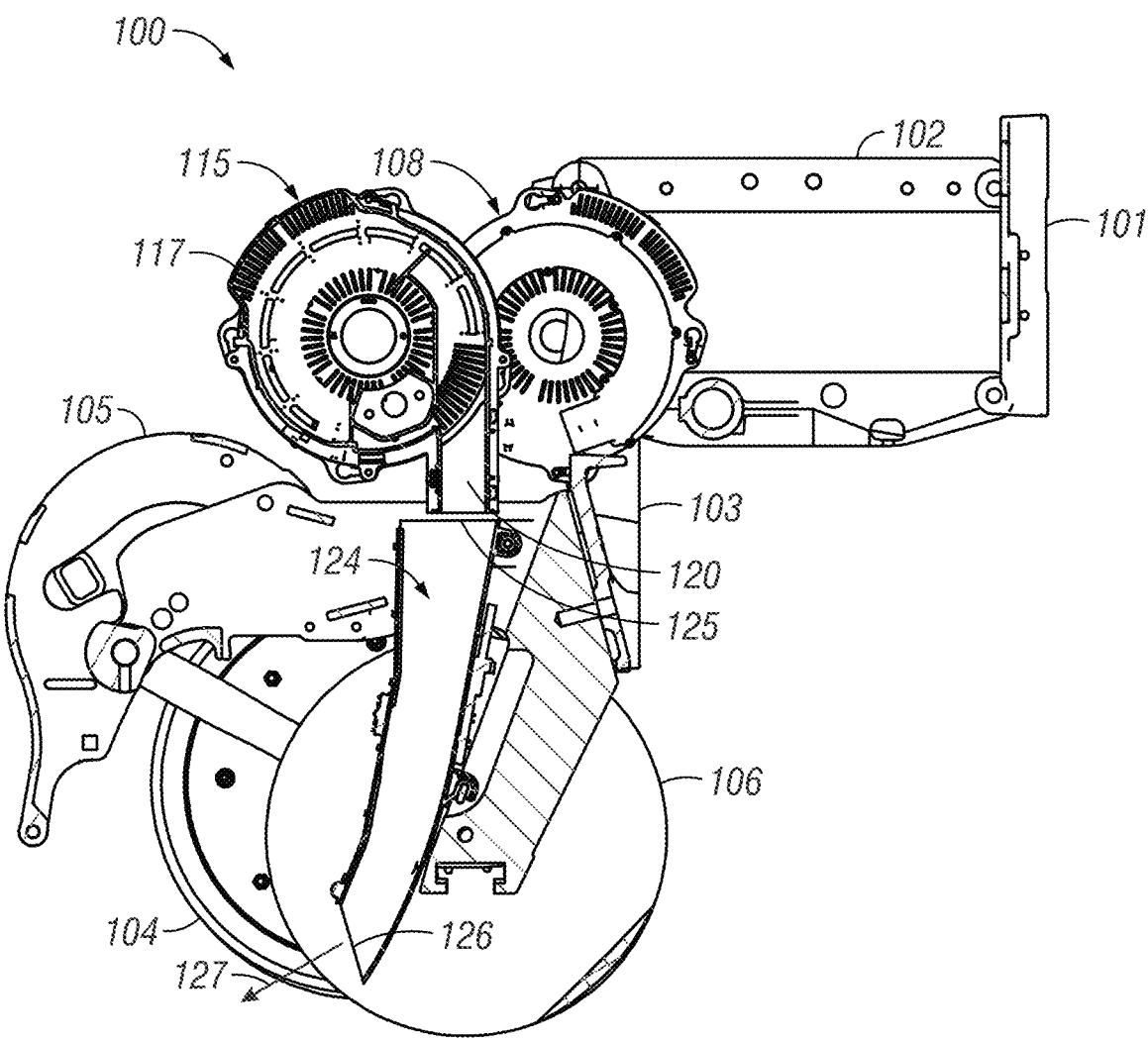
FIG. 23 is a sectional view of the row unit of FIG. 15 with the seed meters translated and the section about line 23-23 of FIG. 22.

As disclosed, the seed meters of the row unit 100 are substantially dynamic and that the seed chute of each of the seed meters is not always aligned with the seed-to-ground delivery system. For example, as shown in FIGS. 16-19, the seed chute of the first seed meter 108 is at least partially aligned with the seed-to-ground delivery system, while the seed chute of the second seed meter is substantially not. FIG. 19 shows the seed chute 113 of the first seed meter 108 at least partially aligned with an entrance 125 of a seed tube 124. In the orientation shown in FIGS. 16-19, the first seed meter is the operating seed meter such that the seed type, variety, and/or hybrid associated with the first seed meter will be planted by the row unit. The second seed meter 115 does not have alignment between its seed chute and the seed tube such that the seed associated with said seed meter will not be planted.

However, when the tractor, planter, or some intelligent control associated therewith determines a change in known and obtained information related to field conditions (e.g., soil moisture content, amount of rain, soil temperature, soil hardness, and soil nutrients, etc.), the system will operate to adjust or dynamically move the seed meters to change the seed type being planted. This may be done with a system such as a dynamic control system 122. The dynamic control system 122 may be an actuator, which may be hydraulic, electric, pneumatic, or some combination thereof, and can be utilized to dynamically translate the first and second seed meters to change the alignment with the seed tube, which changes the type of seed being planted based on the type in seed meter.

Thus, as shown in FIGS. 20-23, the dynamic control system 122 has translated the seed meters in a direction shown by the arrow 123 to move the first seed meter 108 such that it is no longer at least partially aligned with the seed tube. However, in the configuration shown in FIG. 20, the second seed meter 115 has been likewise translated such that its seed chute is at least partially aligned with the entrance of the seed tube 124 so that seed being metered and dispensed by the second meter 115 will be passed through the seed tube 124 and towards the direction shown by the arrow 127 in FIG. 23.

The seed meters have been translated about the direction of the arrow 123 as shown in the figures, and in particular, in a side-to-side manner wherein the first meter 108 and second meter 115 have been translated horizontally towards the left of the row unit in relation to the direction of travel of the planter. The translation may be done by sliding the first and second seed meters via the dynamic control system 122, which can include the meters moving on rails, guides, or other members, to selectively align one of the two seed meters with the seed-to-ground system. The seed meter aligned with the seed-to-ground system will be operated to plant the seed associated or contained with the said meter. However, when a change is desired, the dynamic system will operate to selectively align the opposite seed meter with the seed-to-ground system. This changing of the seed meters or translating in the horizontal direction will allow for the on-the-go changing of the type, variety, and/or hybrid of seed being planted with a single planter through a field.

It is to be appreciated that, with the row unit 100 shown in the figures, it may be desired to have the first and second meters connected to one another such that the movement of one will cause the movement of other via the dynamic system 122. Thus, the housings may include a portion that is shared or else the seed meters be mounted to a track or other system such that movement of the dynamic system causes both the seed meters to move so that the desired one of the plurality of seed meters is substantially or at least partially aligned with the seed-to-ground system for planting the seed therefrom.

Furthermore, it is to be contemplated that the seed delivered to each of the seed meters be in a manner as previously shown and disclosed. The operation of the motors associated with the dedicated seed meters will also be similar to that as previously shown and disclosed.

Figure 77:
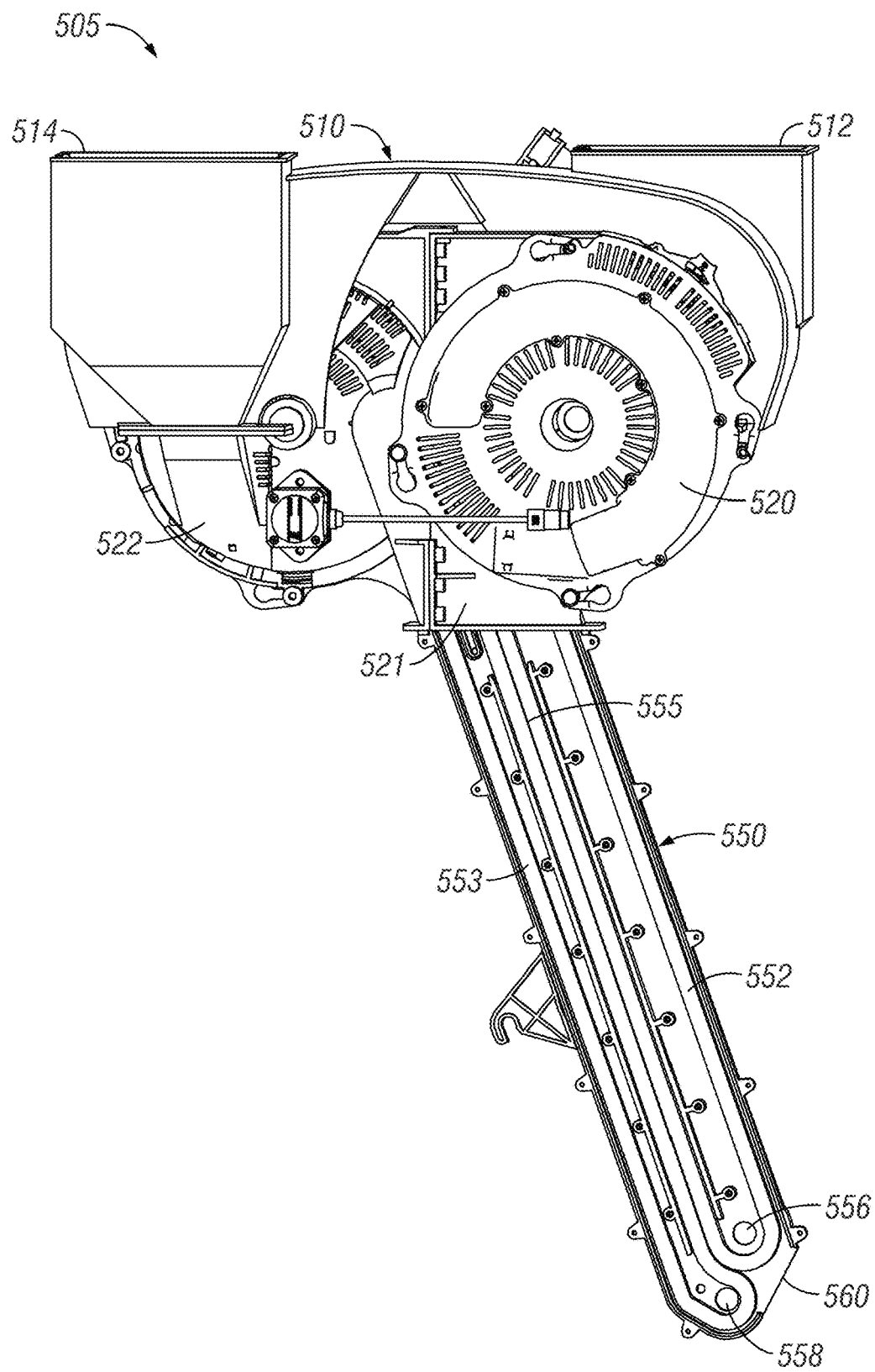
FIG. 77 is a side elevation view of some of the components of the row unit of FIG. 75.
Figure 78:
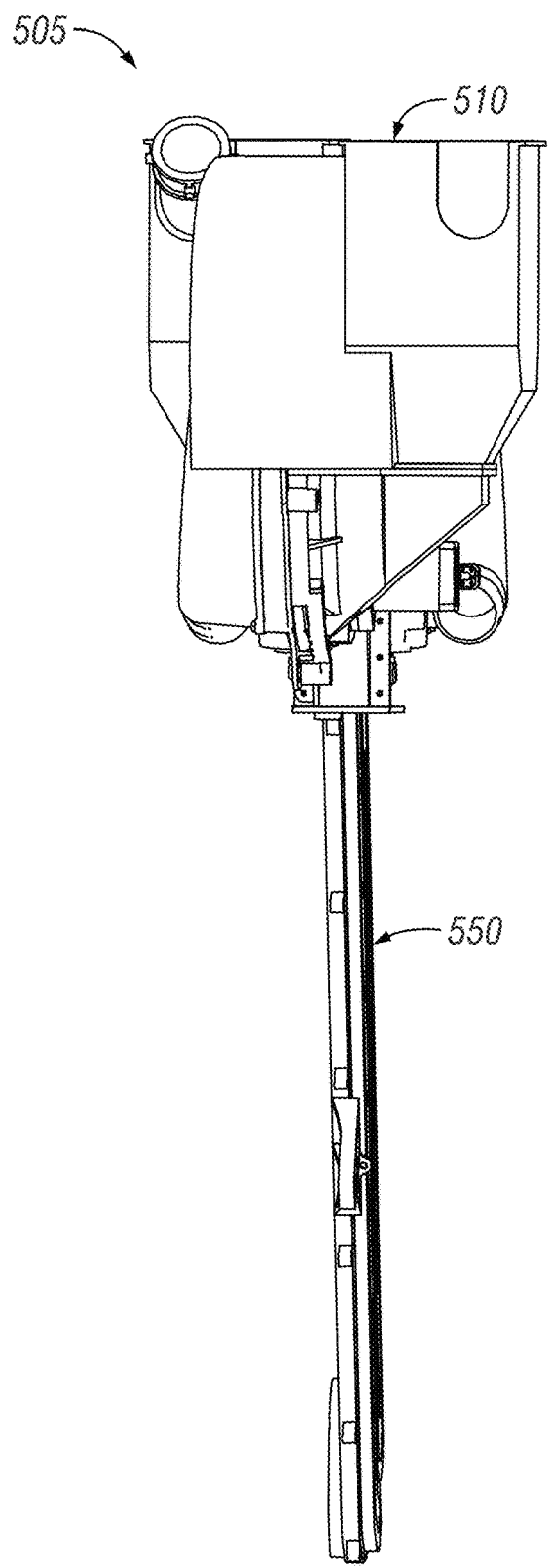
FIG. 78 is an end view of the row unit shown in FIG. 77.
Figure 79:
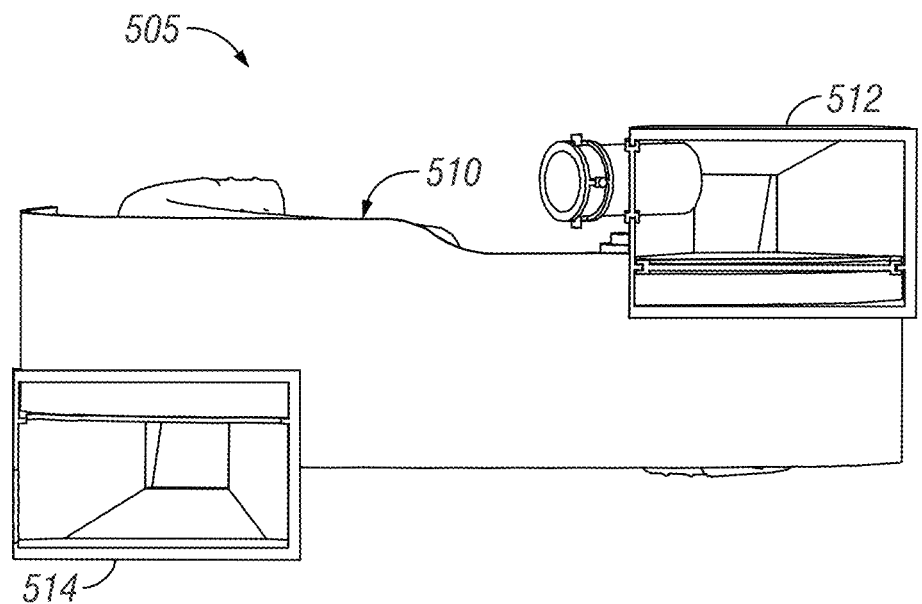
FIG. 79 is a top plan view of the row unit shown in FIG. 77.

While the seed-to-ground system has been shown to be a seed tube 124 with an entrance 125 and an exit 126, it should be appreciated that other systems may be contemplated and utilized with this and/or all of the other row units and seed meter systems of the invention. For example, brushes, endless members, belts, or other carrier members can be utilized to control the delivery of the seed from the meter to the furrow. While the seed tube is shown and described, it may be desired in some areas to provide a more controlled delivery of the seed from the seed exit of the meter to or towards the furrow. In such a situation, a seed belt or other control delivery apparatus may be utilized to control the delivery such that the seed will experience little to no bounce or roll during the delivery from the meter to and towards the furrow. The control of the seed to the furrow decreases the likelihood of bounce or roll in the furrow such that ideal and desired seed spacing is provided between each of the subsequently planted seeds. For example, a belt-type system is shown in FIGS. 77-79 for delivering seed from a seed meter to a ground, and can be utilized with any of the metering configurations disclosed.

Figure 24:
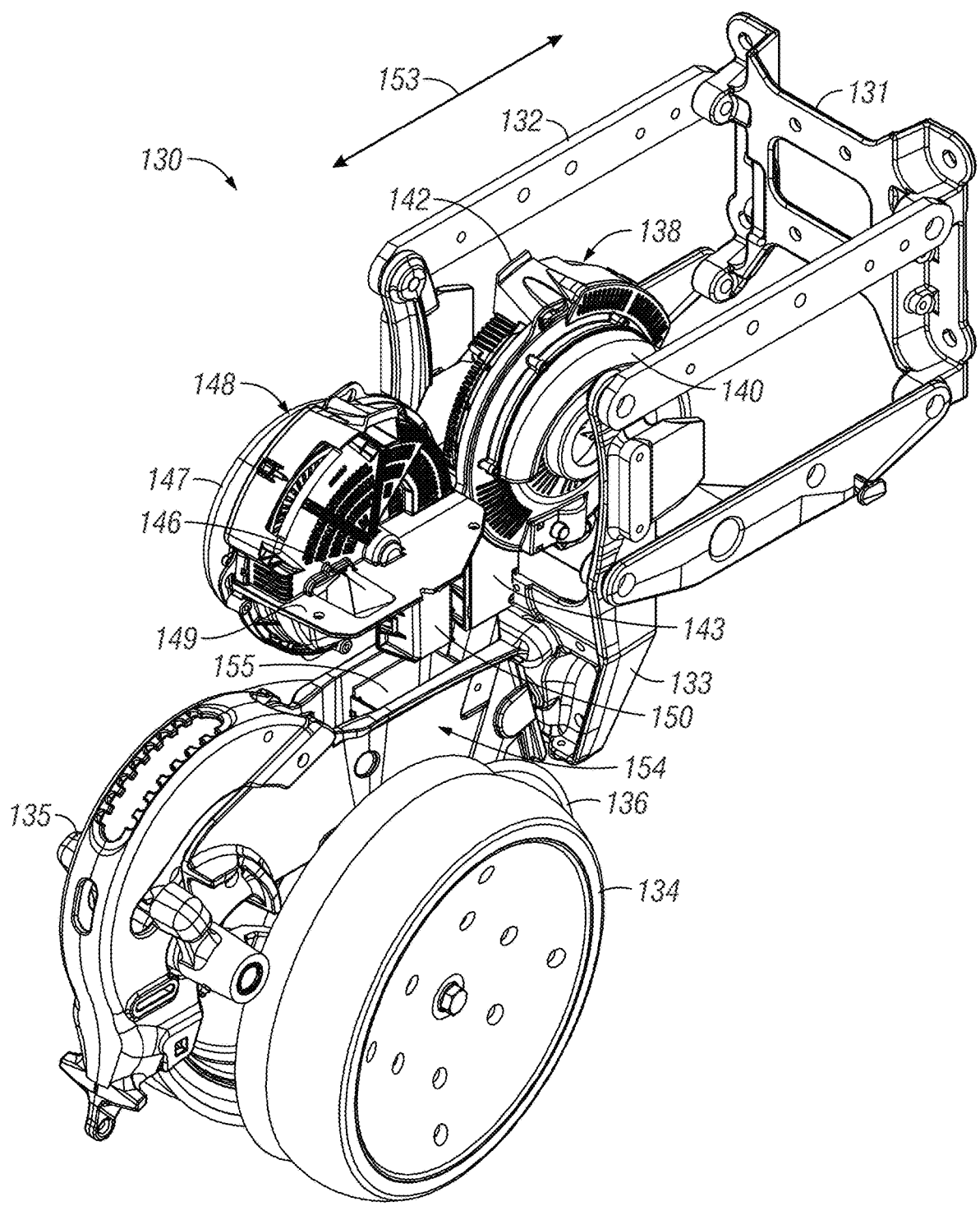
FIG. 24 is a perspective view of another row unit including aspects of the invention.
Figure 25:
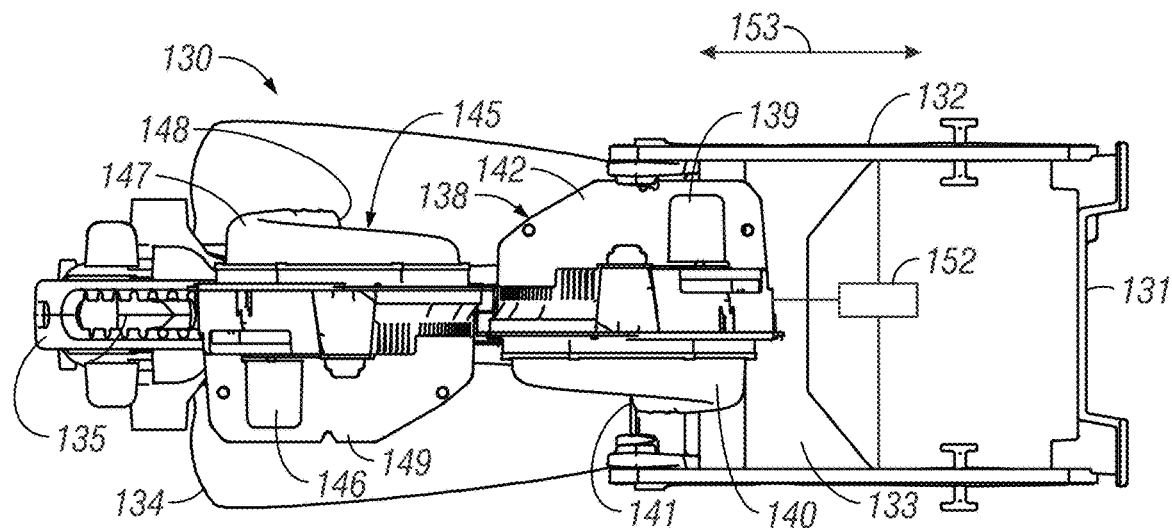
FIG. 25 is a top plan view of the row unit of FIG. 24.
Figure 26:
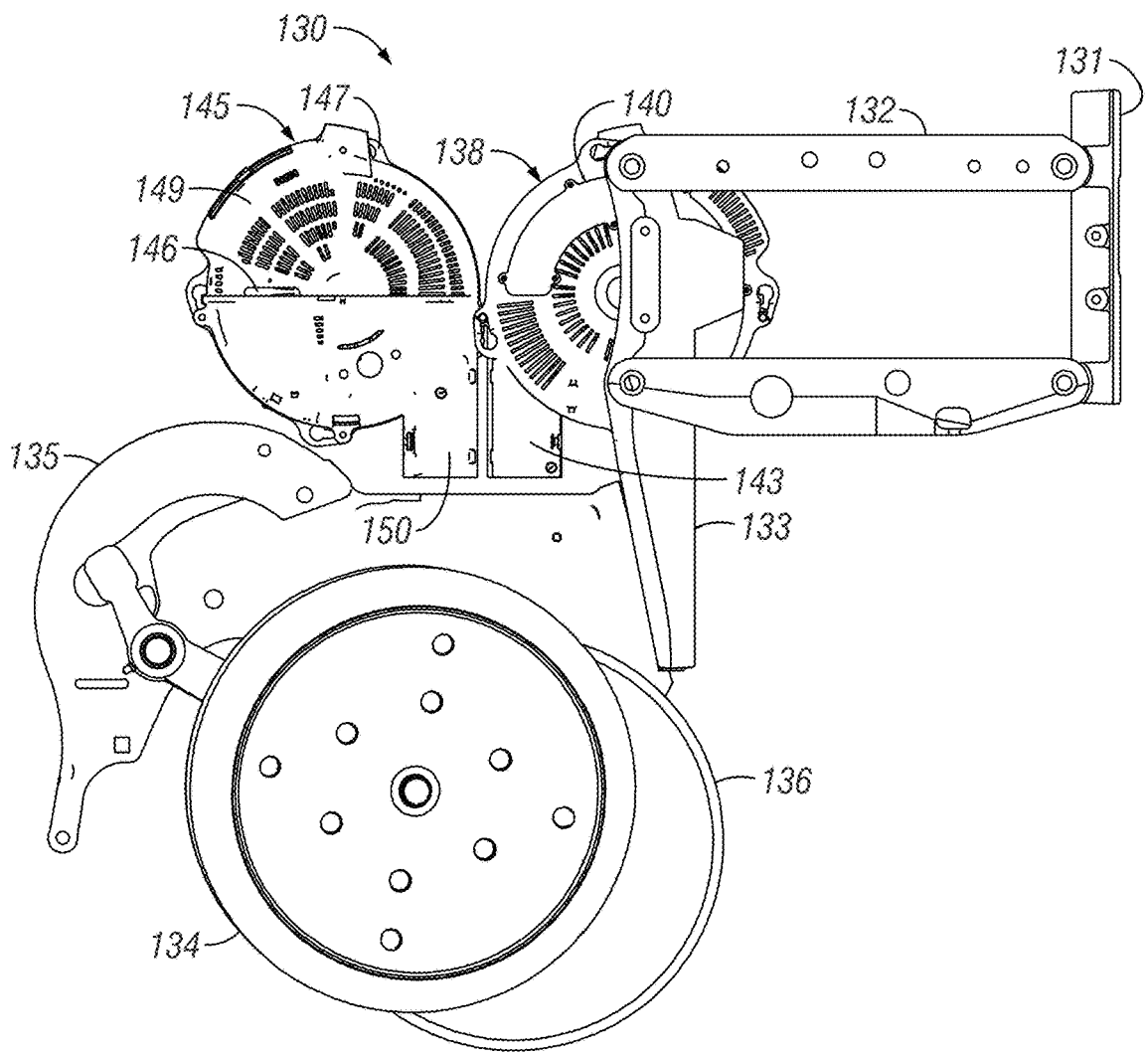
FIG. 26 is a side elevation view of the row unit of FIG. 24.
Figure 27:
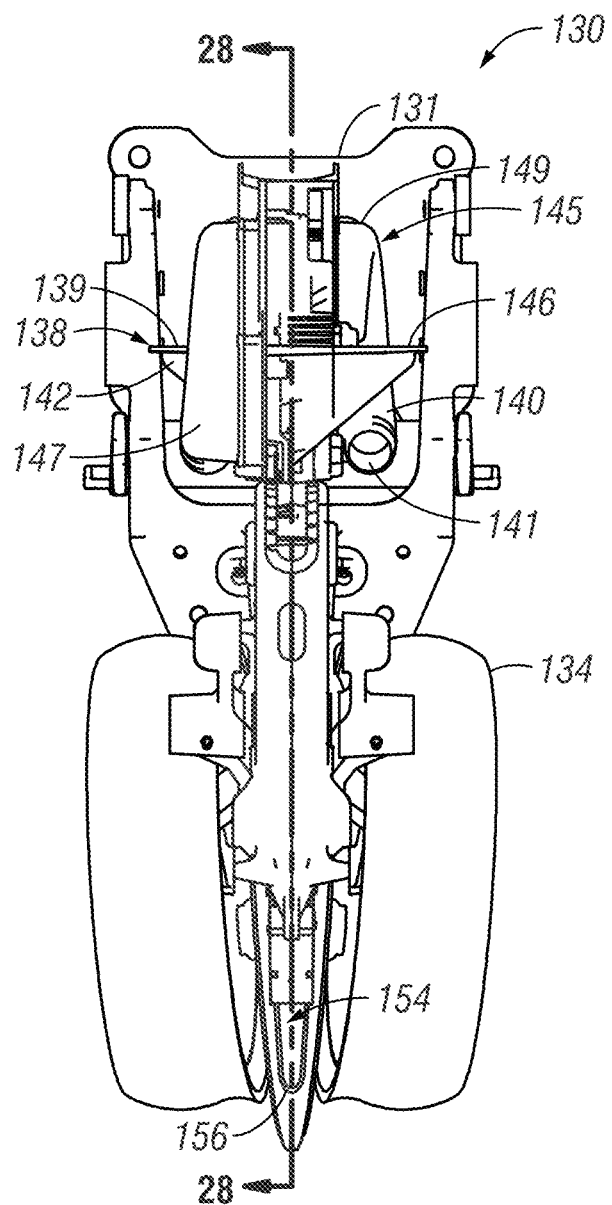
FIG. 27 is a rear view of the row unit of FIG. 24.
Figure 28:
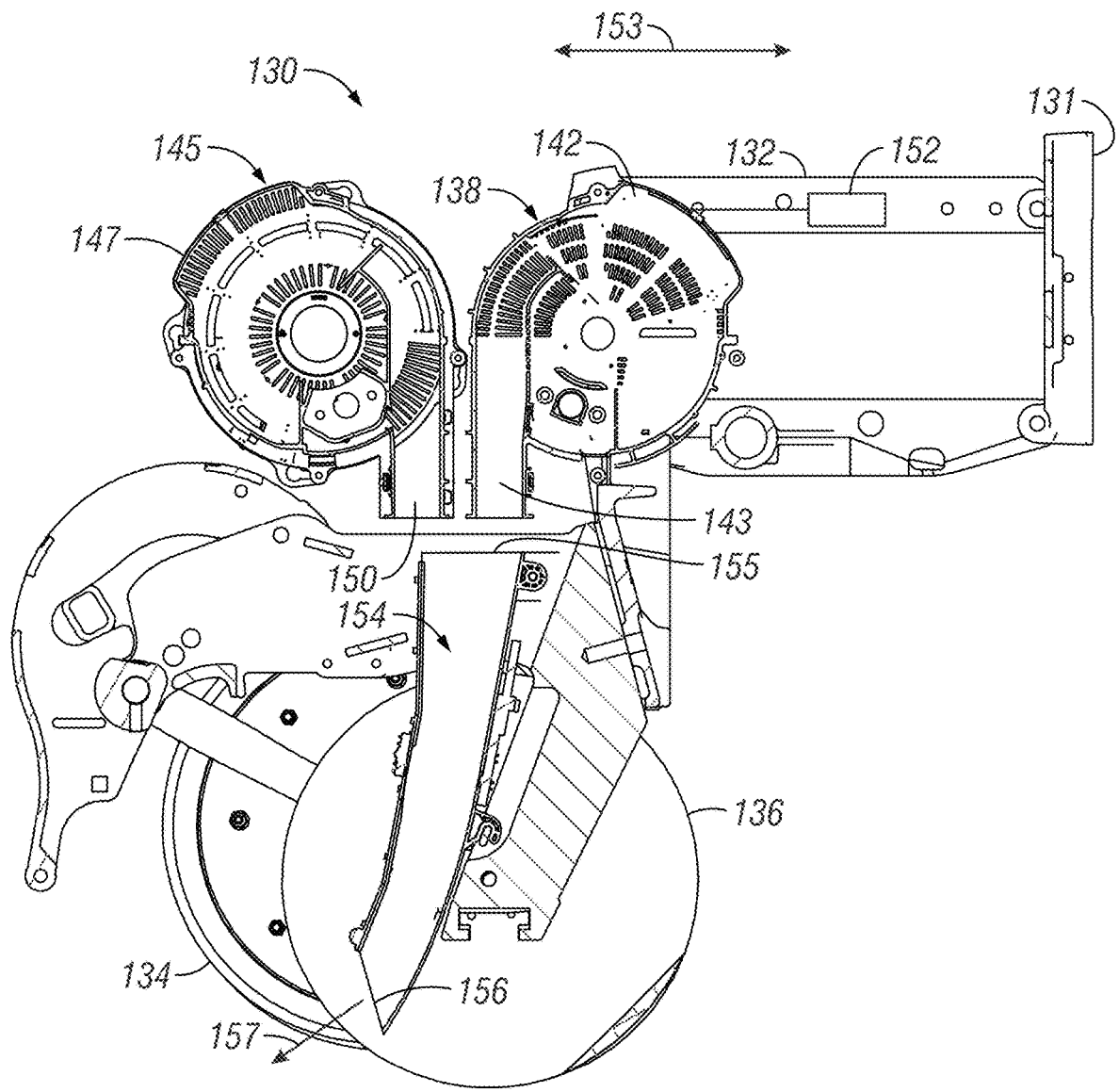
FIG. 28 is a sectional view of the row unit of FIG. 24 about line 28-28 of FIG. 27.
Figure 29:
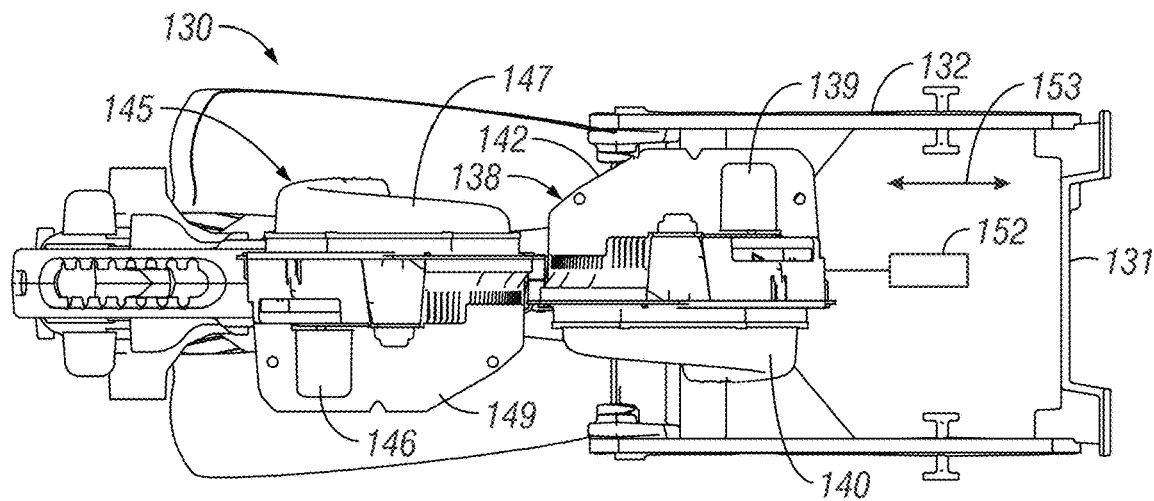
FIG. 29 is a top plan view of the row unit of FIG. 24 with the seed meters translated.
Figure 30:
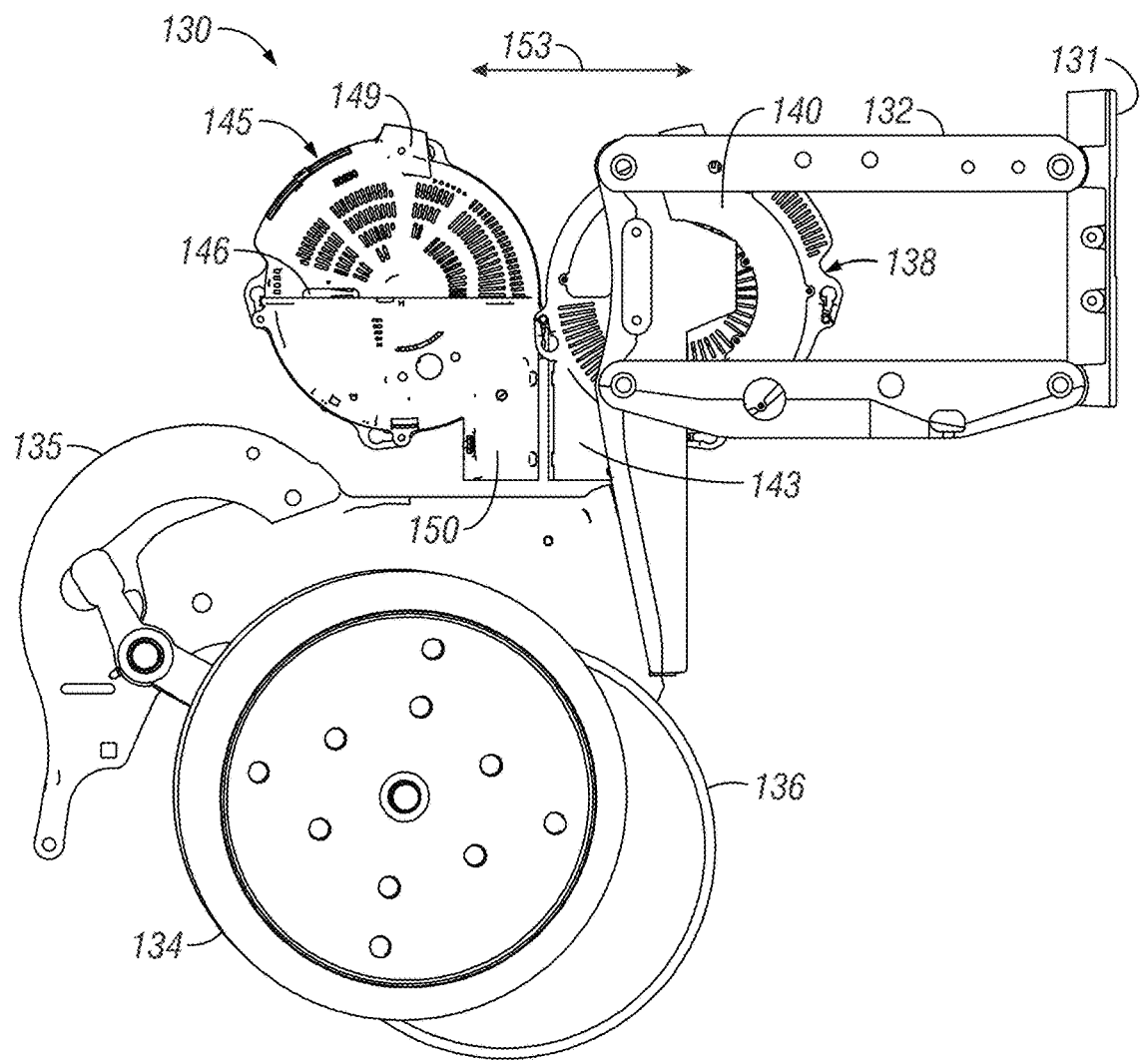
FIG. 30 is a side elevation view of the row unit of FIG. 24 with the seed meters translated.
Figure 31:
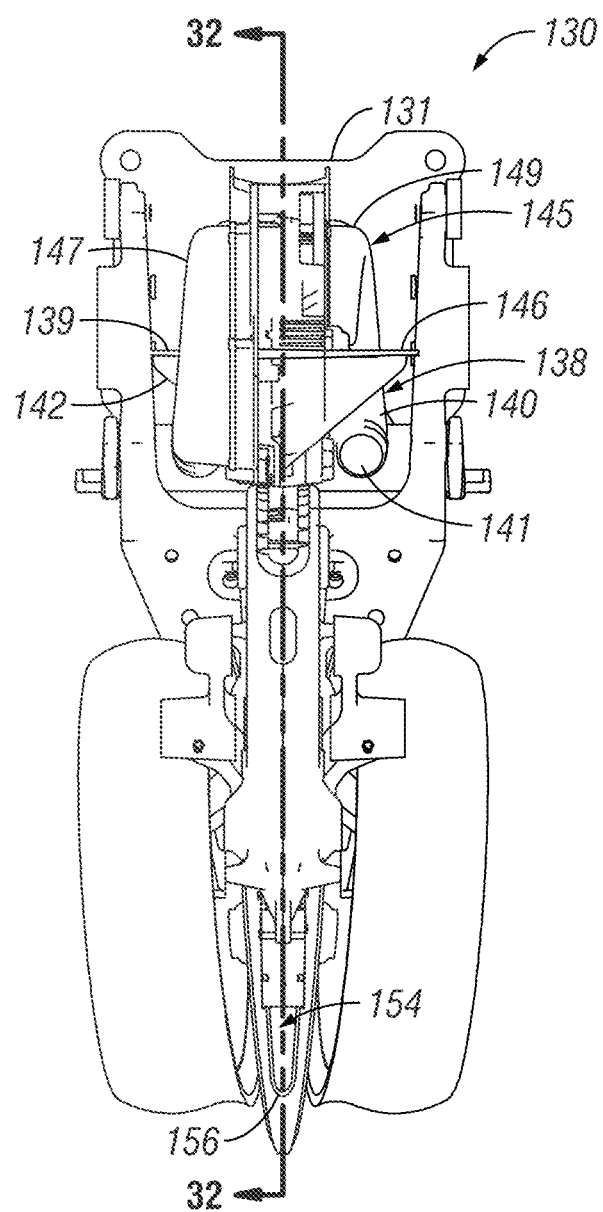
FIG. 31 is a rear view of the row unit of FIG. 24 with the seed meters translated.
Figure 32:
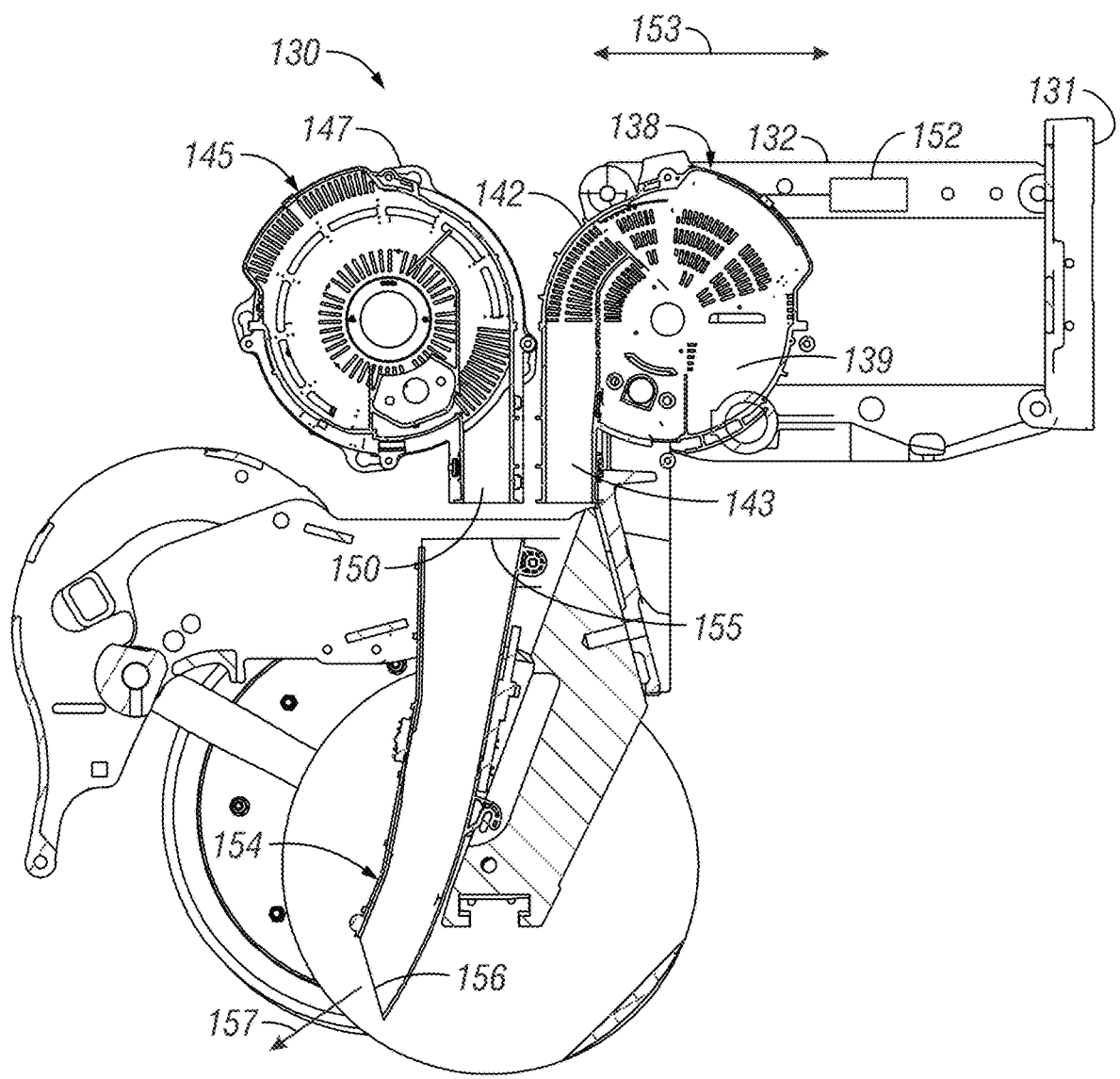
FIG. 32 is a sectional view of the row unit of FIG. 24 with the seed meters translated and the section about line 32-32 of FIG. 31.
Figure 33:
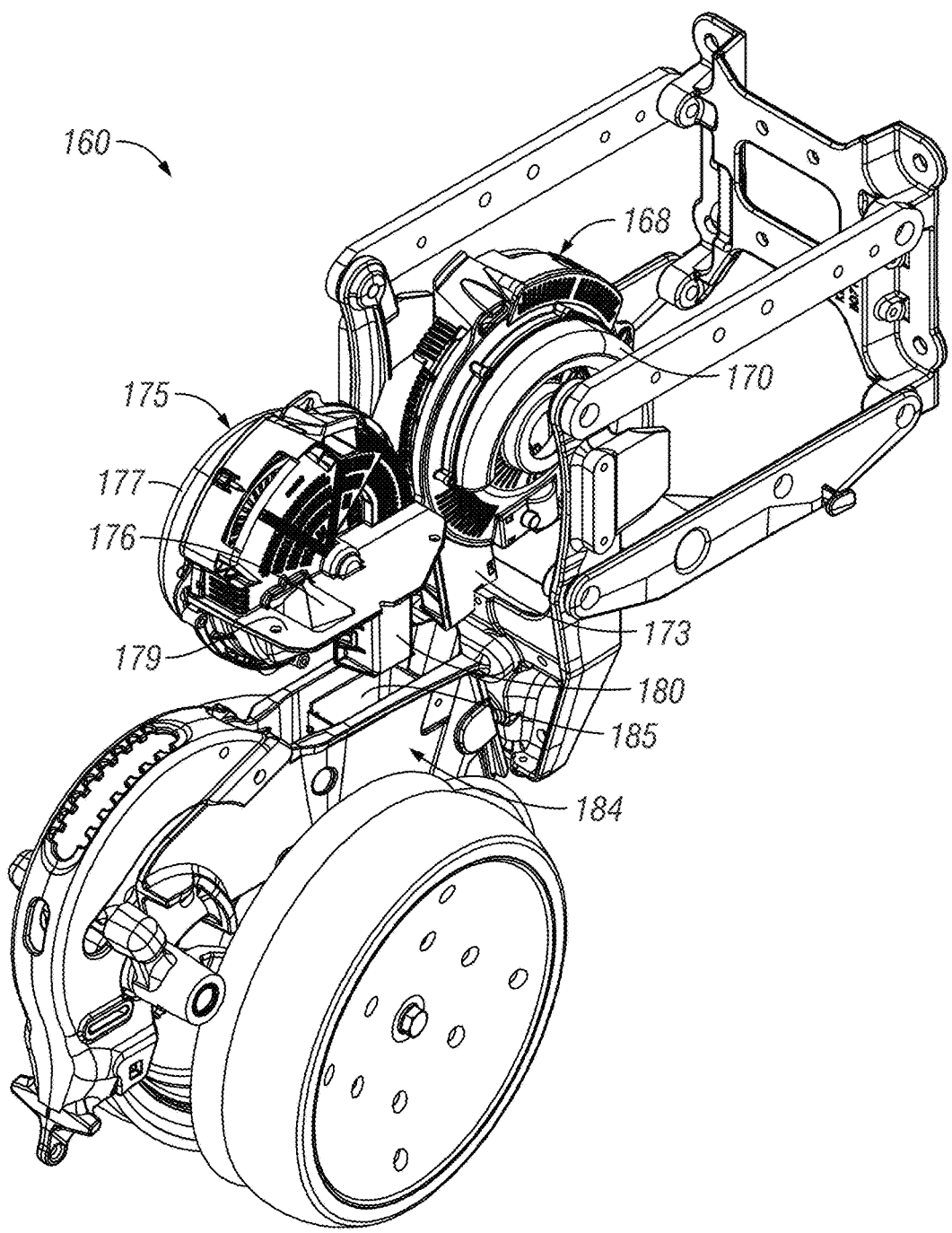
FIG. 33 is a perspective view of yet another row unit including aspects of the invention.

FIG. 24 shows yet another row unit 130 for providing a seed metering system that includes a plurality of seed meters to provide the ability to on-the-go change the planting of a seed type, variety, and/or hybrid, as a planter moves through the field and based upon pre-determined information related to the field and/or environmental conditions to give a particular seed type, variety and/or hybrid the best chance of thriving in said condition to achieve the highest possible yield for the planted seed. Similar to the row unit 100 previously shown and disclosed, the row unit 130 includes a system for providing a plurality of seed meters each capable of planting a different seed type, variety, and/or hybrid, with the system being dynamic in nature, such that the seed meters can be moved to selectively align, at least a portion of, a seed chute 143, 150 associated with an individual seed meter with a seed-to-ground delivery system to plant seed from the aligned seed meter.

As with previous row units, the components of the row unit 130 are similar with regard to the mount 131, linkage 132, gauge wheel 134, depth adjustment 135, and opener disks 136.

The row unit 130 is capable of including and controlling any number or plurality of seed meters, with each of the seed meters capable of being associated with a different seed type, hybrid, and/or variety for planting. Furthermore, as will be understood, the seed meters may be configured to each plant a variety of seed types, hybrids, and/or varieties as well. However, the FIGS. 24-32 disclose a row unit 130 with two seed meters attached thereto. Thus, for purposes of disclosure, the system with a first seed meter 138 and second seed meter 145 will be disclosed.

While the row unit 100 previously disclosed included a dynamic system that moved the first and second meters in a generally side to side manner with regard to the row unit, the row unit 130 shown in the figures includes a system wherein the first and second meters 138, 145 are translated in a forward and aft manner to selectively align at least a portion of the meters with a seed-to-ground delivery system. For example, as is shown through the figures, a first seed meter 138 and second seed meter 145 is included. The first seed meter 138 includes a housing with a vacuum side 140 and a seed side 142. The vacuum side 140 includes an inlet 141 for attaching to a vacuum or other air pressure source. The seed side 142 includes an opening for a seed pool collection point 139.

Likewise, the second seed meter includes a housing with a vacuum side 147 and a seed side 149, with the vacuum side having an air hookup or inlet 148 and a seed side including an aperture for seed to collect in the seed pool 146. As can be viewed throughout the figures, the first seed meter 138 is positioned generally forward of the second seed meter and in an opposite orientation. For example, as shown best in FIG. 25, the first seed meter 138 includes its vacuum side 140 on the lower portion of the figure while the second seed meter 145 includes an oppositely oriented seed meter with the vacuum side 147 being towards the top of the figure. Furthermore, as shown best in FIG. 25, the meters are substantially inline with one another with regard to forward and aft alignment and are not staggered as was the case with the row unit 100 that previously shown and described. The inline orientation and configuration of the seed meters will allow the seed meters to be narrow with regard to the row unit such that few to no modifications will not need to be made to existing planters.

Furthermore, the FIGS. 25-28 show that the first seed meter 138 includes a seed chute 143 that is at least partially and substantially aligned with an entrance 155 of a seed tube 154. Thus, in said configuration, the first seed meter 138 will be the active seed meter for metering and planting seed therefrom. Seed that is released from the meter will be passed through the seed tube 154 and out of the tube in the direction as shown generally by the arrow 157. As previously disclosed, the rotation of the seed disk can control the rate of the delivery of the seed delivered to the furrow, and a seed-to-ground system can take into account the ground speed of the planter such that the seed will experience substantially zero velocity when planting in a formed furrow.

However, when an intelligent control or other system associated with the planter recognizes that a change in the seed type, variety, and/or hybrid is needed to account for a change in field conditions, the row unit 130 can be manipulated to dynamically translate the seed meter such that the second meter 145 will become aligned with the seed tube 154. This is shown generally in FIGS. 29-32. For example, as shown in the figures, the seed meters have been translated in a forward manner similar to the direction shown by the arrow 153 in the figures. The movement of the meters may be facilitated by a dynamic control 152. The dynamic control and system 152 may include an actuator, pulley system, gear system, or the like. Furthermore, the seed meters may be operatively attached to rails, guides, tracks, or other members that allow the meters to slide or otherwise be translated in a forward and aft direction to selectively align one of said meters with the seed tube or other seed-to-ground system.

For example, the figures show an actuator 152, which may be a hydraulic, pneumatic, electric, or a combination actuator that is operably attached to the meters to extend and retract to slide the meters selectively inline with an opening 155 of the seed tube 154. This dynamically translating system can be continuously varied according to the known and pre-plotted field conditions to selectively align and thus, selectively plant a particular seed variety via a particular seed meter as the planter travels through the field. This on-the-go control of the changing of the seed being planted will provide the opportunity for a farmer to obtain a highest possible yield for a particular field that has been pre-plotted.

Additional aspects not explicitly shown in the figures include first and second motors associated with the first and second seed meters to selectively control the rotation of the disk therein, a pressure source, which may be a vacuum hose with a splitter to separate the vacuum pressure to the separate seed meters, as well as other aspects of a row unit that has been previously shown and described.

FIGS. 33-39 show yet another row unit 160 that includes a dynamically activated metering system to selectively align one of a plurality of seed meters of a particular row unit with a seed tube around delivery system to plant a seed type, variety, and/or hybrid associated with said meter. The dynamic system of FIGS. 33-39 provides additional ways to control the ability to selectively plant one of a plurality of types of seeds and to on-the-go change the planting of seed type while the planter moves through the field according to a predetermined field map or pre-plotted area.

The row unit 160 includes a first meter 168 and a second seed meter 175 positioned in a substantially forward and aft, inline manner. The meters are oriented opposite one another with the first meter vacuum side of the housing 171 being on the opposite side of the second meter 175 vacuum housing 177. Thus, the first seed chute 173 will be at least partially adjacent the second seed chute 180 of the second seed meter 175. As is shown in the figures, the first and second seed meters 168, 175 are oriented such that one of said meters will be substantially or at least partially aligned with an entrance 185 of a seed tube 184 or other seed-to-ground mechanism such that the aligned seed meter can be operated to plant seed associated with said meter. For example, in FIGS. 34-36, the first seed meter 168 is aligned with the seed-to-ground system 184 and as such, the seed associated with the first seed meter 168 will be planted. The seed that is in or otherwise associated with the seed pool 169 will be metered and exited out the seed chute 173, through the entrance of an entrance 185 of a seed tube 184, and out the exit 186 in the general direction of the arrow 187. The speed of the seed meter can control the rate of the delivery of the seed delivered to the furrow, and a seed-to-ground system can take into account the ground speed of the planter such that the seed will experience substantially zero velocity when planting in a formed furrow.

Figure 34:
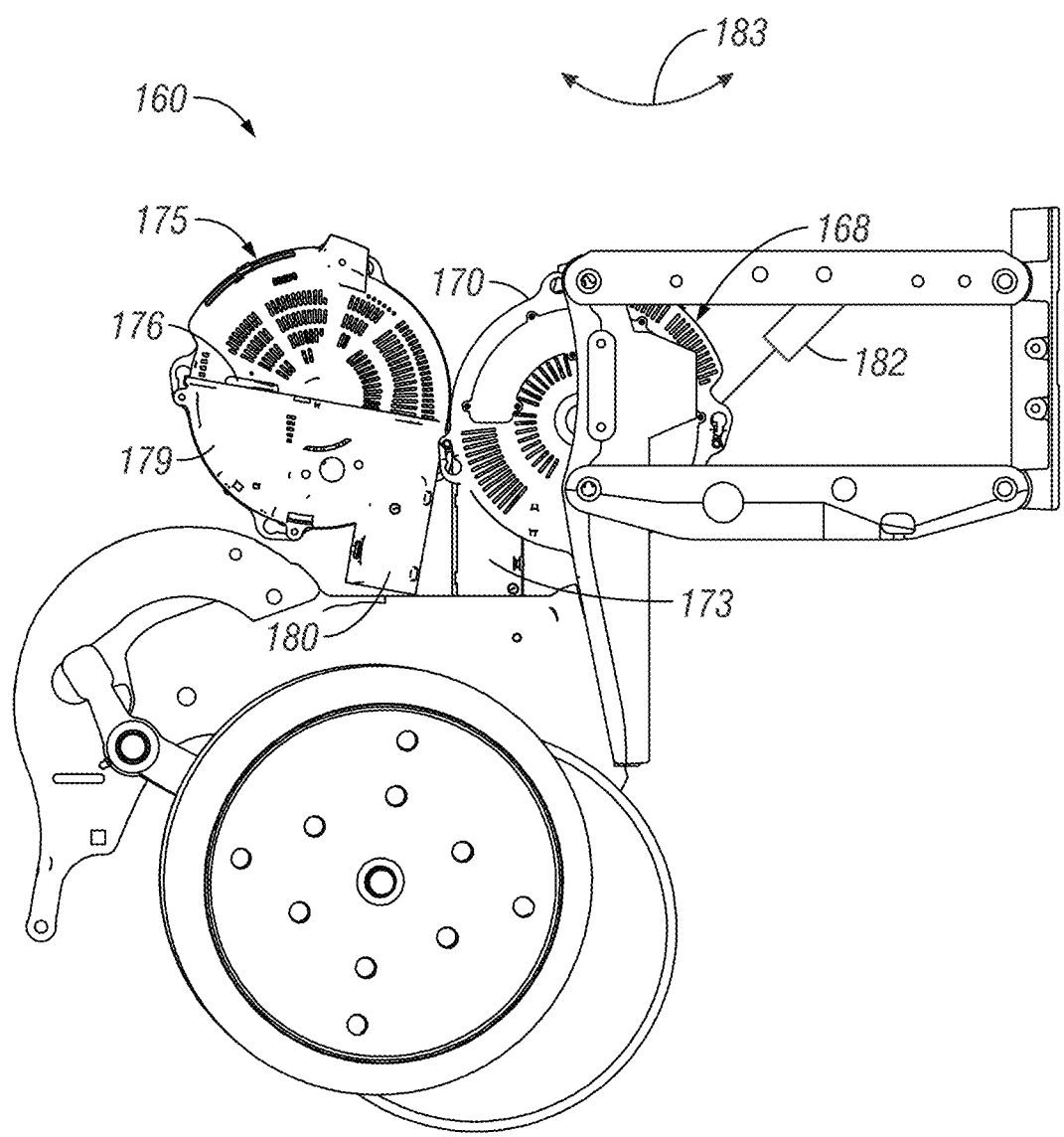
FIG. 34 is a side elevation view of the row unit of FIG. 33.
Figure 35:
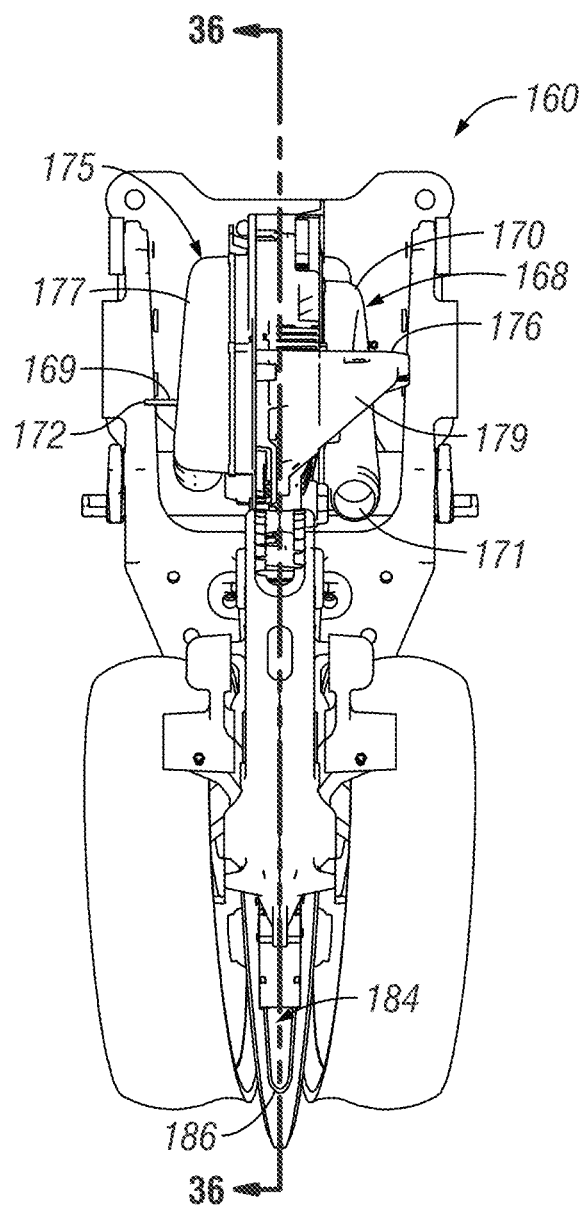
FIG. 35 is a rear view of the row unit of FIG. 33.
Figure 36:
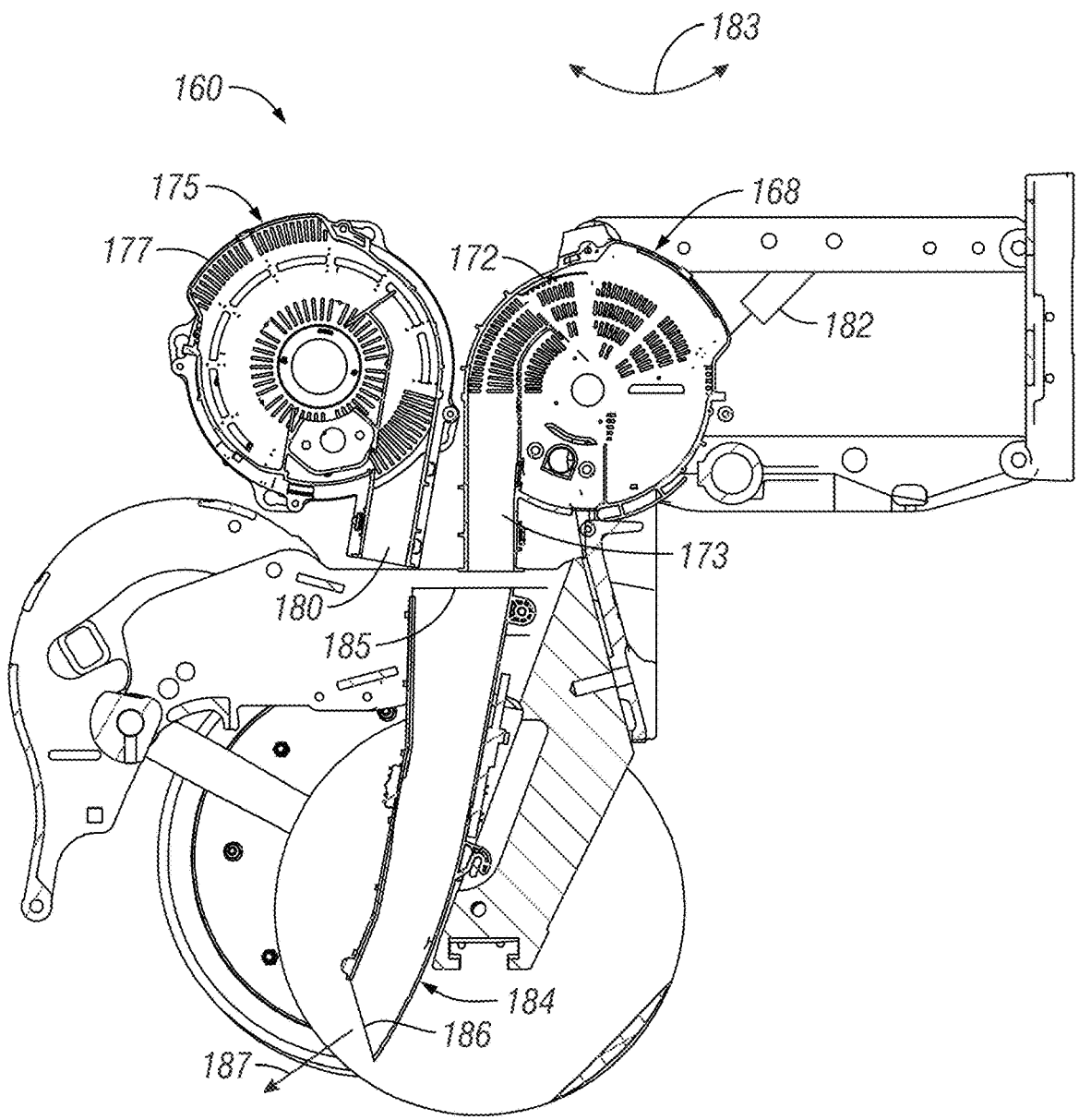
FIG. 36 is a sectional view of the row unit of FIG. 33 taken about line 36-36 of FIG. 35.
Figure 37:
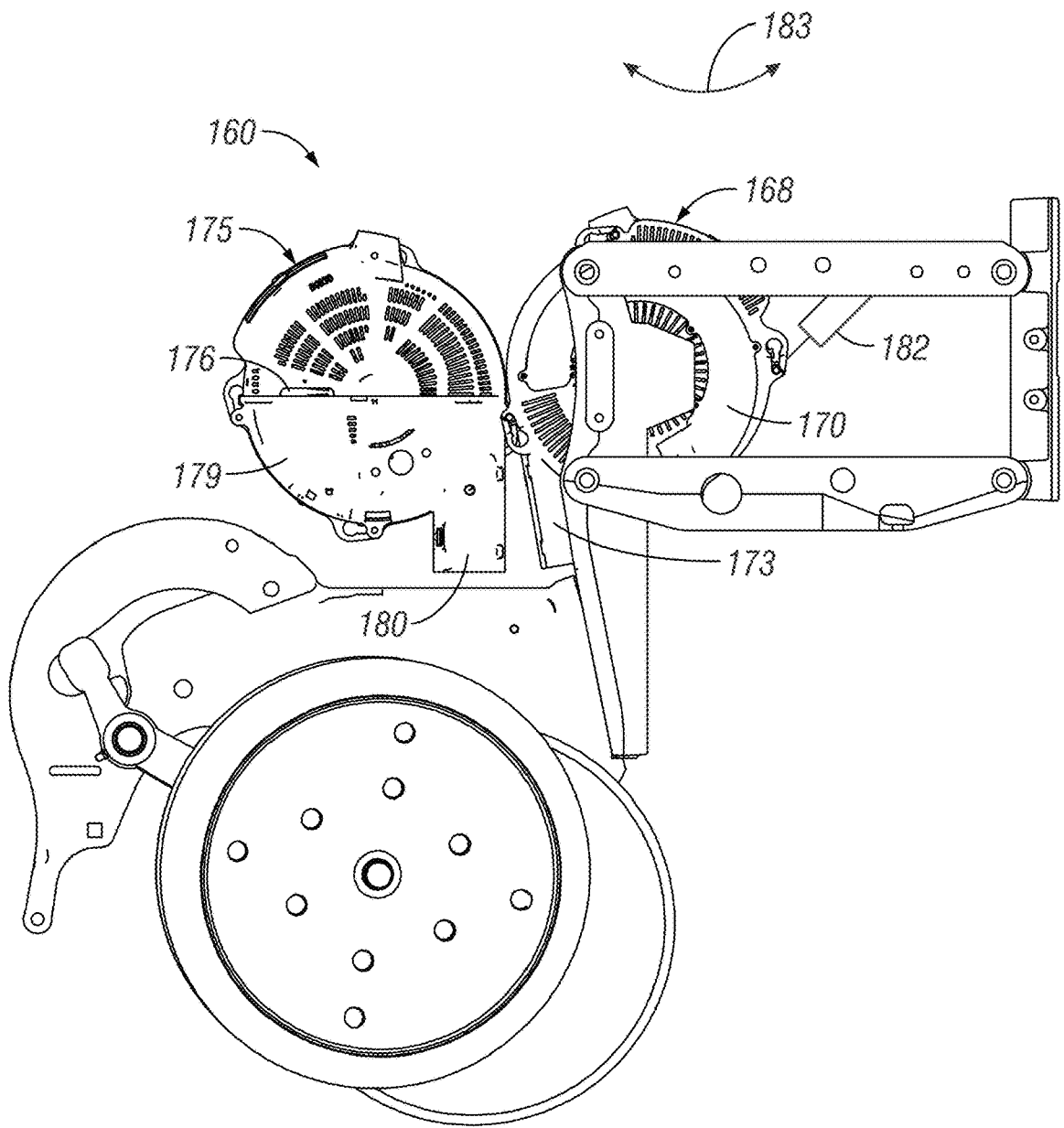
FIG. 37 is a side elevation view of the row unit of FIG. 33 with the seed meters rotated.
Figure 38:
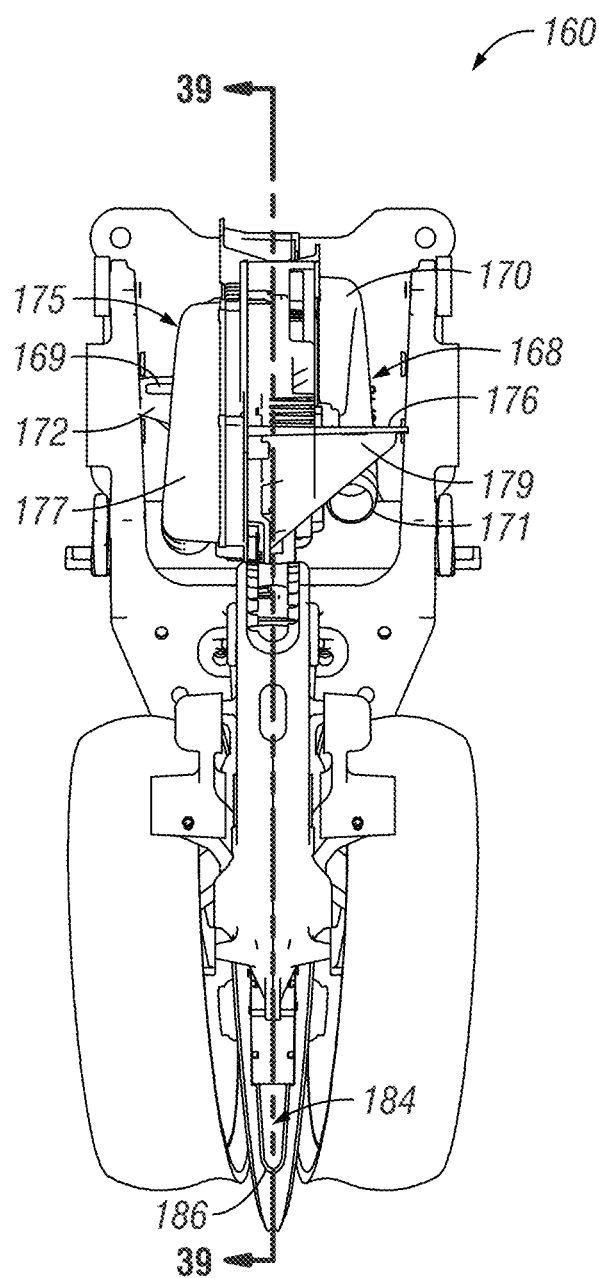
FIG. 38 is a rear view of the row unit of FIG. 33 with the seed meters rotated.
Figure 39:
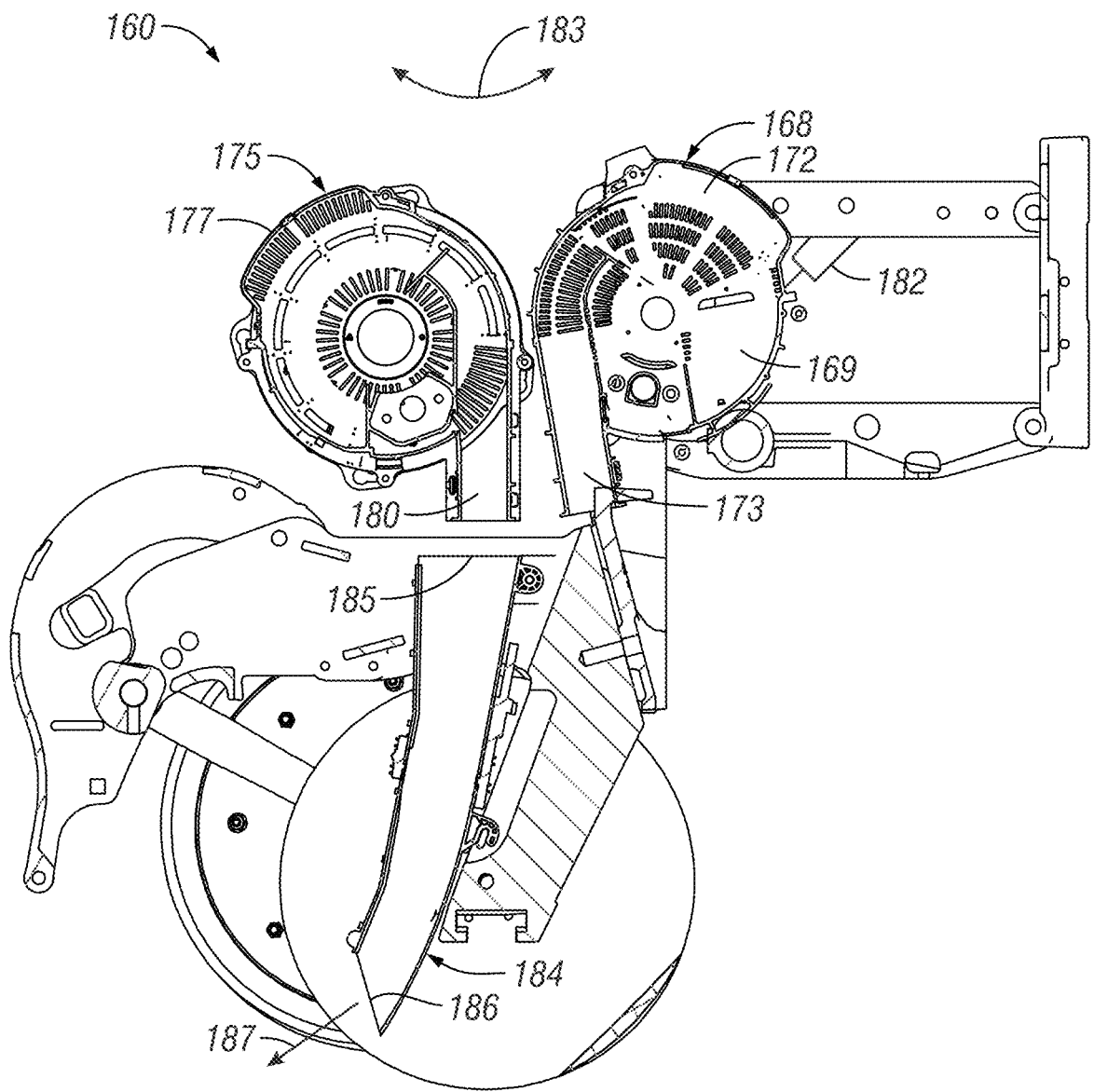
FIG. 39 is a sectional view of the row unit of FIG. 33 with the seed meters rotated and taken about line 39-39 of FIG. 38.
Figure 40:
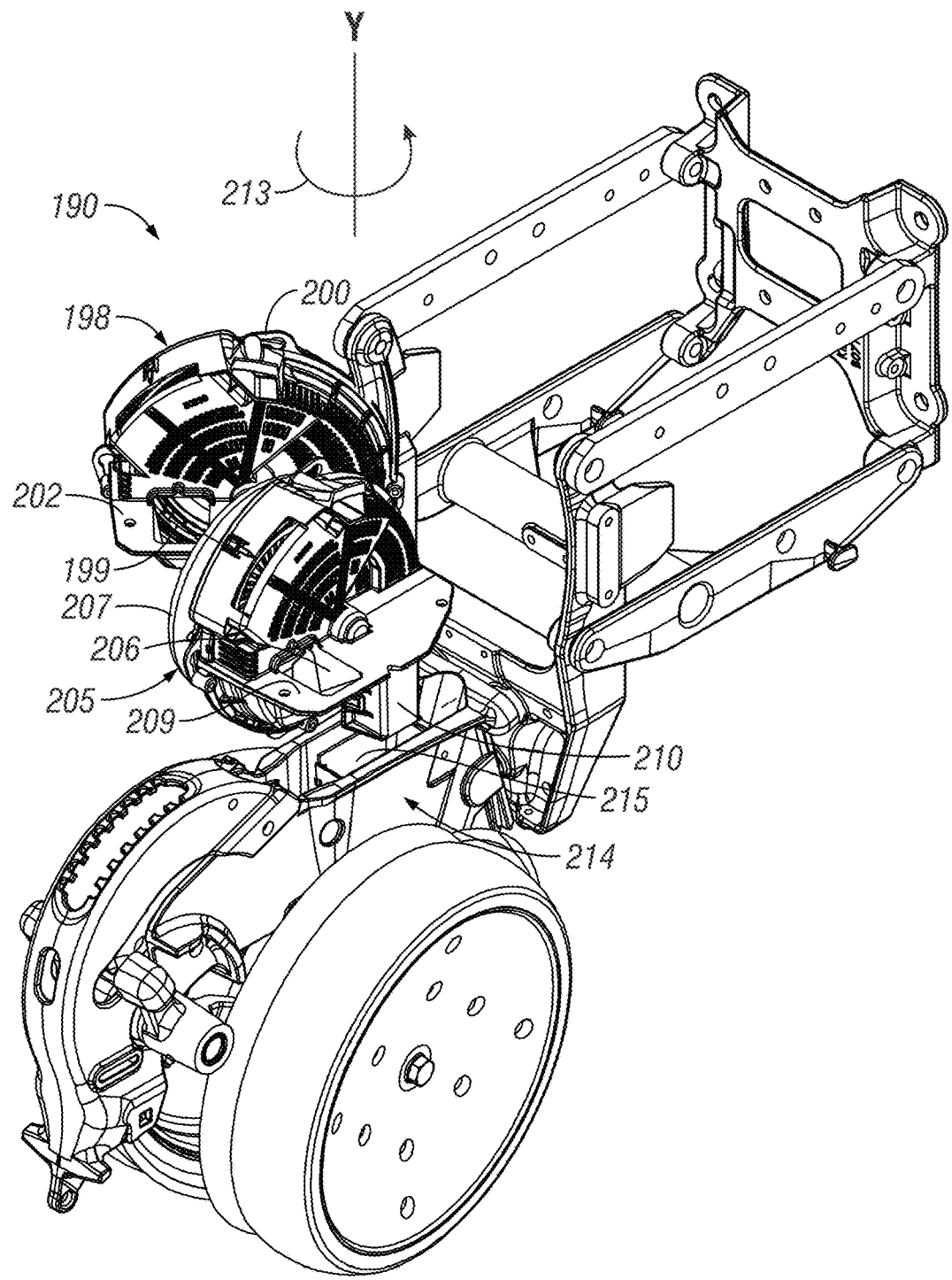
FIG. 40 is a perspective view of another row unit including aspects of the invention.
Figure 41:
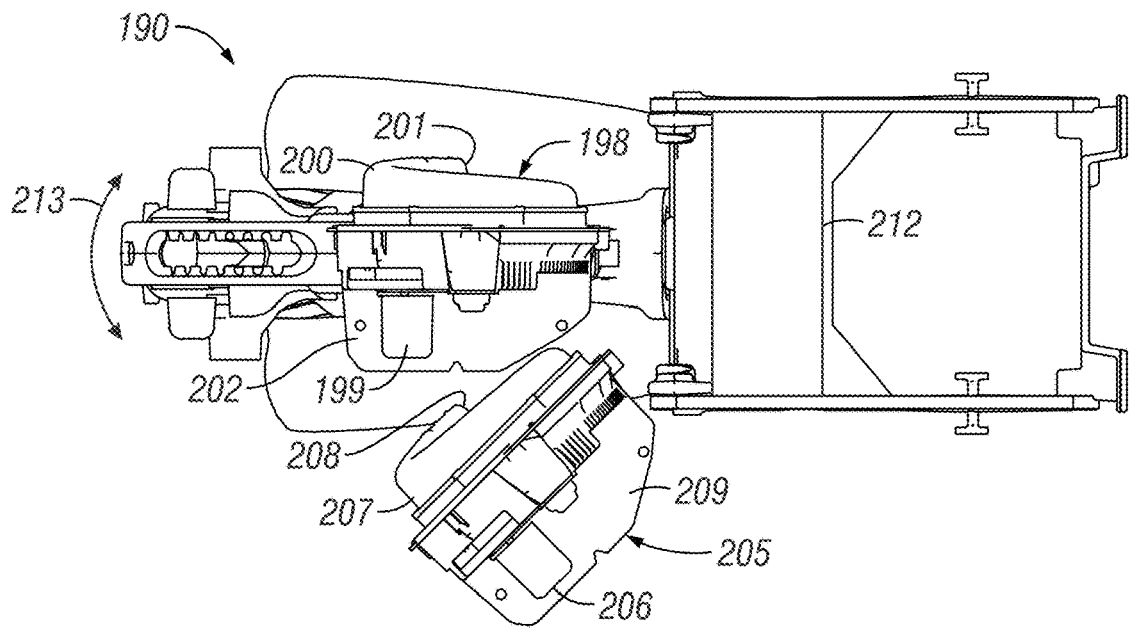
FIG. 41 is a top plan view of the row unit of FIG. 40.

However, when the system determines that a different seed type, hybrid and/or variety of seed is to be planted, the meters can be dynamically reconfigured to align the second meter with the seed tube 184. For example, as is shown in the figures, the seed meters 168, 175 are configured to be rotated about a generally horizontal axis in a manner that is shown by the arrow 183. The rotation of the meters, which can be done via a dynamic system and/or control 182, can selectively align which of said meters is aligned with the seed tube 184. While FIGS. 34-36 show the first meter aligned with the seed tube, FIGS. 37-39 show a situation in which the dynamic control 182 has rotated the seed meters such that the second seed meter 175 is now substantially aligned with the entrance 185 with the seed tube 184. Seed that has been collected in or that is otherwise associated with the seed pool 176 of the second seed meter 175 can be metered and released via the second seed chute 180, through the seed tube entrance 185, and out the seed tube exit 186 towards the direction of the arrow 187 as shown in FIG. 39.

The dynamic system and control 182 of the row unit 160 can be configured to rotate the seed meters as needed to selectively plant a desired seed hybrid, variety, and/or type in an ever changing manner to control the seed being planted at a particular location in a field and based upon known and obtained field conditions and/or other information, and which has been pre-determined or otherwise pre-plotted. Furthermore, the dynamic system and control 182 could be operated based upon on-the-go analysis of soil, seed, and/or weather conditions. For example, a sensing system, such as that shown and described in U.S. application Ser. No. 13/458,012, hereby incorporated in its entirety, could be utilized in which the sensing system obtains information on the fly, and even in front of the row units such that the seed type or variety to be planted at a particular location could be determined during planting.

It should be further appreciated that other components not explicitly shown and described that obtain or provide advantages or benefits that have been previously shown and described may also be utilized with the row unit 160 to best operate said row unit and plurality of seed meters mounted therewith. It should be further appreciated that, while the row unit shows two seed meters, any number of seed meters are contemplated to be used with the dynamically rotating system of the figures.

FIGS. 40-48 show yet another system in which a plurality of seed meters are mounted at a row unit 190 and configured to be dynamically rotated to selectively align one of the plurality of meters with a seed-to-ground delivery system in order to select a particular seed type, hybrid and/or variety to be planted in an ever changing manner as a planter moves through a field. However, contrary to the row unit 160 previously shown and described, the row unit 190 includes a dynamic system in which the plurality of seed meters is rotated about a substantially vertical axis.

As shown in the figures, the row unit 190 includes a first seed meter 198 and a second seed meter 205. The meters each include vacuum housings 200 and 207, seed housings 202 and 209, seed pools 199 and 206, vacuum or pressure inlets 201 and 208, and seed chutes 203 and 210. The components of the plurality of seed meters, and in this instance two seed meters, are similar to one another. The difference being the type, hybrid and/or variety seed being delivered to the seed meter and being planted thereby. Thus, while the row units 190 includes two seed meters capable of planting two separate types, hybrids and/or varieties, it should be appreciated that any number of seed meters and any number of different seed types, hybrids and/or varieties are contemplated to be planted using a similar system as that shown and described.

Figure 42:
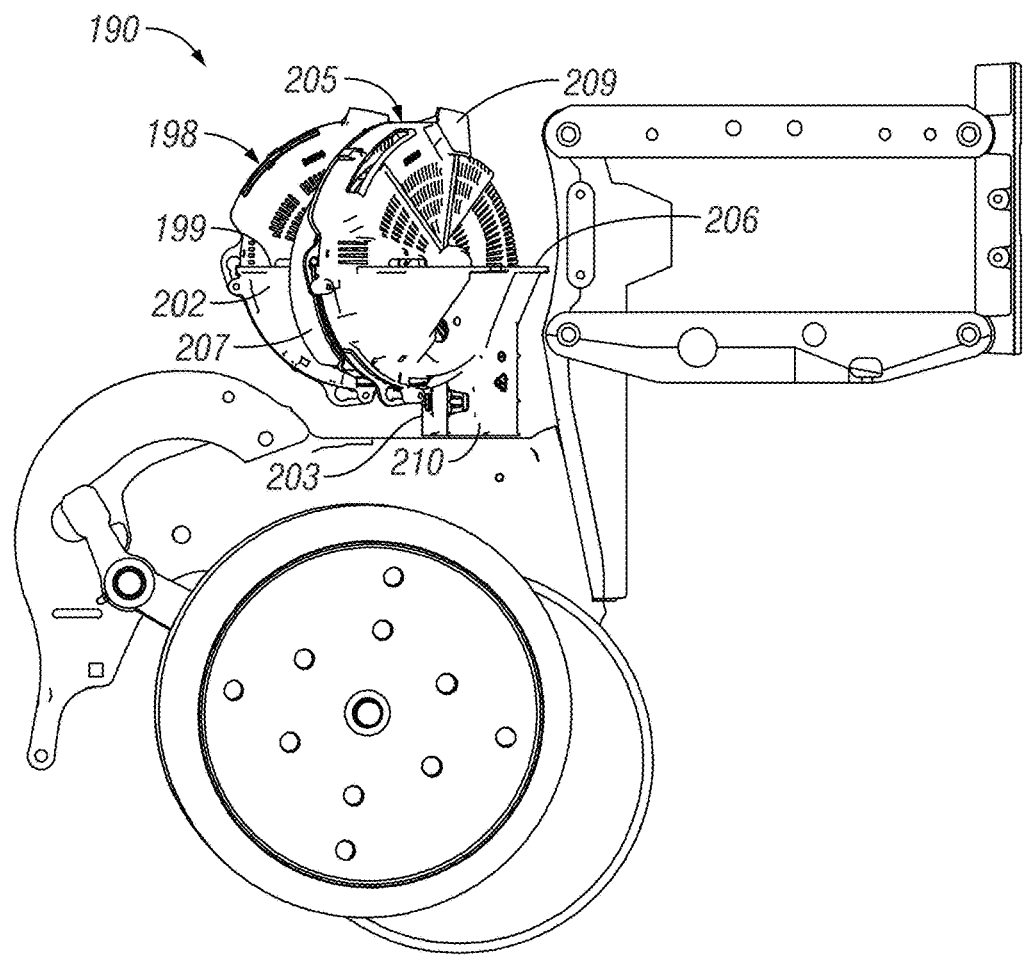
FIG. 42 is a side elevation view of the row unit of FIG. 40.
Figure 43:
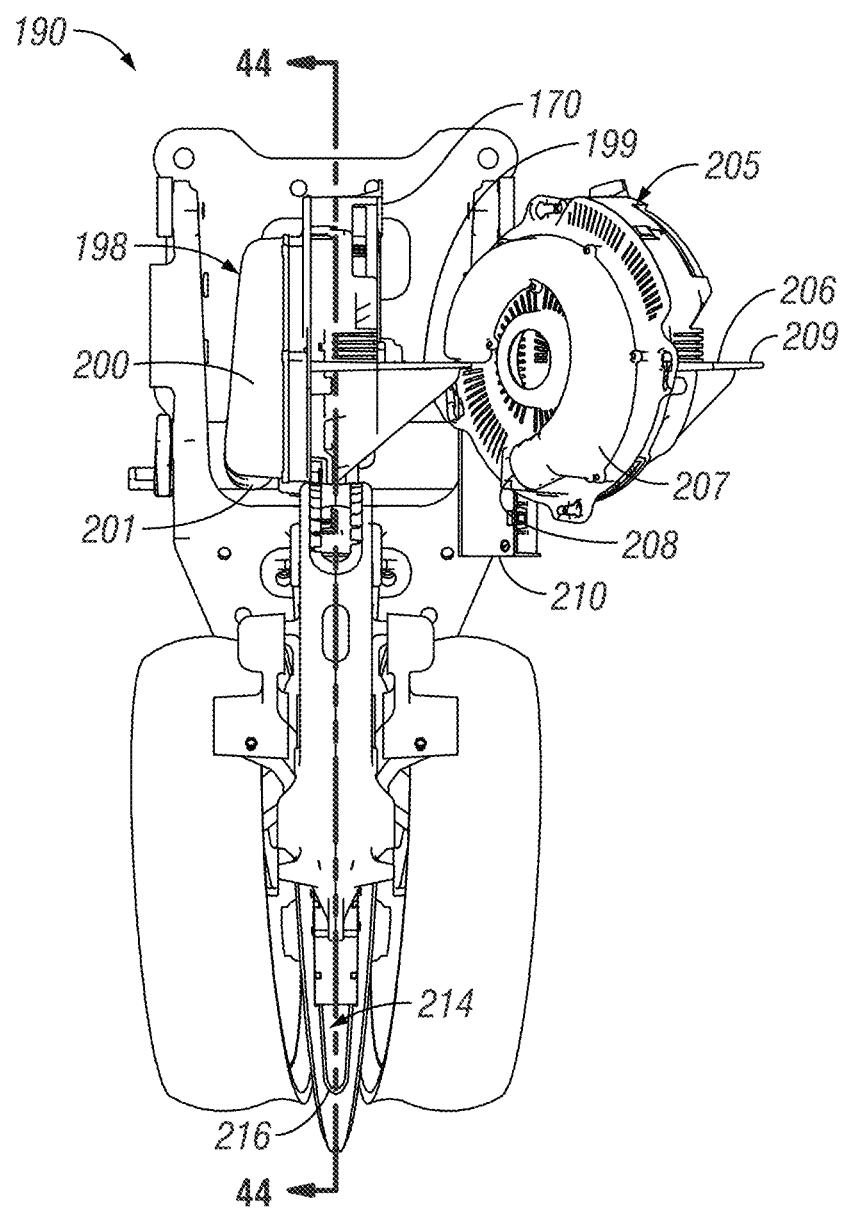
FIG. 43 is a rear view of the row unit of FIG. 40.
Figure 44:
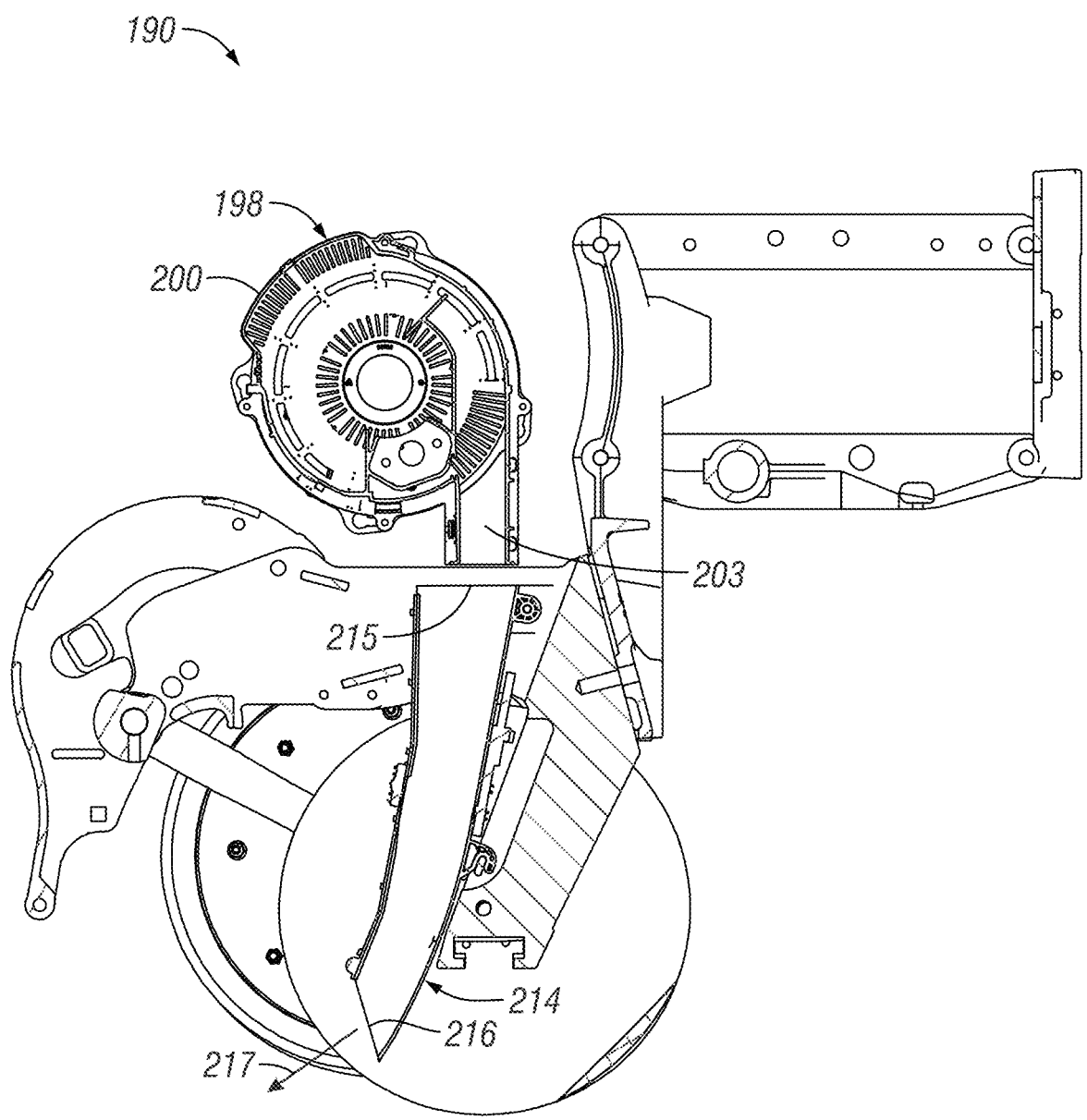
FIG. 44 is a sectional view of the row unit of FIG. 40 taken about line 44-44 or FIG. 43.

As shown in FIGS. 42-44, the first seed meter 198 is initially aligned such that the seed chute 203 thereof is aligned with an opening 215 of a seed tube 214. Therefore, seed being metered by the seed meter 198 can be passed through the seed chute 203, through the seed tube 214 and out the exit 216 thereof towards the direction of the arrow tube 217. As with the previously disclosed meters, a dedicated motor operably attached to the seed meter can aid in controlling the release of the seed such that the spacing between such seeds is obtained. Furthermore, a different seed-to-ground system besides the seed tube could be utilized such that the seed experiences relative zero velocity when exiting the seed-to-ground system and entering the formed furrow in the field.

However, when a system associated with the planter, row unit, or some combination thereof, determines that a different seed type, hybrid and/or variety is to be planted, a dynamic control system 212 could be operated to dynamically rotate the seed meters. This could be pre-plotted, or could be done on-the-fly, such as by use of the sensing system on the planter, tractor, or otherwise, and could be determined in front of the row units to determine which seed meter is to be activated (i.e., aligned with seed-to-ground) to plant the seed associated with said seed meter. As shown in the figures, the seed meters are rotatable in the direction of the arrow 213, which is generally about a vertical or substantially vertical axis. The dynamic control system, which can include pulleys, belts, gears, actuators, or some combination thereof, can rotate the seed meters such that the row unit moves from the configuration shown in FIG. 41 to the configuration shown in FIG. 45.

Figure 45:
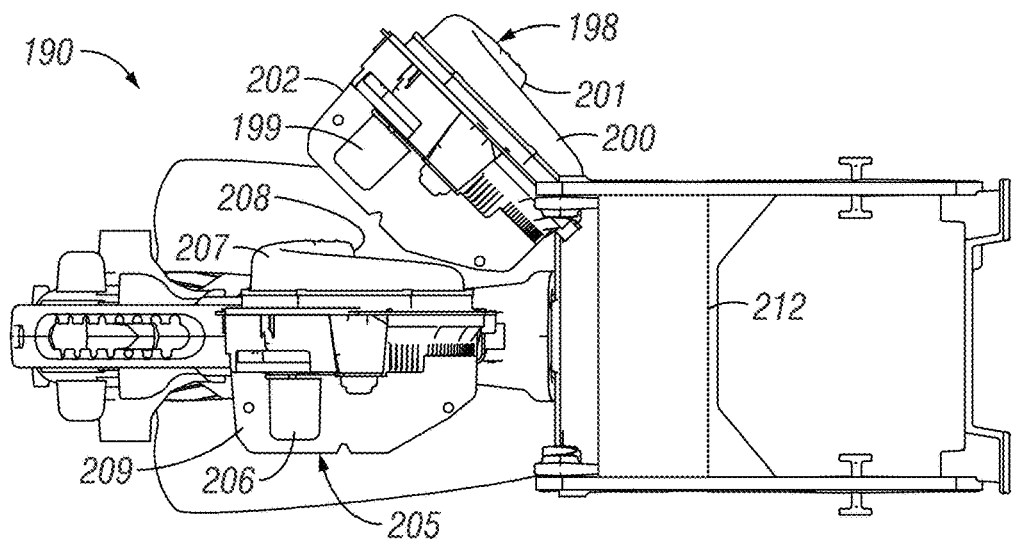
FIG. 45 is a top plan view of the row unit of FIG. 40 with the seed meters rotated.
Figure 46:
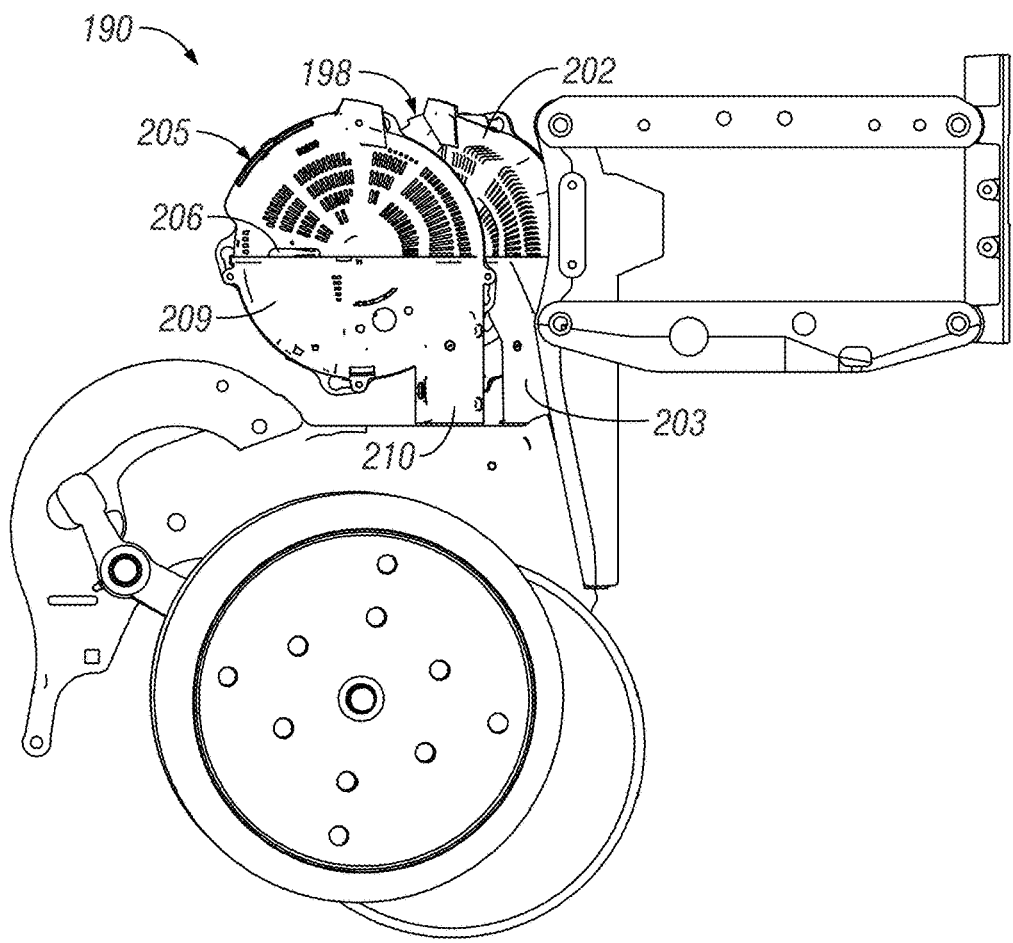
FIG. 46 is a side elevation view of the row unit of FIG. 40 with the seed meters rotated.
Figure 47:
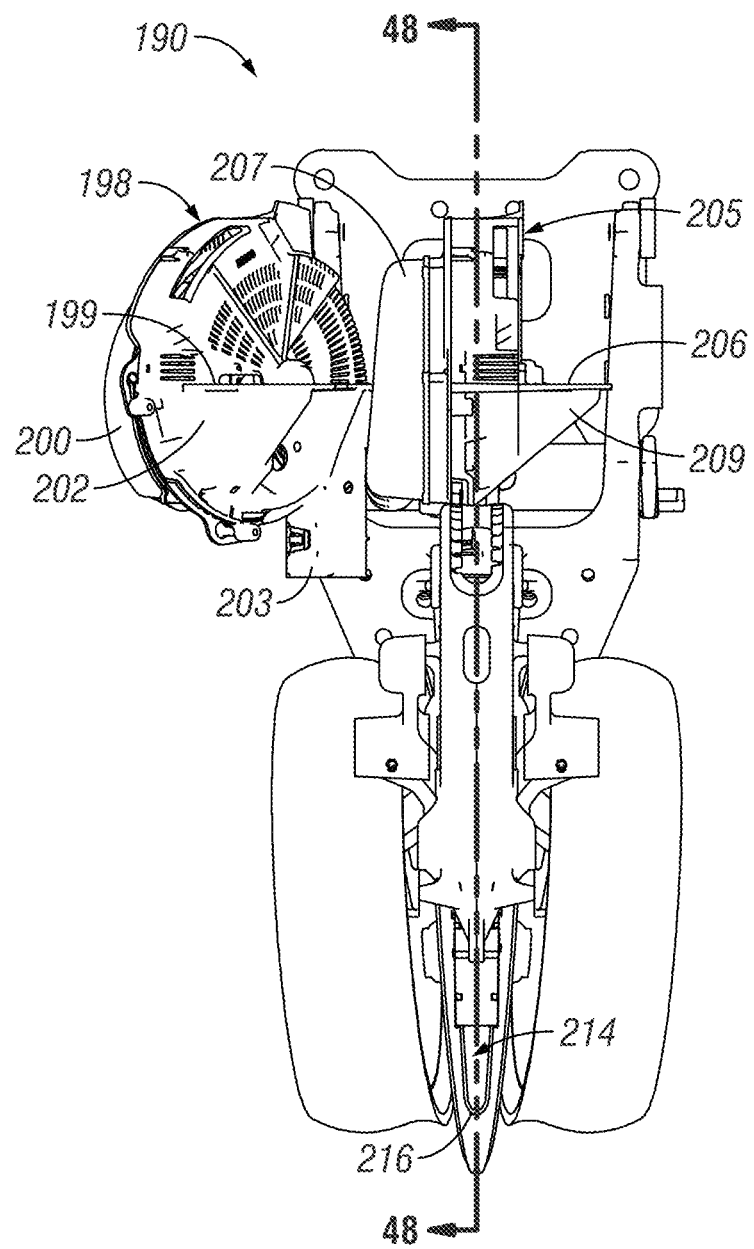
FIG. 47 is a rear view of the row unit of FIG. 40 with the seed meters rotated.
Figure 48:
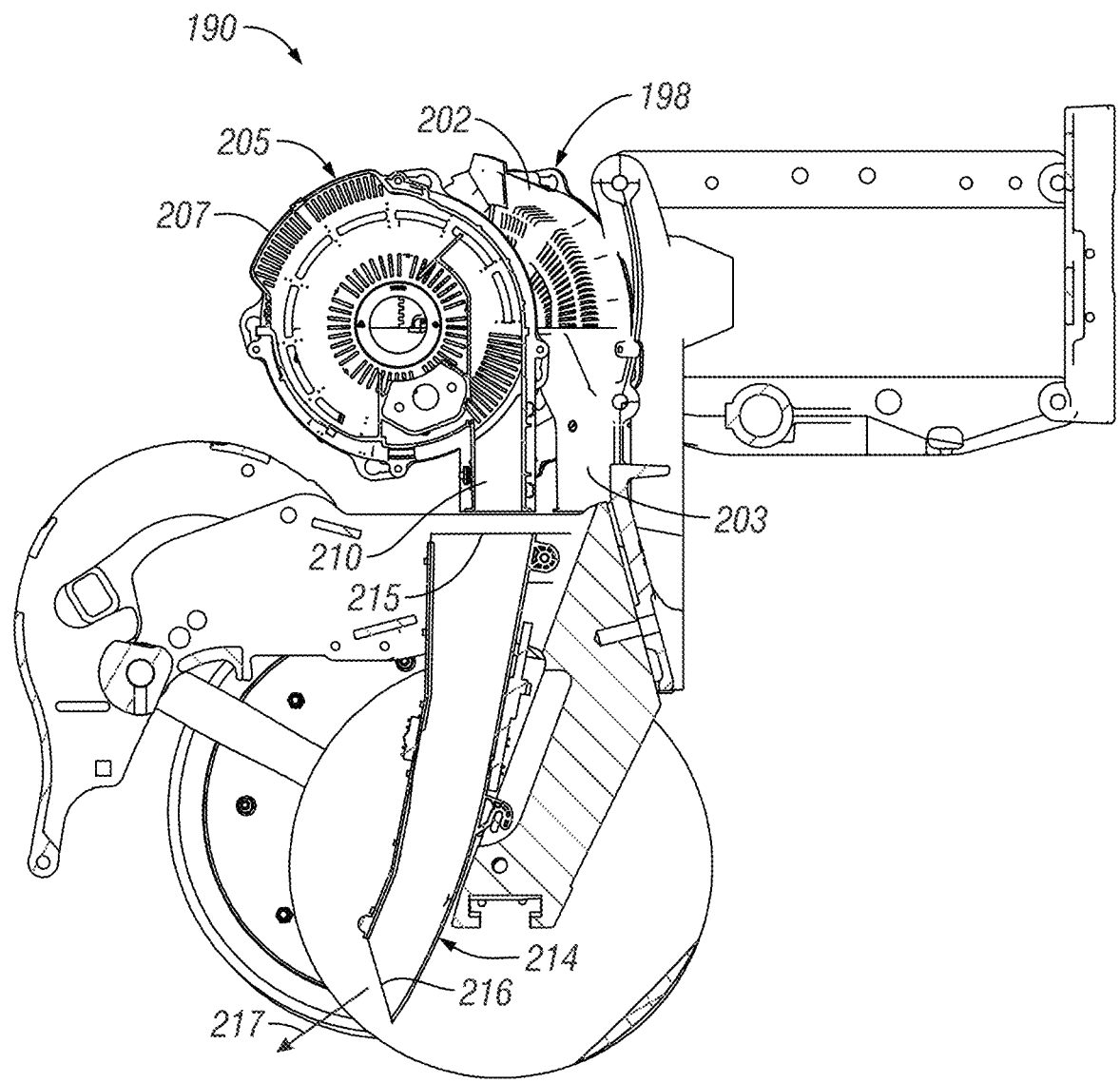
FIG. 48 is a sectional view of the row unit of FIG. 40 with the seed meters rotated and taken about line 48-48 or FIG. 47.
Figure 49:
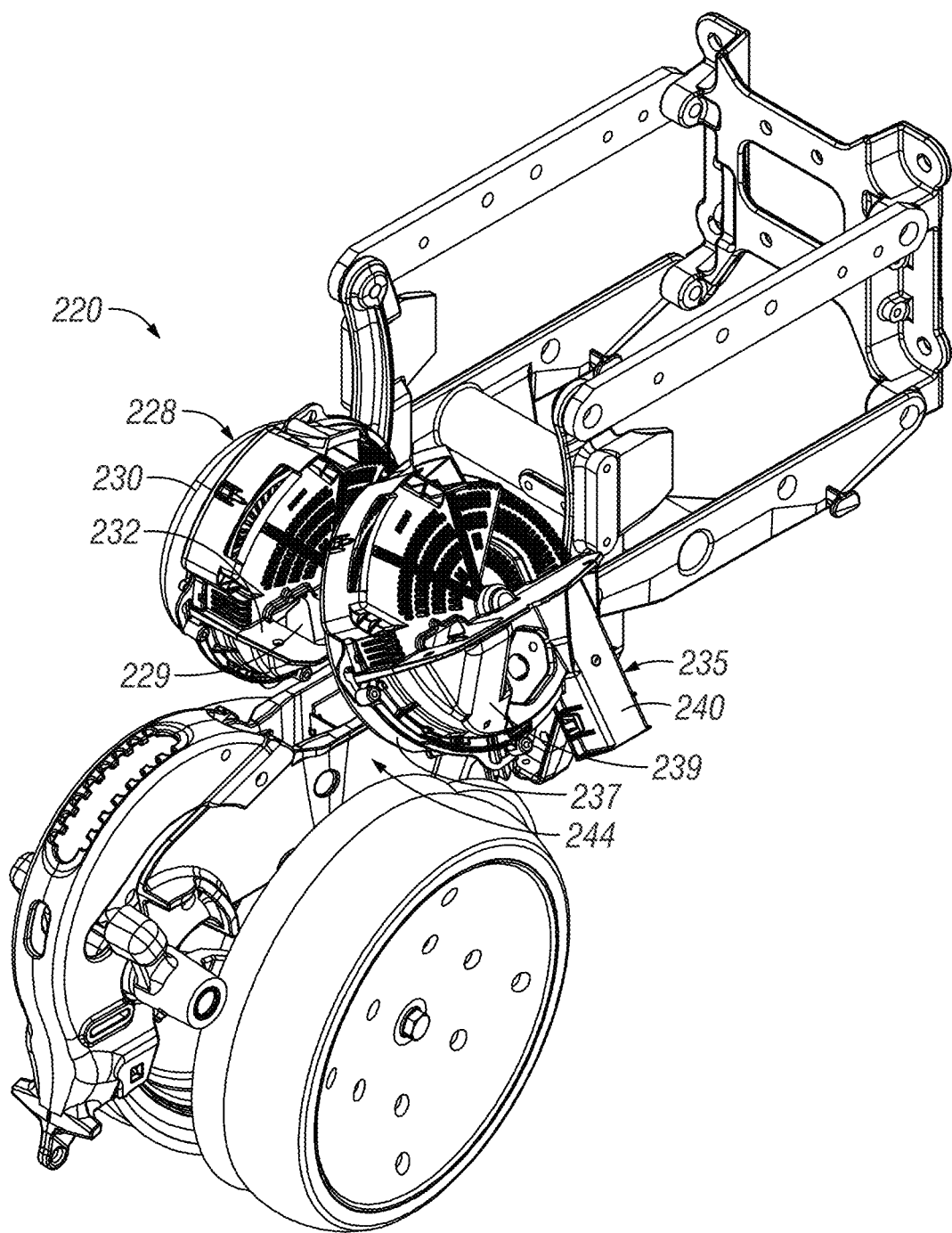
FIG. 49 is a perspective view of another row unit including aspects of the invention.

As shown in FIG. 45, the seed meters have been rotated such that the second seed meter 205 is now positioned generally over the seed tube 214 such that the second seed chute 210 is substantially or at least partially aligned with the opening 215 of the seed tube 214 so seed released therefrom will be directed to the seed tube. The seed that is metered by the second seed meter 205 can be passed through the seed tube and out the exit tube 216 towards direction 217 as shown in FIG. 48. The row unit 190 shown in the FIGS. 40-48 provides a system in which the on-the-go changing of the seed type or hybrid is possible. The dynamic control system 212 can provide a situation in which the seed meters are continuously or as needed rotated about the substantially vertical axis to align the seed meter associated with the desired seed to be aligned with the seed-to-ground system such that the desired seed is planted in the furrow. The amount of rotation may be exaggerated in the figures to describe the row unit, and slight amounts of rotation may be all that is required. The slight or small amount of rotation will allow a quick change from the alignment of one seed meter to another, and can also accommodate more than two seed meters being rotated about the same axis.

Additional components not explicitly shown and described with reference to FIGS. 40-48 which have been previously shown and described with regard to other embodiments, aspects and figures, may be considered to be part of the row unit 190.

FIGS. 49-55 show yet another row unit 220 in which a plurality of seed meters are rotatable to selectively align one of said plurality of meters with a seed-to-ground delivery system. As shown in the figures, the first and second seed meter 228, 235 are provided with the row unit 220, with the seed meters being rotatable about a substantially horizontal axis extending longitudinally with the row unit. The seed meters each include housings with vacuum housings 230 and 237, seed housings 232 and 239, seed pools 229 and 236, vacuum inlets 231 and 238, and seed chutes 233 and 240, respectively. Thus, the seed meters themselves are similar to those previously shown and described. It is noted that the meters will further include motors dedicated for operating each of said meters, however.

Figure 50:
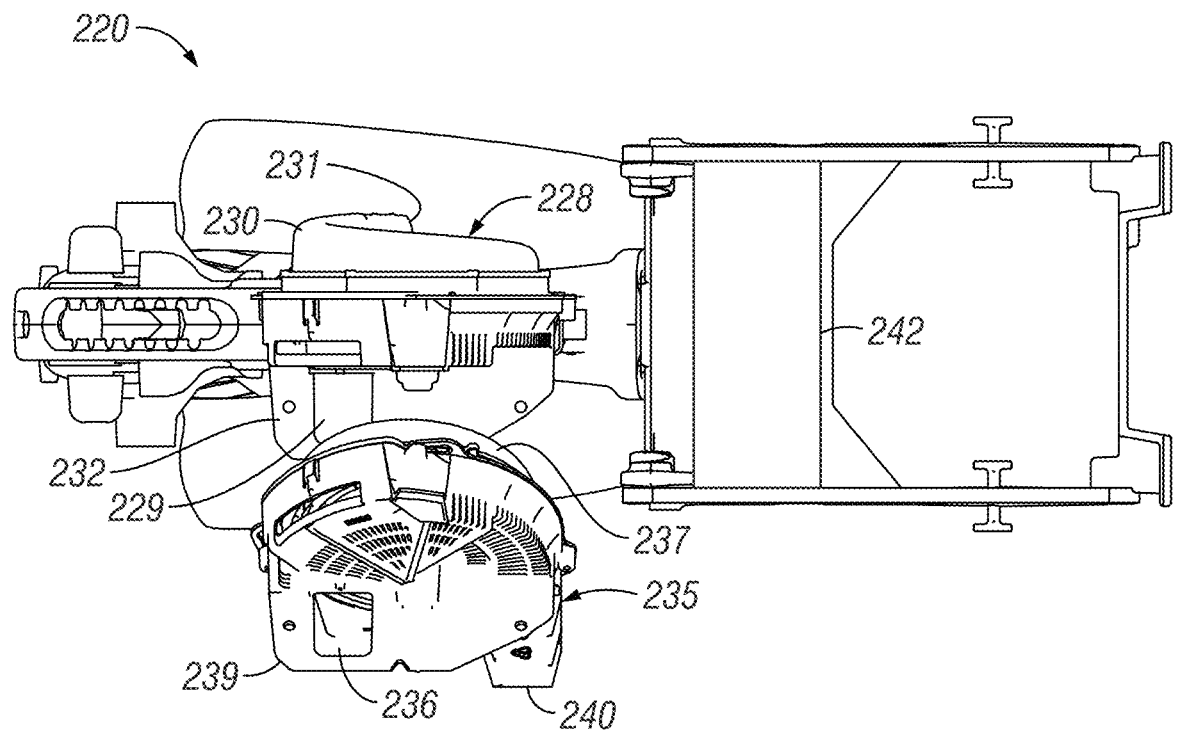
FIG. 50 is a top plan view of the row unit of FIG. 49.
Figure 51:
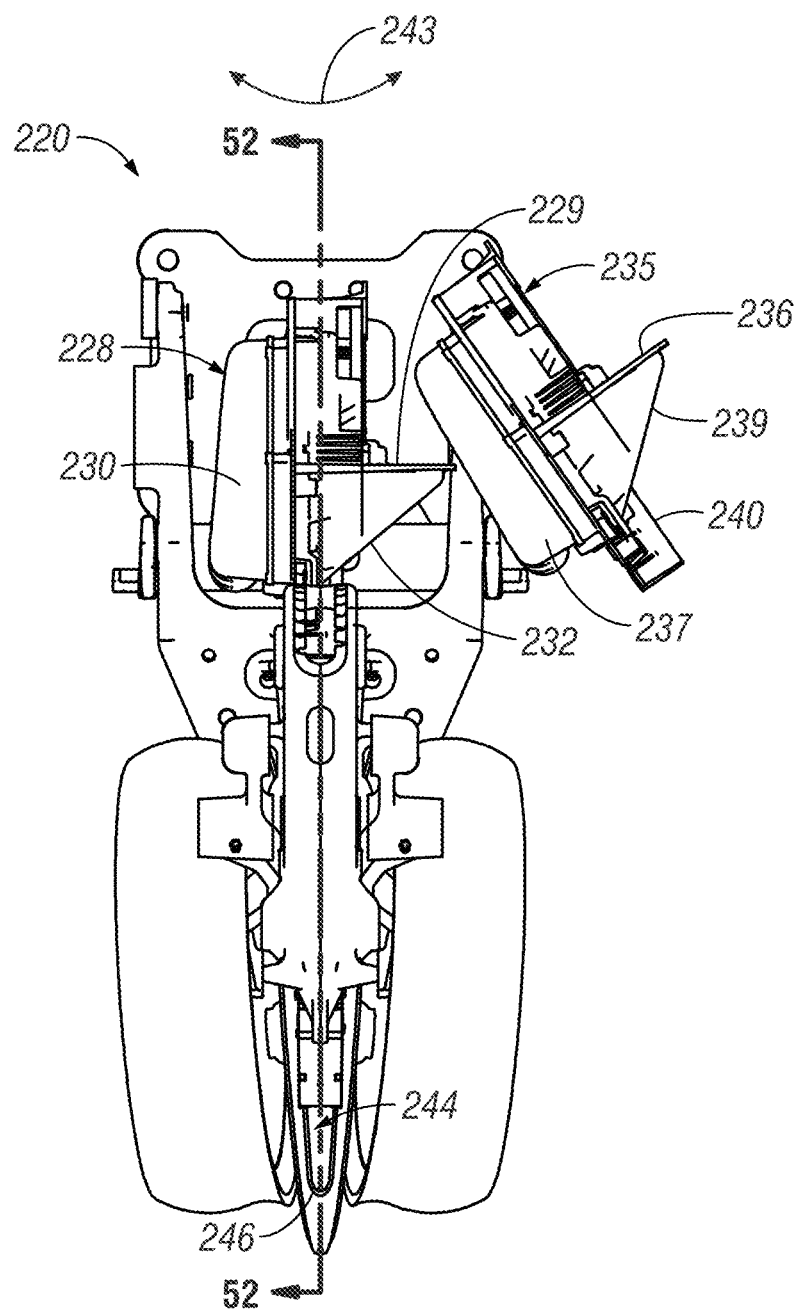
FIG. 51 is a rear view of the row unit of FIG. 49.
Figure 52:
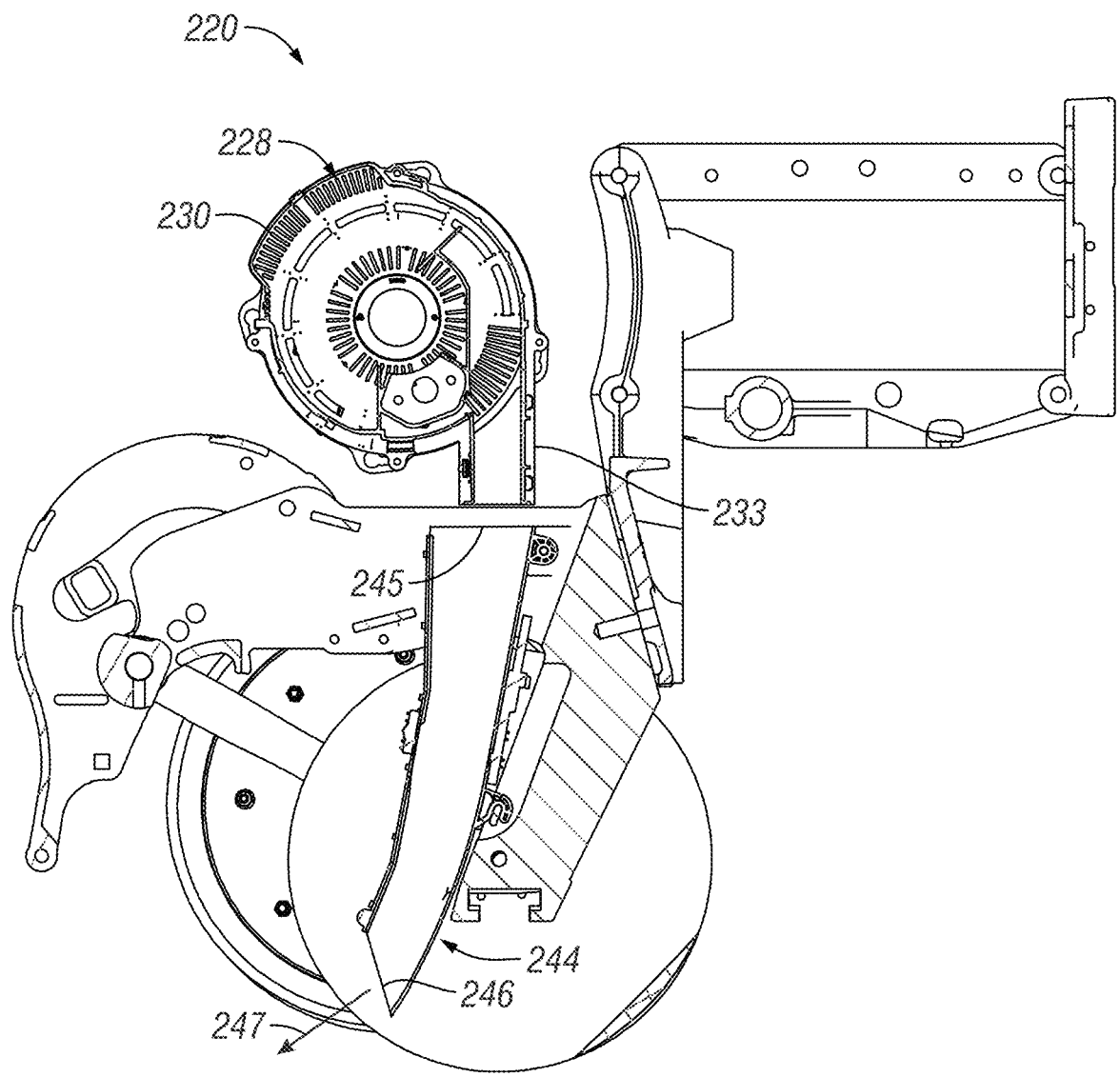
FIG. 52 is a sectional view of the row unit of FIG. 49 taken about line 52-52 of FIG. 51.
Figure 53:
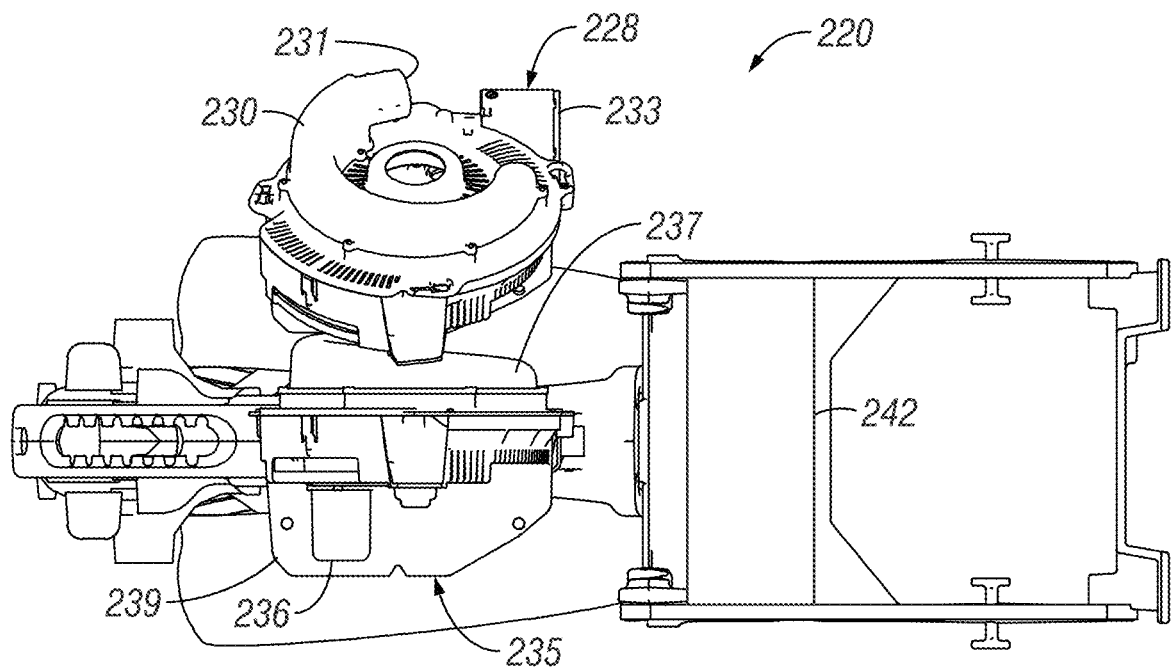
FIG. 53 is a top view of the row unit of FIG. 49 with the seed meters rotated.
Figure 54:
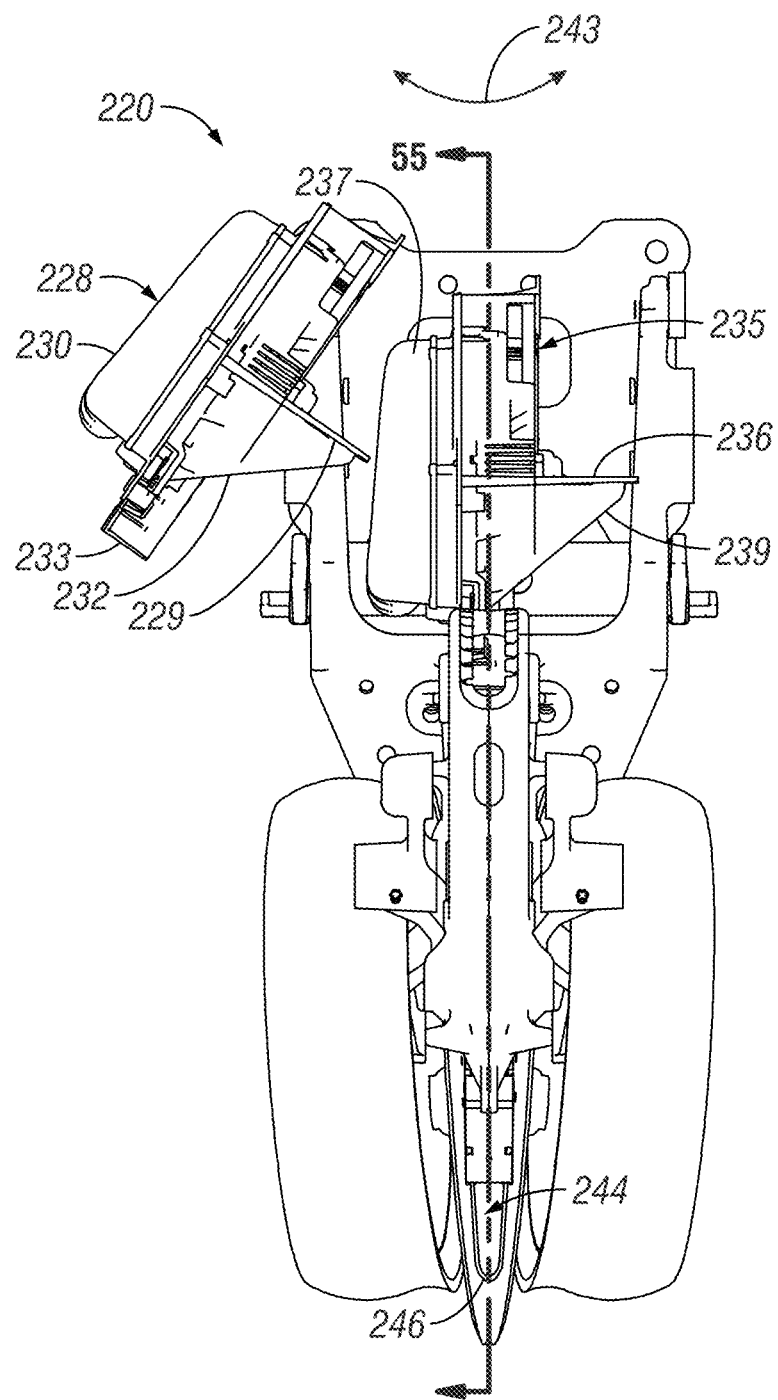
FIG. 54 is a rear view of the row unit of FIG. 49 with the seed meters rotated.
Figure 55:
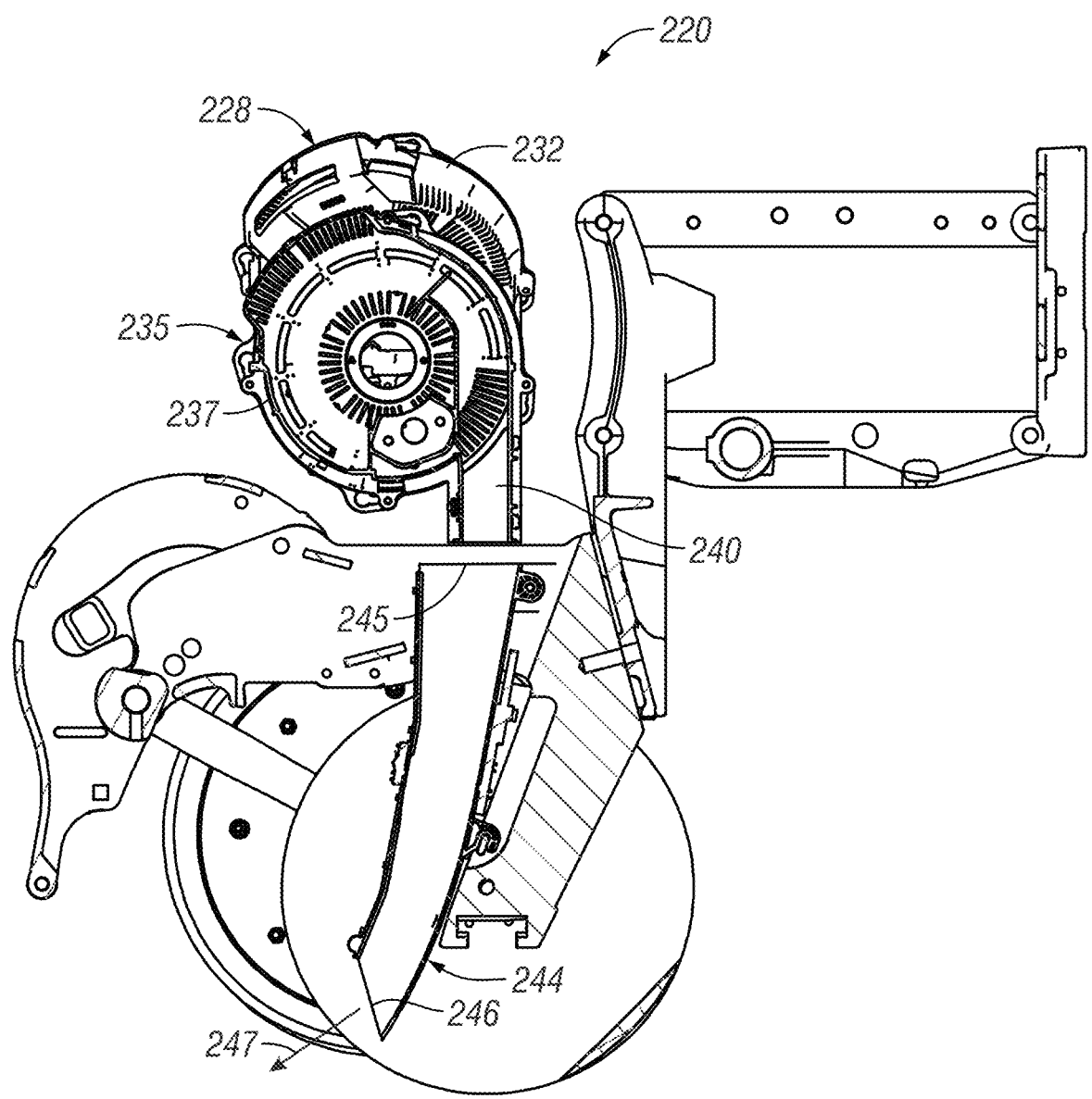
FIG. 55 is a sectional view of the row unit of FIG. 49 with the seed meters rotated and taken about line 55-55 of FIG. 54.
Figure 56:
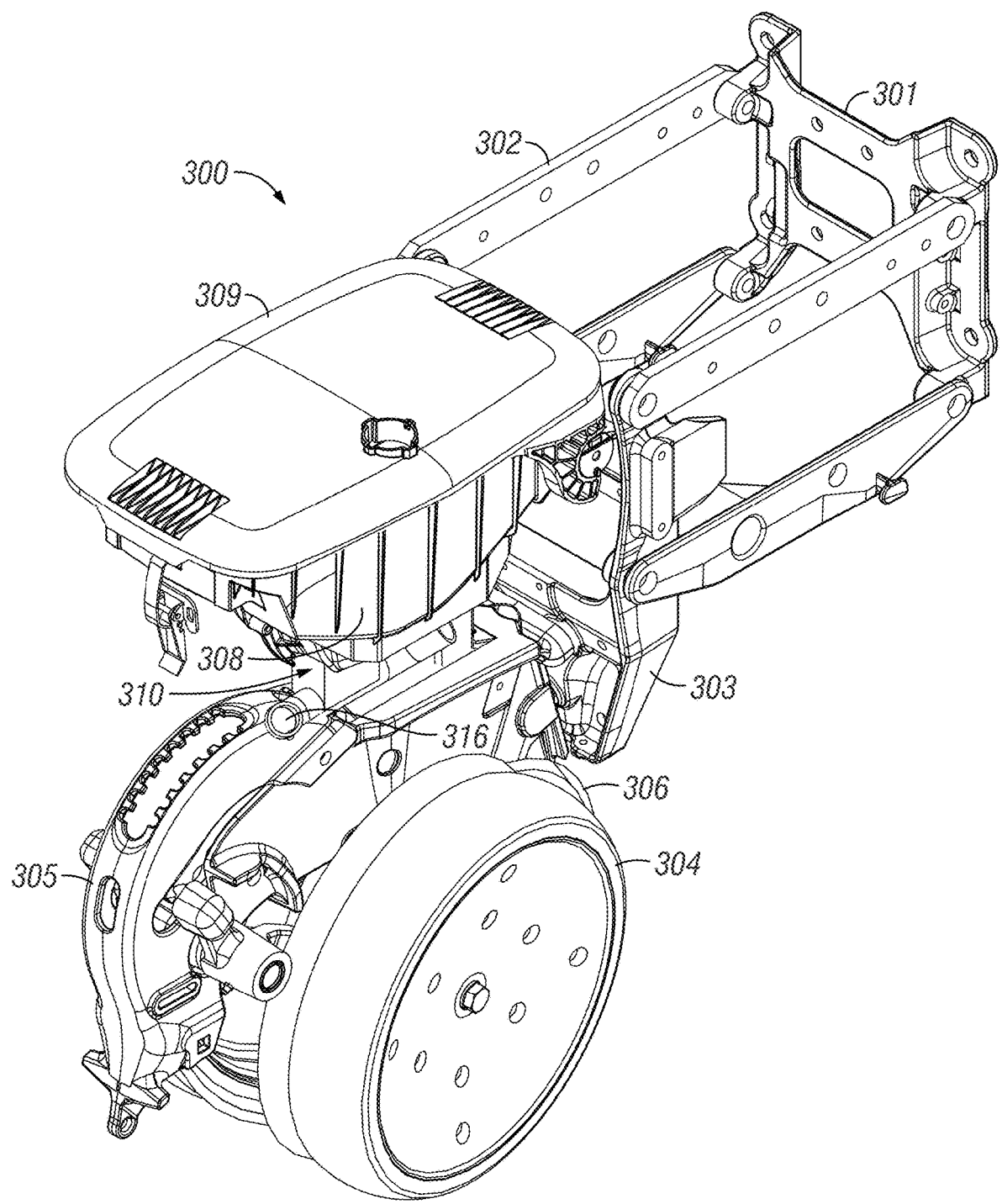
FIG. 56 is a perspective view of yet another row unit including aspects of the invention.
Figure 57:
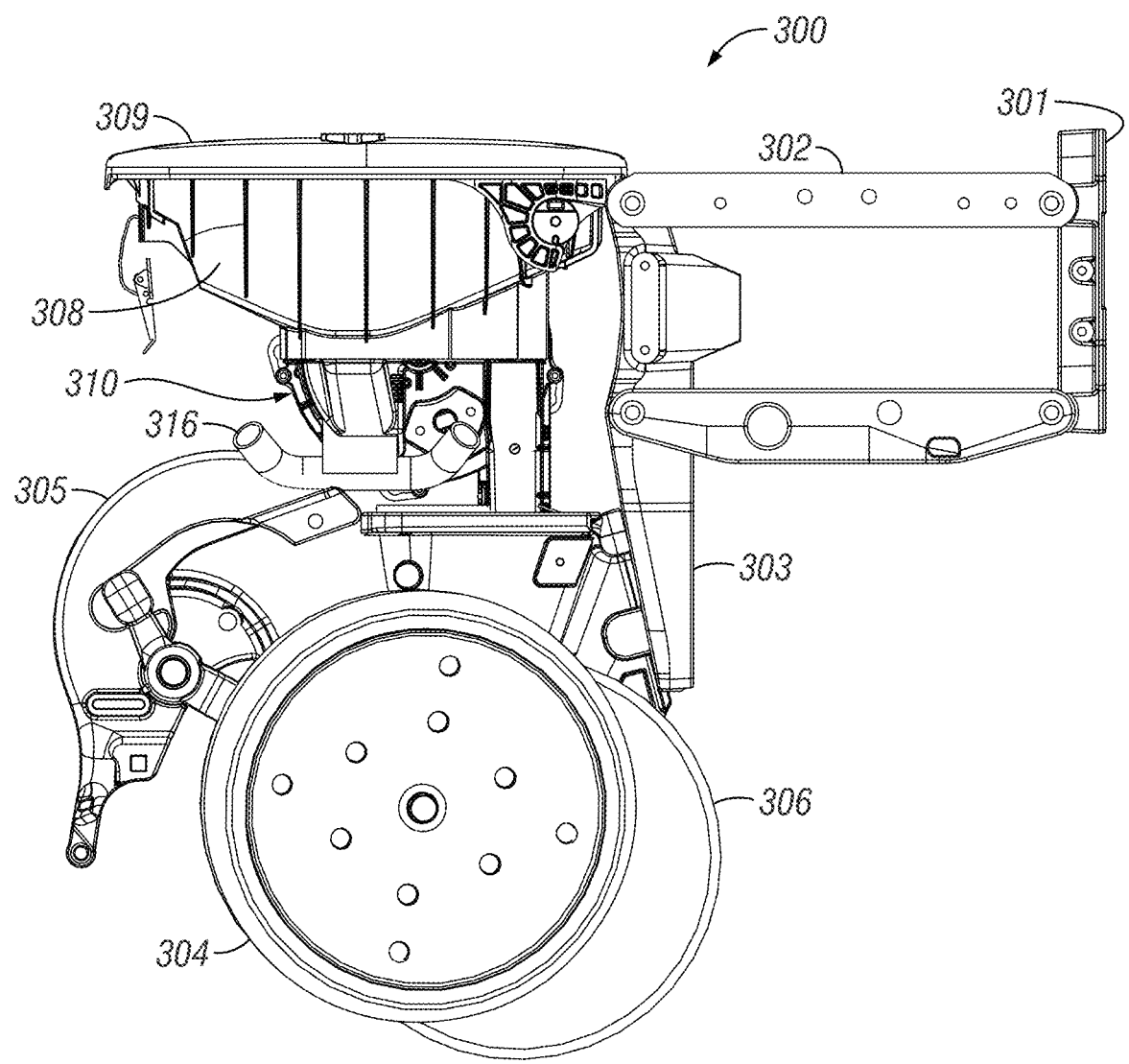
FIG. 57 is a side elevation view of the row unit of FIG. 56.
Figure 58:
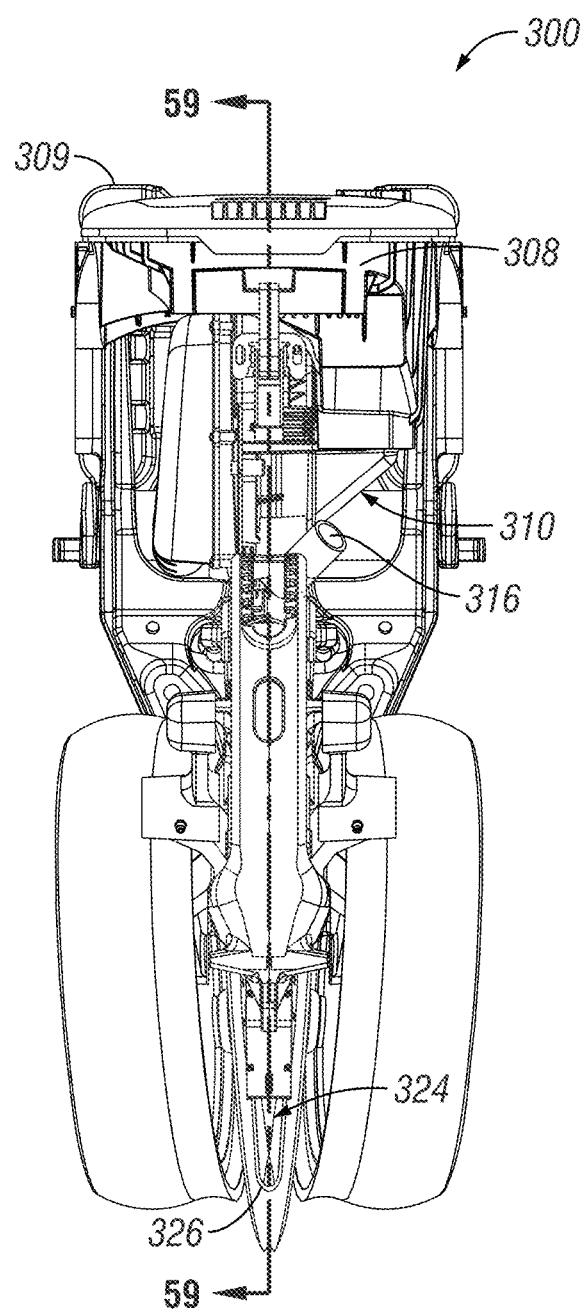
FIG. 58 is a rear view of the row unit of FIG. 56.

As shown in FIGS. 50-52, the first seed meter 228 is aligned such that the seed exit chute 233 is substantially vertical and is also aligned with an opening 245 of the seed tube 244. Seed that has been delivered to or is otherwise stored at the first seed meter 228 will be metered and passed through the seed tube and out the exit 246 towards the direction of the arrow 247. The seed will be planted via the first seed meter until an intelligent controller or other system associated with the planter, row unit, or some combination thereof determines that a different type, hybrid and/or variety of seed is to be planted, at least temporarily.

At such a point, a dynamic control mechanism 242 can be activated to rotate the first and second seed meters about the substantially horizontal axis extending in a longitudinal manner of the row unit to selectively align the second seed meter for planting. This is shown best in FIGS. 53-55. Note that the seed chute 240 of the second seed meter 235 is now in a substantially vertical orientation and is aligned with the opening 245 of the seed tube 244. The seed meter can be activated such that the seed metered by said second meter 235 is passed through the seed tube 244 and out the exit 246 in the direction of the arrow 247. The seed is thus planted via the second seed meter and can continue until the system determines that the seed of the first seed meter needs to be planted, which may be for only a single seed. This can be based on field conditions, soil conditions, temperature, environmental conditions, climate, and the like.

Therefore, the row unit 220 includes a system that allows the two or more seed meters to be rotated about the axis in the manner of the arrow 243 shown in the figures. The dynamic control operates to rotate the meters such that at least one of the plurality of meters will be aligned with the seed-to-ground system for planting.

It should be appreciated that the dynamic translation and rotation systems of the row units shown and described can be combined with one another or with the more statically oriented row units in any manner to provide for additional variations for the row units. For example, when more than two seed meters are associated with a row unit, there may be forward and aft sets or pairs of seed meters wherein the pairs can be both translated and/or rotated in a manner such that one or more of the seed meters is aligned with a seed-to-ground system to direct seed metered by said meter towards a furrow created in the ground. Thus, while the row units of the invention have been shown and described with regard to two meters, it is further contemplated that any number of meters be utilized with any of the row units of the invention. Still further, it is to be appreciated that the systems provided show and describe a system in which a near instantaneous change of one seed type, hybrid and/or variety can be changed to plant a second and separate seed type, hybrid and/or variety in an on-the-go manner such that a field can be optimized to be planted with various seed hybrids that can provide the highest possible yield outcome for a crop.

As has been mentioned, the field can be pre-plotted or programmed to determine the optimal seed hybrid or type to be planted for the variable locations through a field. Agronomists, agronomy information, climate information, and field information can all be utilized to determine the optimal type of seed to be planted throughout the field. For example, climate conditions and field testing associated with the soil moisture content, soil temperature, soil nutrient level, and other conditions can provide a vast amount of information such that one seed optimal for a particular location would not be optimal for a location just 18 inches on one side or the other. Therefore, as each of the row units can be equipped to plant one of a plurality of types of seed via the pluralities of seed meters associated with the row units, side-by-side row units can be planting separate seed types and can continuously change as needed throughout the field.

Alternatively, the field, soil, and or other conditions associated with planting could be determined on the fly as the planter and tractor move through the field. As previously disclosed, a sensing system could be located at the tractor, planter, row unit, or in multiple places such that a sensor tracks soil and/or seed characteristics in a real time basis to communicate to the intelligent control and/or row units to selectively activate one of the plurality of seed meters (static, dynamic, or some combination thereof) to plant a seed associated with the seed meter that will have the best chance to thrive in said conditions.

FIGS. 56-59 show a row unit 300 equipped with a queuing system for use with a single seed meter or which can be used with any combination of any of the other row units disclosed. The queuing system, as will be understood, provides for yet an additional way to more efficiently plant a plurality of seed types, varieties, and/or hybrids in a single field without having to continuously stop and change the seed type of a planter. Instead, multiple seed types can be provided via multiple bulk tanks or other seed housings and the system can be utilized to on-the-go change the seed being planted.

Therefore, as shown in FIGS. 56-59, a row unit 300 is provided. The row unit 300 includes components such as a mount 301 for mounting the row unit to a planter toolbar, a linkage 302, a frame 303, gauge wheels 304, a depth adjustment mechanism 305, and opener wheels 306. Furthermore, a seed meter 310 is provided with the row unit 300. Attached to the seed meter 310 is a mini hopper 308 with a hopper lid 309 covering. The mini hopper 308 may be of the sort shown and described in U.S. application Ser. No. 14/176,198, which is herein incorporated by reference in its entirety. The hopper may be a mechanism to receive seed from a bulk tank and to store at least some seed at the row unit without having to fill the seed meter completely. While a single seed meter 310 is shown with the row unit 300, additional aspects of the row unit will provide that the single row unit can plant one of a plurality of seed types, varieties, and/or hybrids at said row unit and with said single seed meter 310.

Figure 59:
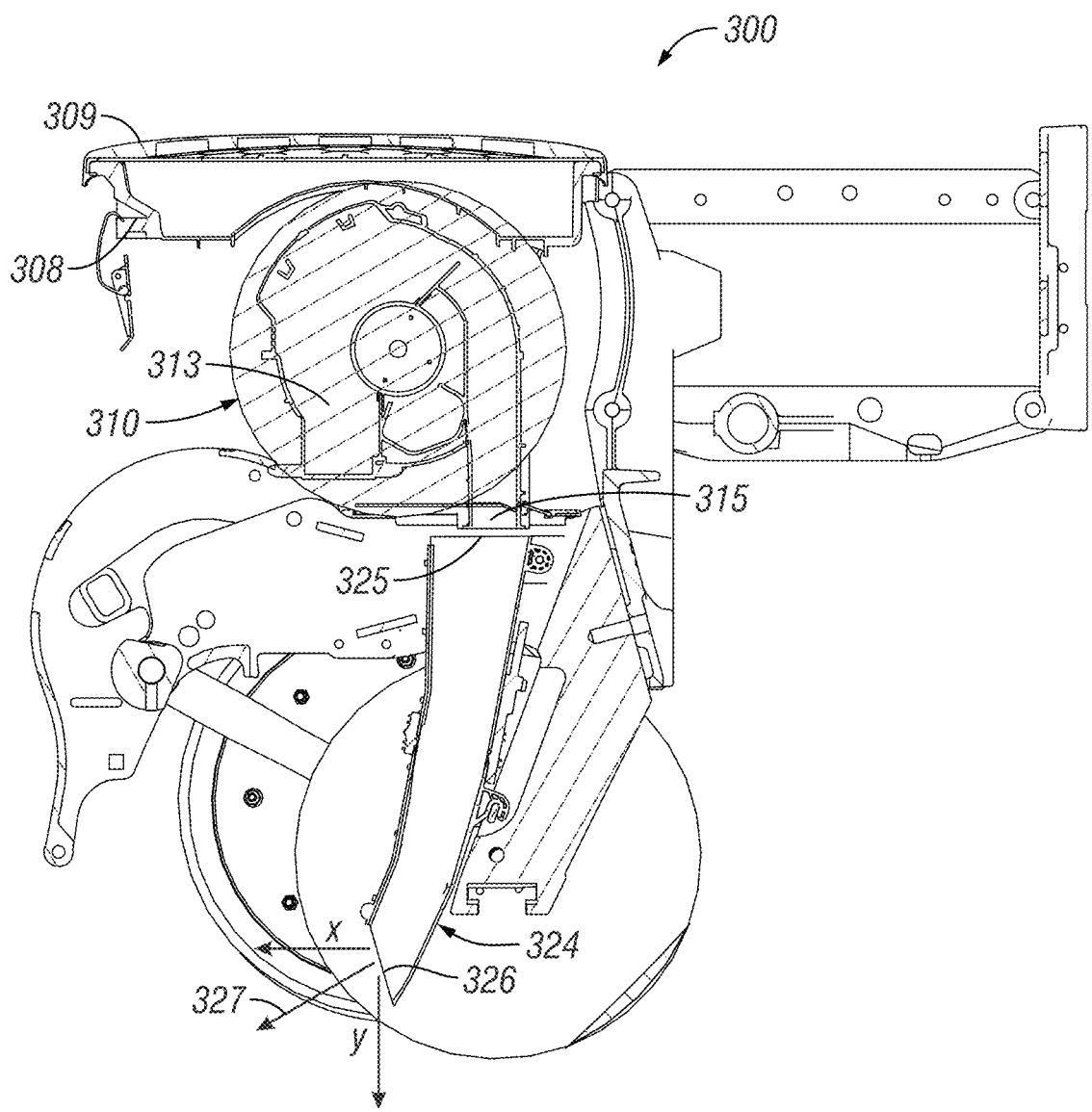
FIG. 59 is a sectional view of the row unit of FIG. 56 taken about line 59-59 of FIG. 58.
Figure 60:
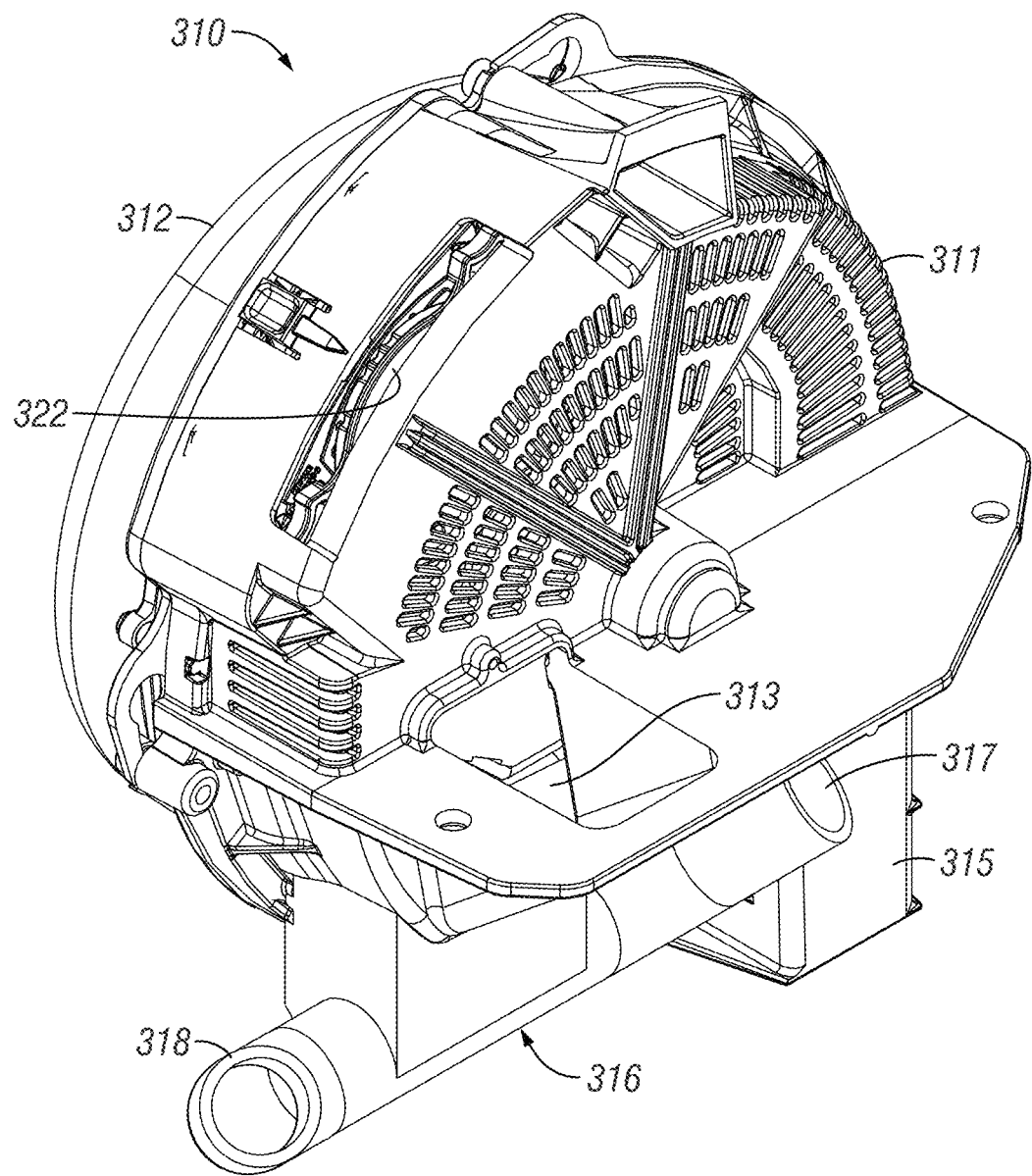
FIG. 60 is a perspective view of a seed meter for use with a row unit according to aspects of the invention.
Figure 61:
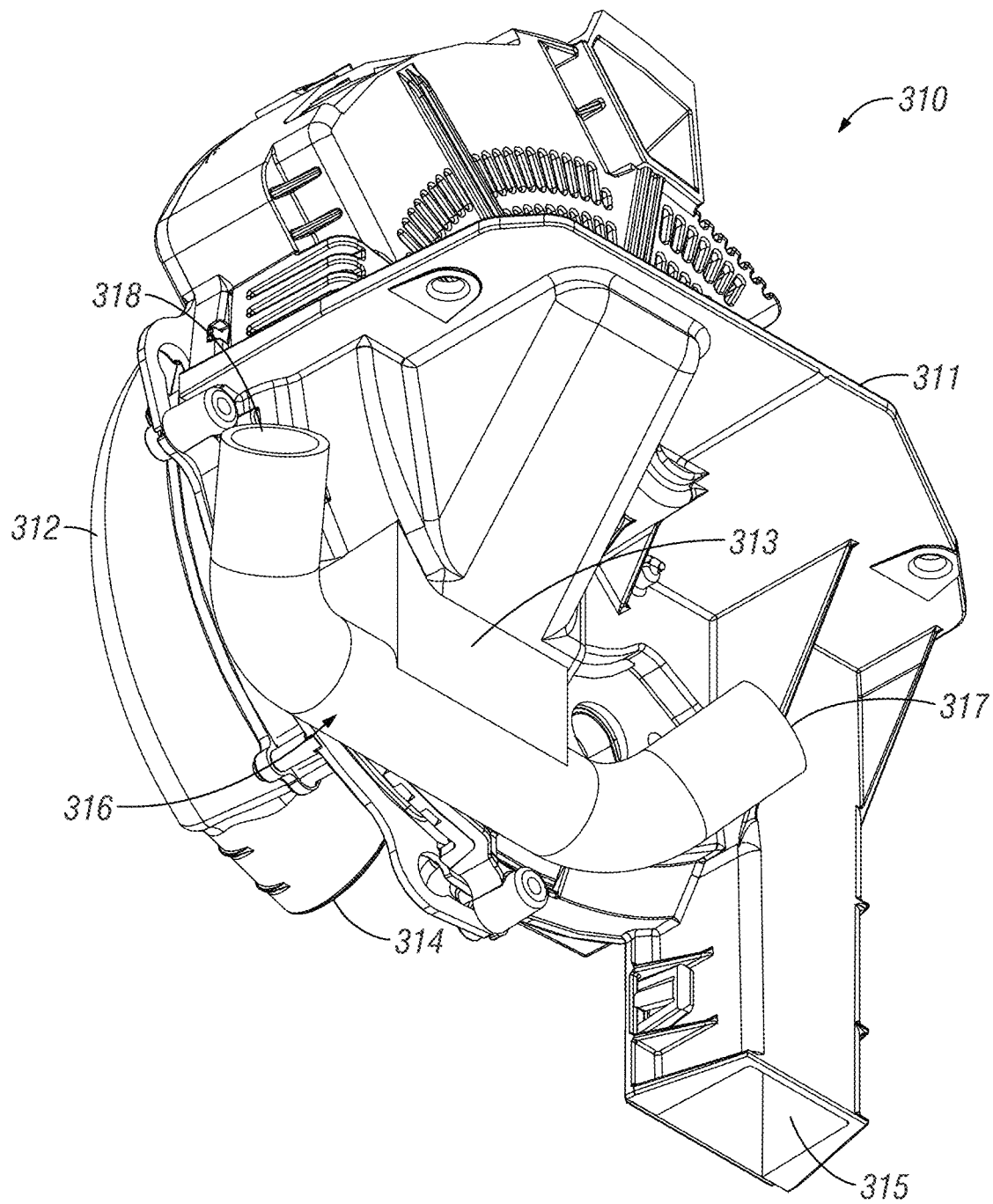
FIG. 61 is a bottom perspective view of the seed meter of FIG. 60.
Figure 62:
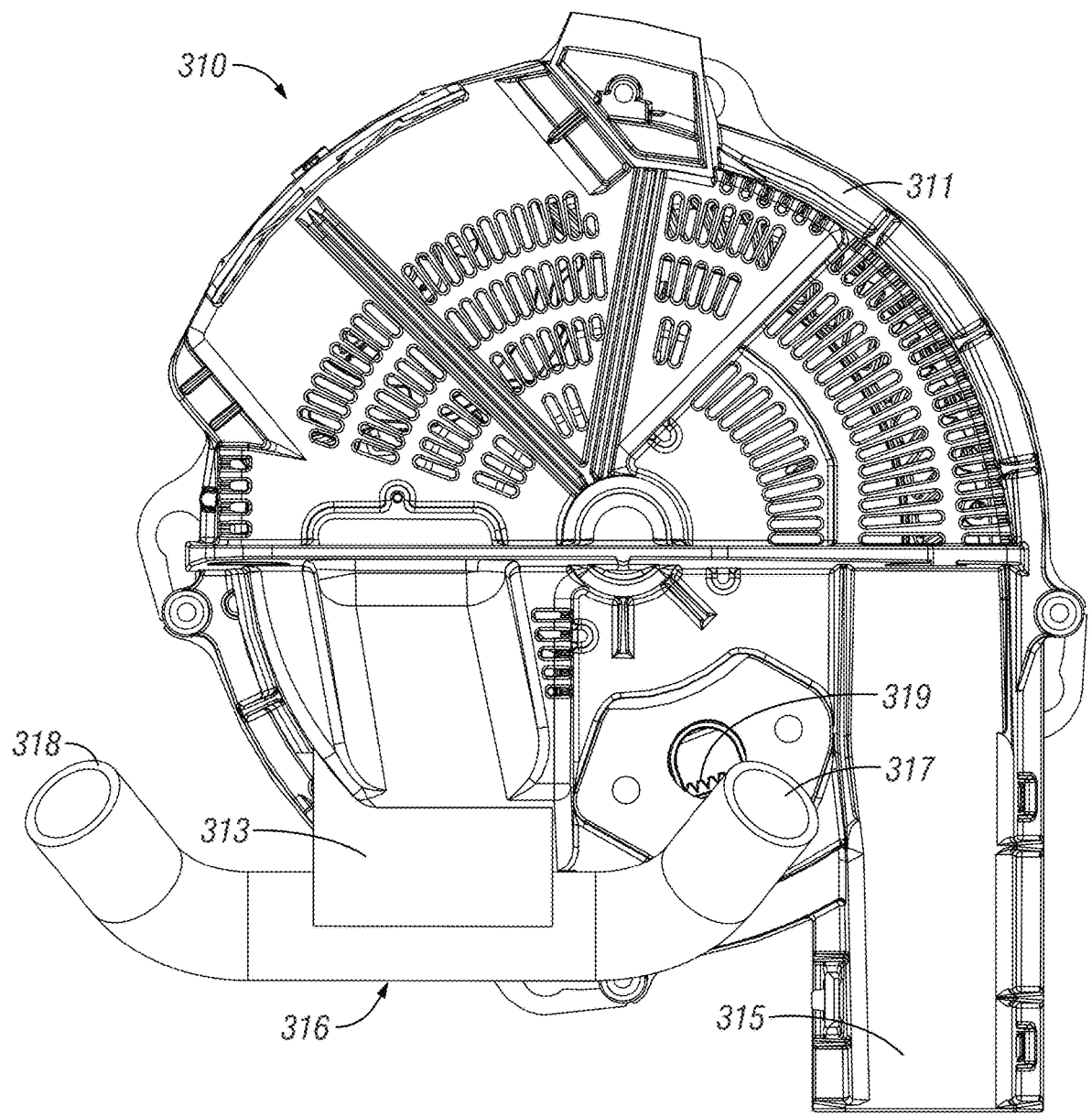
FIG. 62 is a side elevation view of the seed meter of FIG. 60.
Figure 63:
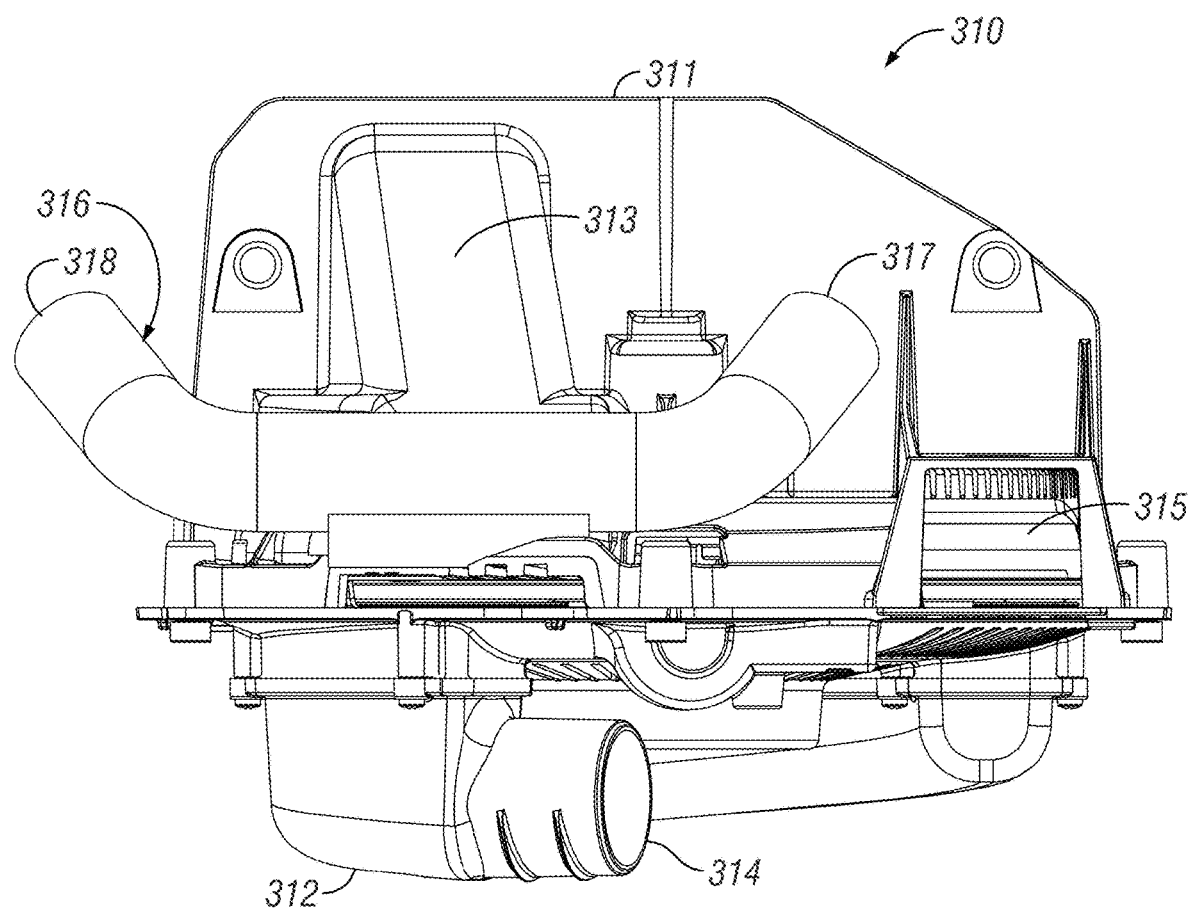
FIG. 63 is a bottom plan view of the seed meter of FIG. 60.
Figure 64:
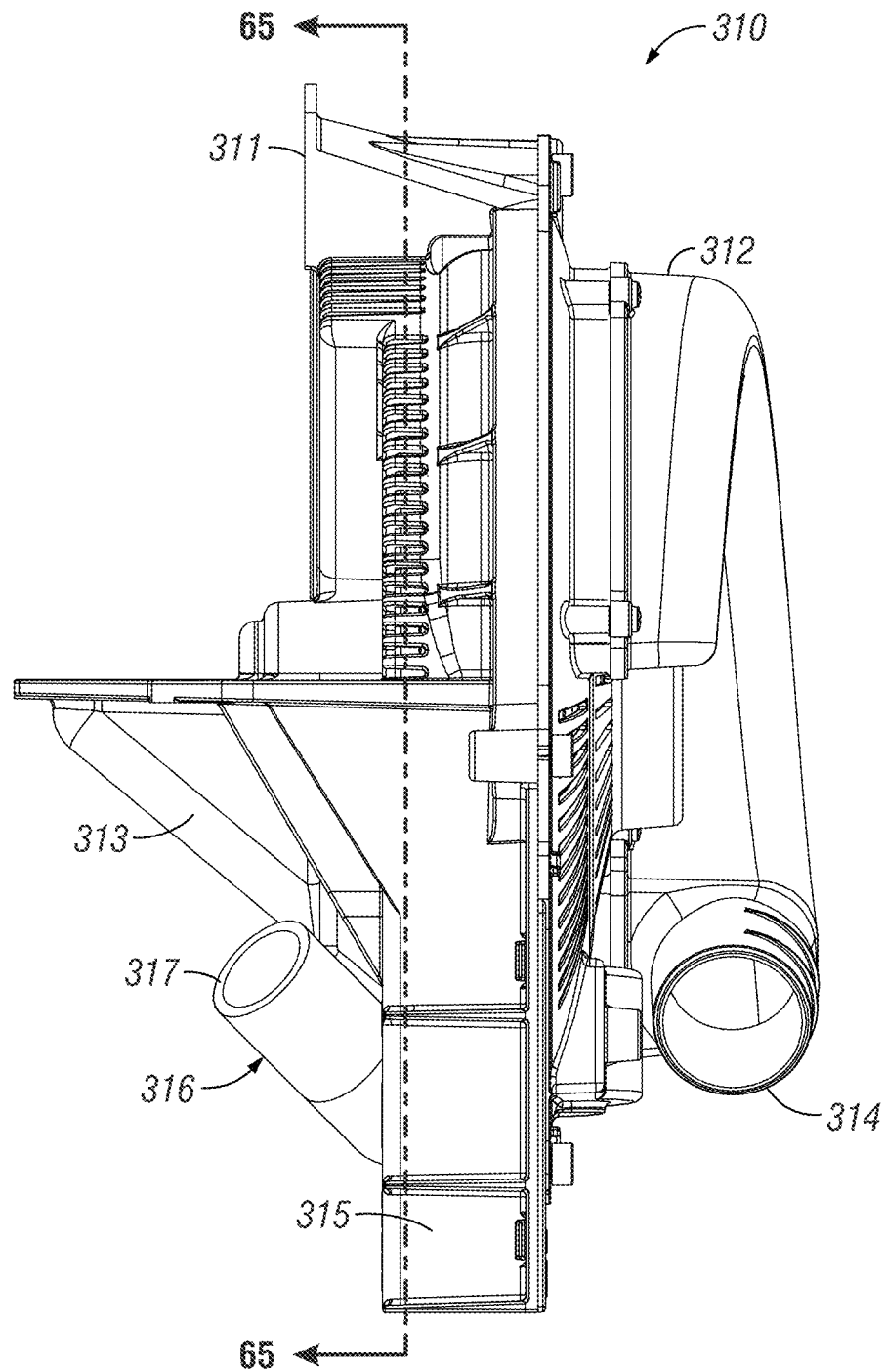
FIG. 64 is an end view of the seed meter of FIG. 60.
Figure 65:
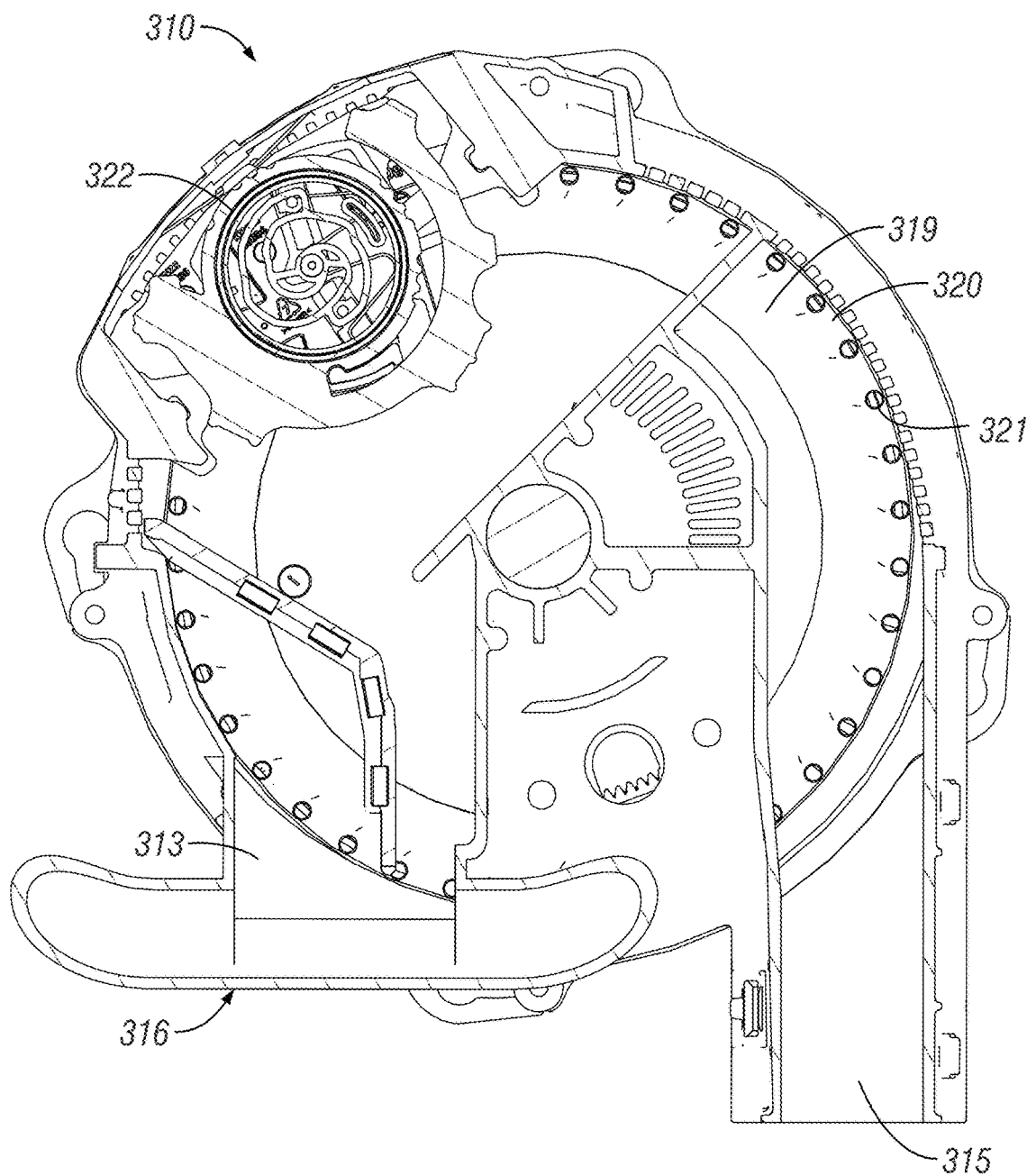
FIG. 65 is a sectional view of the seed meter of FIG. 60 taken about line 65-65 of FIG. 64.

The seed meter 310 includes a seed housing with a disk side 311 and a vacuum side 312. A seed pool 313 is formed on the seed disk side and allows for the accumulation of the seed within the seed housing, such as via the mini hopper 308. An air source or vacuum connect 314 is included, which can connect to an air source to provide a pressure differential within the seed meter housing. A seed chute 315 extends generally downwardly from the seed housing and directs a seed towards a seed-to-ground system such as a seed tube 324, which can include an entrance 325 and exit 326 for directing seed in the direction of an arrow 327 as shown in FIG. 59.

Furthermore, the seed meter includes a queuing system, which takes the form of a clearing tube 316 extending at least partially through the seed pool 313 or another portion of the seed housing. The queuing system is shown in greater detail with regard to FIGS. 60-65. As shown in the figures, the clearing tube 316 of the queuing system is a tube which includes an first end 317 and a second end 318, and which extends at least partially through the seed pool 313 of the seed meter 310. The clearing tube and queuing system 316 provides a way to clear the seed meter housing of a particular type of seed before providing a separate type or hybrid of seed to the seed meter for singulating, metering, and delivering to the furrow. For example, as seed is delivered via the seed pool opening 313, it will collect adjacent the spinning seed disk within the seed meter housing. A seed delivery system, such as an air seed delivery system, can be configured to include baffles, chambers, or other mechanisms that can selectively deliver one or a plurality of types, hybrids, or varieties of seed to a single seed meter at a row unit. When a different type of seed is to be planted, the second seed variety can be delivered to the meter via the delivery system. However, if there is residual seed remaining in the seed pool of a seed meter of the first type, the second desired type may not be immediately planted at the desired location. Thus, the clearing tube and queuing system of the invention provides way to clear a seed pool of a seed meter of a first type of seed before providing or delivering the second type of seed to the meter such that the second variety of seed will be planted immediately when desired by the single meter.

An air hose or other fluid hose can be connected to the first end 317 of the clearing tube 316, and a hose connected to the second end 318 can be connected to the bulk tank associated with a seed type. When a particular seed variety or combination variety is being planted, an amount of seed is going to be collected in the seed pool 313. When a system associated with the planter determines that a new variety or type of seed is to be planted, the queuing system may be activated to clear the seed pool of any access first type of seed. Air or another fluid source can be provided through the clearing tube to pass through the seed pool to push any excess or residual seed out of the second end 318, and can be directed towards the bulk tank or another holding area of the first type of seed. The second type of seed can then be planted via the seed meter until the system determines that the first or yet another type of seed is to be planted. The system will again queue up to remove any excess or residual seed from the seed pool before delivering the next type of seed to be planted to the seed meter, wherein the seed is then metered and planted as has been shown and described.

The queuing system provides numerous advantages. For example, the queuing system allows for the use of a single seed meter at each row unit during planting. This reduces the number of components to be used for planting the different seed types and/or hybrids. The queuing system can provide for greater accuracy in planting of a particular variety by flushing out any excess or residual seed before supplying a new or second type of seed. Furthermore, the queuing system prevents or mitigates waste of a particular seed variety by passing any excess or residual seed from the seed meter and back to the hopper or seed source containing the particular seed variety. This can provide that any number of seed varieties can be utilized.

Furthermore, the queuing system can be used with any of the row units and/or seed meters as has been shown and described in the invention. The system provides a unique way to clear a particular seed meter of a first type of seed before providing a second or another type of seed to be planted through the system. Thus, for a row unit with a plurality of seed meters, the system can provide for more than two seed varieties to be planted with two seed meters.

The queuing system can be utilized to queue up or prepare one of the seed meters by clearing said seed meter of an unwanted or undesired seed to be planted before providing the next type of seed to be planted to the seed meter. The queuing system provides a manner of preparing or otherwise setting up a seed meter for future use as well.

While the air seed delivery system has been described, other methods of providing seed to the meters may also be included. For example, a seed meter can include multiple seed pools that each contains separate seed types or varieties. The pools can be manipulated to align one of said pools with a seed disk to have the seed meter plant seed from the pool. This can be done by baffles, slides, indexing systems, or other systems that control the seed pool containing separate seed types for interaction with the seed disk.

Different embodiments of seed disks can also be included. For example, an embodiment of a seed disk for use with one or more of the planting and/or row units for providing methods and means for planting one or more of a plurality of seed hybrid varieties in a field includes a seed disk that is a conical-shaped disk that includes a first seed aperture path, second seed aperture path, third seed aperture path, and fourth seed aperture path, which are generally defined by rows of seed apertures positioned radially away from a seed disk axis and spaced generally evenly from one another. Each of the seed aperture paths are in communication with their own separate seed pool, wherein each of the separate seed pools contains a different seed hybrid variety.

Due to the conical shape of the seed disk, each separate aperture path is allowed to be driven separately or concurrently. An internal drive can include a clutch or other mechanism such that the operation of the drive system rotates one section of the conical disk, which corresponds with one of the seed aperture paths rotating. For example, if the seed hybrid variety 3 is to be planted at a particular location, the disk drive mechanism can be operated to rotate the section containing the third seed aperture path. This will pass the seed apertures of the seed aperture path through a seed pool containing the seed hybrid variety 3. The seed can then be released into and through a seed tube and towards the grown for planting.

The cone can be pitched at an angle to allow for seeds to fall away in a similar path such that the different seed hybrid varieties can travel down a same seed tube, as has been shown and described previously. When hybrid 2 is to be planted, a positioning and/or control system communicates with the drive mechanism to rotate only the section containing the second seed aperture path. As the location of the planter and the field changes, the positioning system is updated to determine when a different seed hybrid variety is to be planted. For example, if the hybrid 1 is to be planted, the positioning system communicates to the drive mechanism to stop rotating the section containing the second seed aperture path and to begin rotating the section containing the first seed aperture path. This will pass through the seed pool containing the hybrid 1 to begin planting said hybrid variety instantaneously.

In addition, it should be appreciated that all of the seed aperture paths of the seed disk can be rotated at the same time, with only one of the paths "activated" to acquire seed from the corresponding seed pool. For example, when the system is an air seed meter, the air source can be manipulated to be moved to align with one of the seed aperture paths corresponding with the seed variety to be planted. When the system, either manually or automatically, indicates a change in the seed to be planted, the air source can be moved, either by moving the source itself or by moving a different portion thereof to open a path to the desired seed path, such that the new seed path will have seed adhere thereto when passing through a seed pool. Furthermore, an actuated knockout could be used to dislodge a seed from one or more of the seed aperture paths for planting. The actuated knockout could also be used to knockout undesired seed from the disk and back to the seed pool prior to reaching a dispensing location as the disk is rotated.

Figure 66:
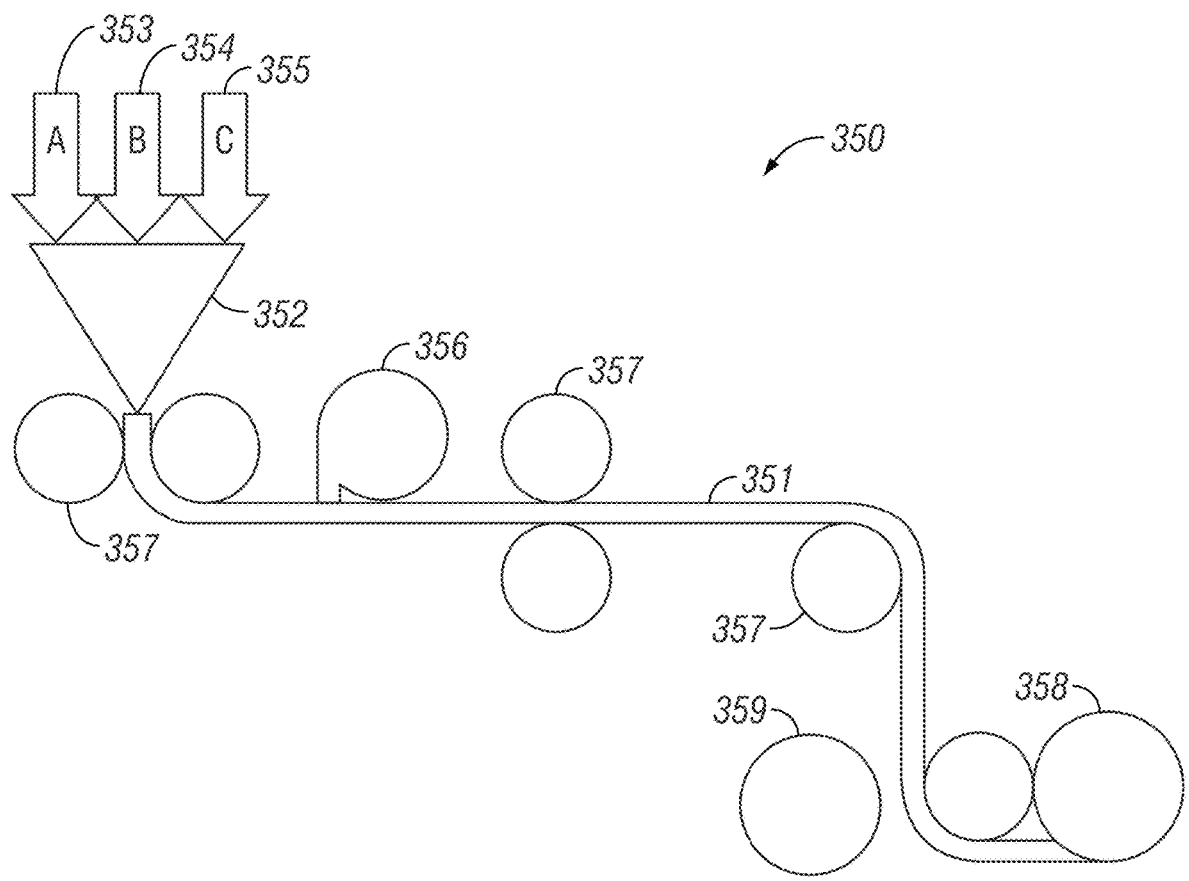
FIG. 66 is a diagram of exemplary embodiments of a planting and/or seed delivery system according to the present invention.

FIG. 66 shows yet another aspect of a planting and/or seed delivery system 350 according to the invention that allows for planting of at least one of a plurality of different seed hybrid varieties during on-the-go planting. With the planting system 350 shown in FIG. 66, a seed tape 351 is utilized. The seed tape 351 may be biodegradable. One or more seed sources include a first hybrid 353, second hybrid 354, and third hybrid or variety 355. One of the types of hybrid is selected based upon the location of the planter in the field, the user's choice or some other condition. For example, a positioning system can indicate to the planter which of the seed the hybrid variety says to be planted based upon known field conditions. The corresponding seed source supplies the seed variety through a seed chute 352. The seed chute may be a funnel, gate, tube, baffle, or the like. Opposite the seed chute is a seed tape, wherein the seed of the seed hybrid variety is adhered or otherwise attached to the tape 351. In other configurations, there can be multiple seed tapes stored at seed sources, with the seed tape containing the desired and hybrid variety move through the chute 352 and the rest of the system 350.

Rollers 357 move the tape through the system 350. A seed meter or singulator 356 may be positioned along the seed tape 351 in order to ensure that only one seed is associated at a particular location of the seed tape 351. This can enhance or otherwise provide for greater efficiency with regard to seed spacing along the seed tape. The rollers 357 continue the movement of the tape to a dispensing position adjacent the closing wheels 358 and at least partially behind the opening wheels 359, wherein the seed is planted in the field. When a different hybrid variety is to be planted, the selected seed source or seed tape can be changed at the seed chute 352 to provide for a different hybrid to pass to the seed tape 351 for planting in the field at a particular location. Thus, the system 350 shown in FIG. 66 provides for a method and means for changing the seed hybrid variety being planted while continuing on-the-go planting by a farmer.

The seed tape could also be pre-made and stored on the planter in such a manner that multiple seed tapes are included, with each of the seed tapes containing a separate seed type, variety, and/or hybrid. For example, the tapes could be stored in rolls, either at the central toolbar or at each row unit, such that one of the rolls is utilized at a time to plant the seed associated therewith. When a different seed is to be planted, a different roll could be activated to begin planting the tape with the different seed incorporated in said tape. The pre-made seed tapes could be operated in a similar manner as that shown in FIG. 66 such that the tape is rolled through the row unit and into a furrow, before being covered by closing wheels. In addition, a cutting mechanism could be incorporated, either at the row unit or at the central toolbar or some other location, such that the cutting mechanism would cut the tape being planted to stop the seed tape before starting the next seed tape. The same or different mechanism could then attach to the subsequent tape to begin planting thereof.

It should also be appreciated that insecticide, fertilizer, and/or other seed treatments or refuge could be added to the seed tape with the seed, either on-the-go or in a pre-made manner. These additions could be dynamically adjusted according to the ever-changing soil, seed, and/or climate conditions as the planter and tractor move through a field. Otherwise, these could be determined as part of a pre-plotted manner. Furthermore, it is contemplated that a drip tube/tape could be included with the seed tape to provide the ability to irrigate the planted seed. For example, the drip tube (not shown) could be planted adjacent the seed tape in the ground as the planter is planting the seed tape. The drip tape could be operatively connected to a water source, which could also include nutrients. When needed, water could be introduced to the drip tube to provide water at or near the location of the seed in the tape that has been planted. The drip tube could include perforations or other holes that are spaced substantially equal to the ideal seed spacing such that the seed will be positioned substantially adjacent one of the perforations in the field to be able to best utilize the water being provided.

Figure 67:
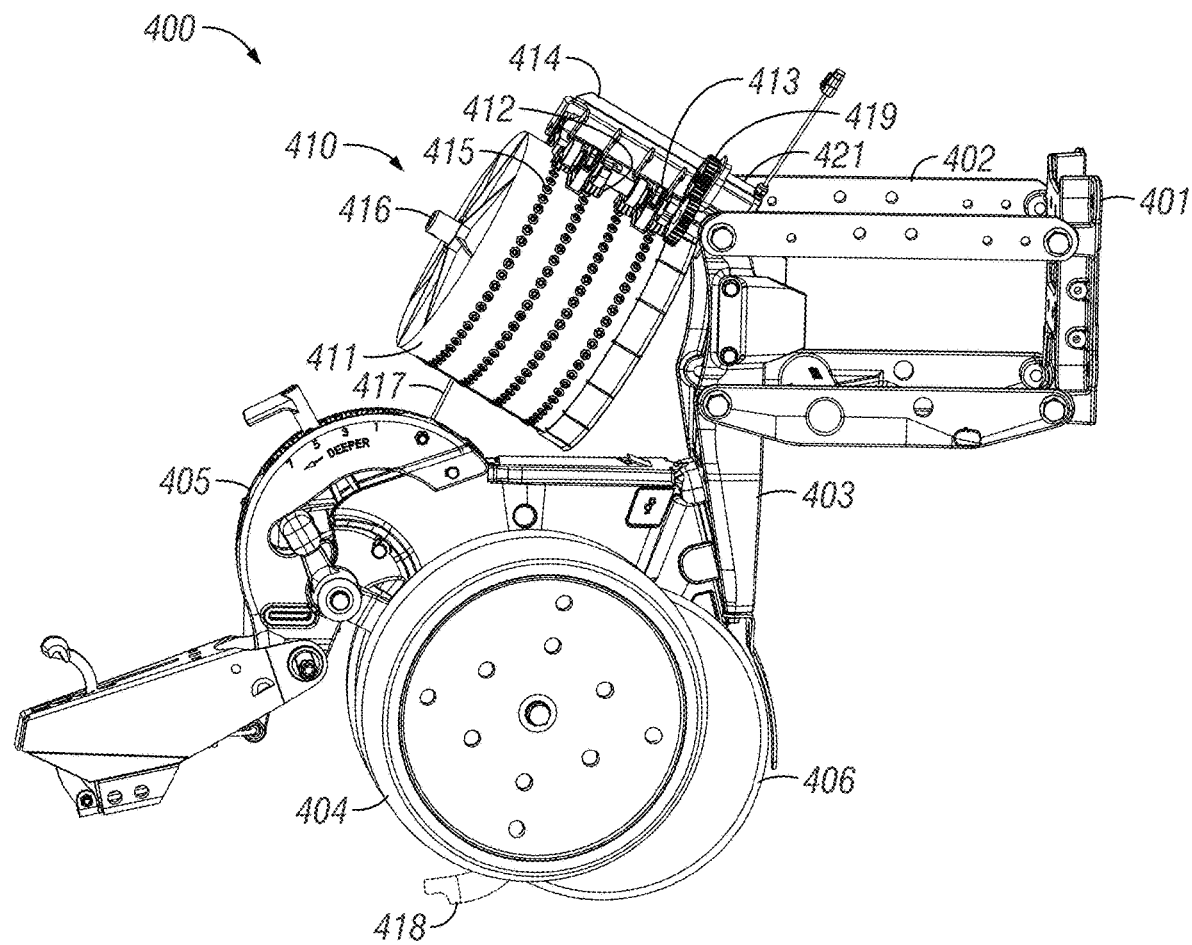
FIG. 67 is a side elevation view of another row unit including aspects of the invention.
Figure 68:
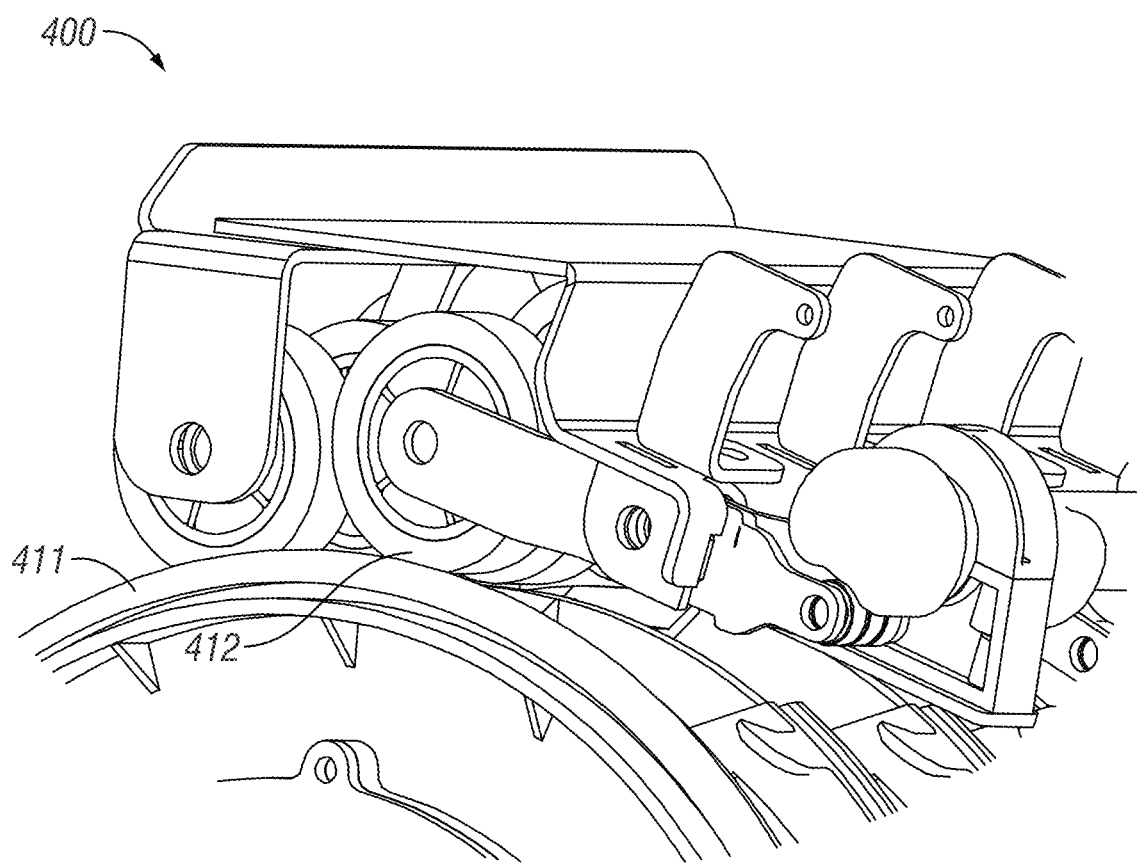
FIG. 68 is an enlarged view of a portion of the row unit of FIG. 67.
Figure 69:
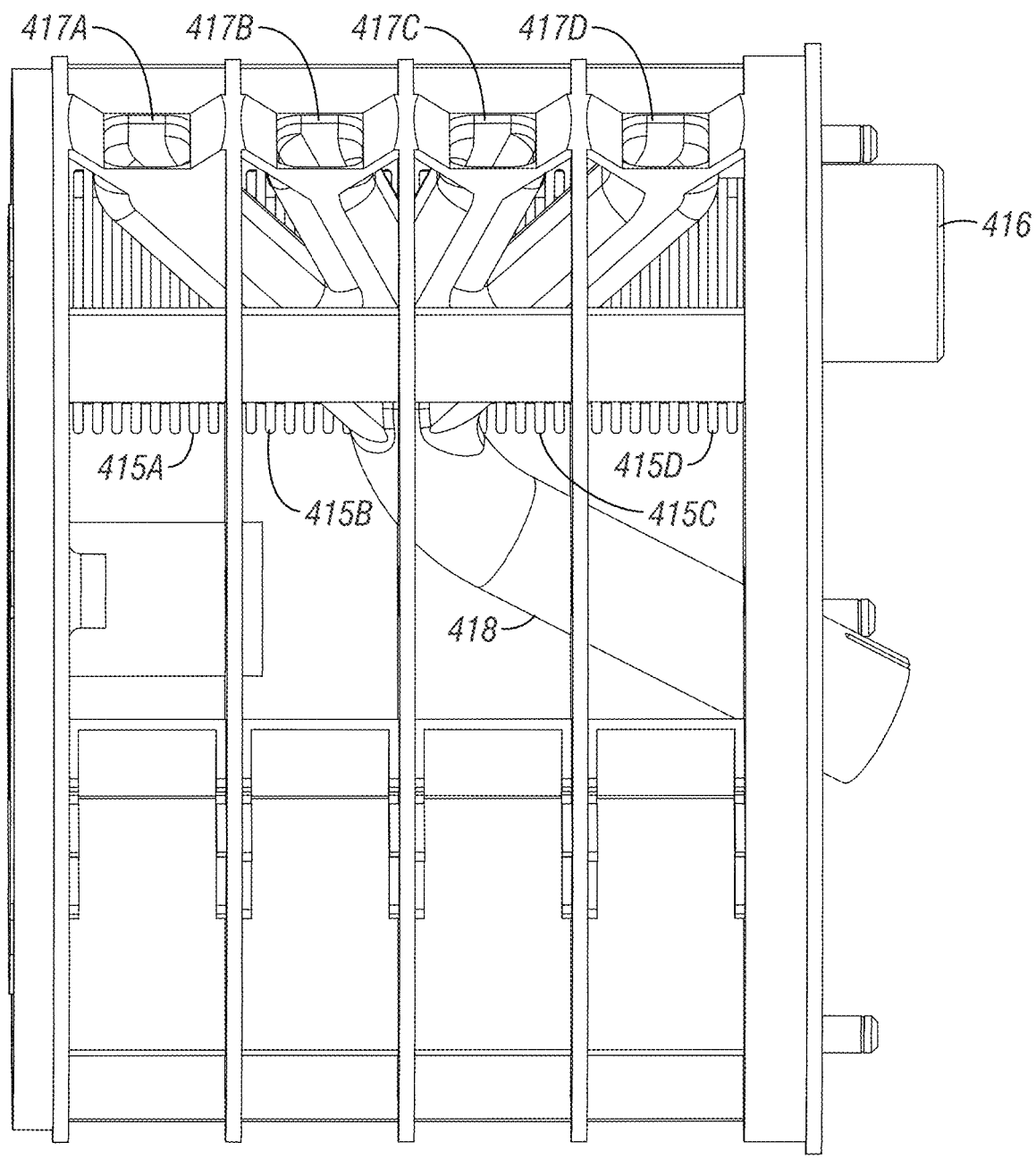
FIG. 69 is an enlarged view of a portion of the row unit of FIG. 67.
Figure 70:
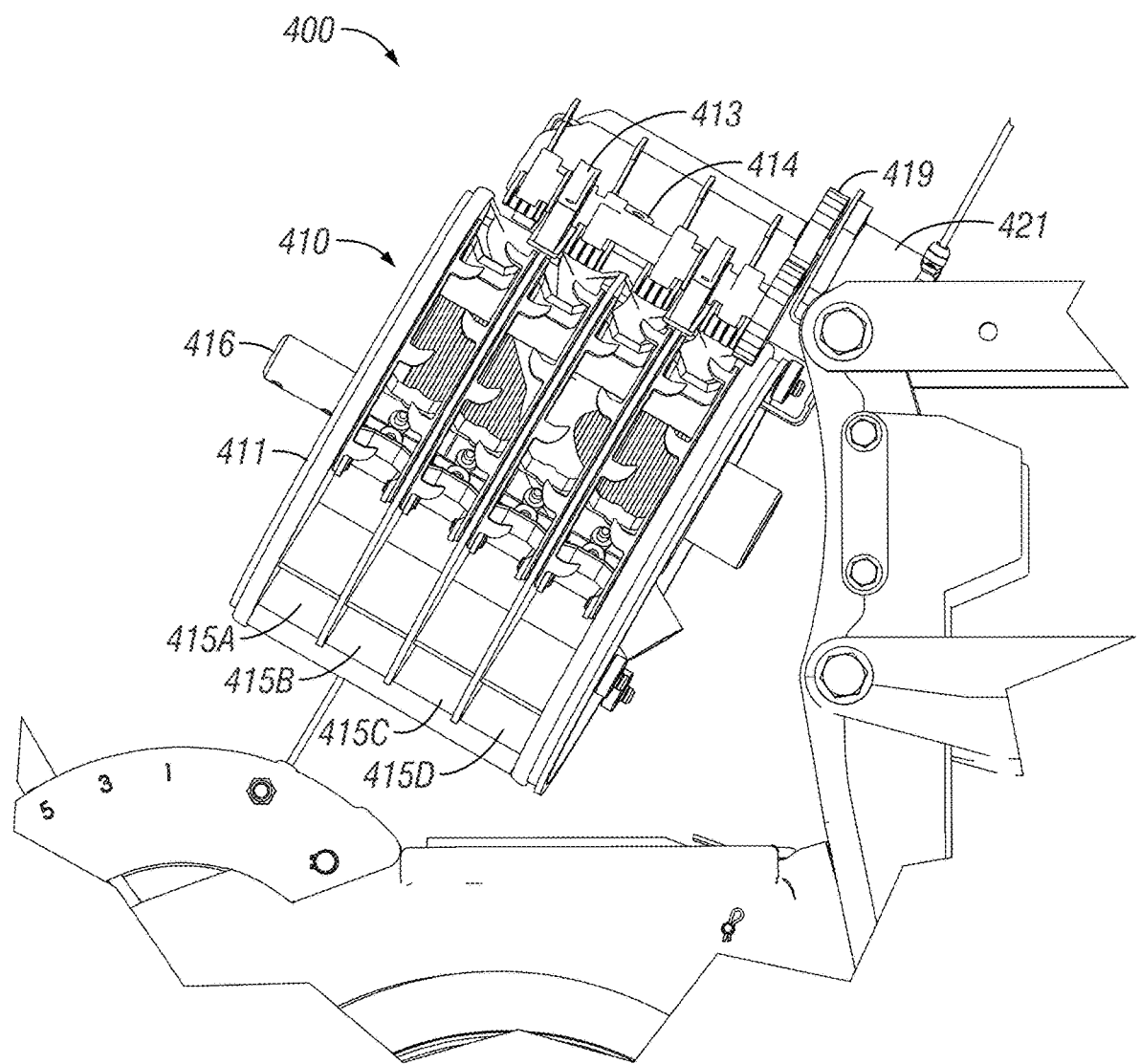
FIG. 70 is an enlarged view of a portion of the row unit of FIG. 67.
Figure 71:
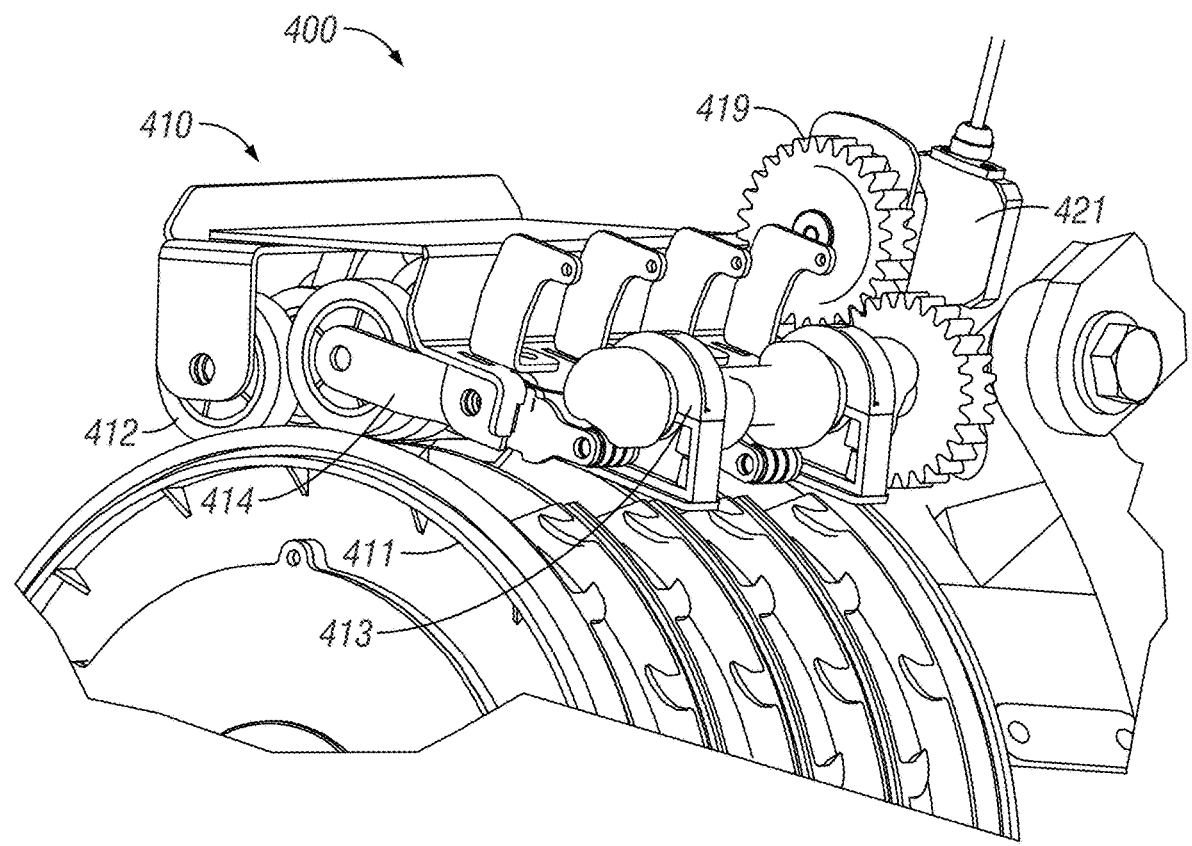
FIG. 71 is an enlarged view of a portion of the row unit of FIG. 67.
Figure 72:
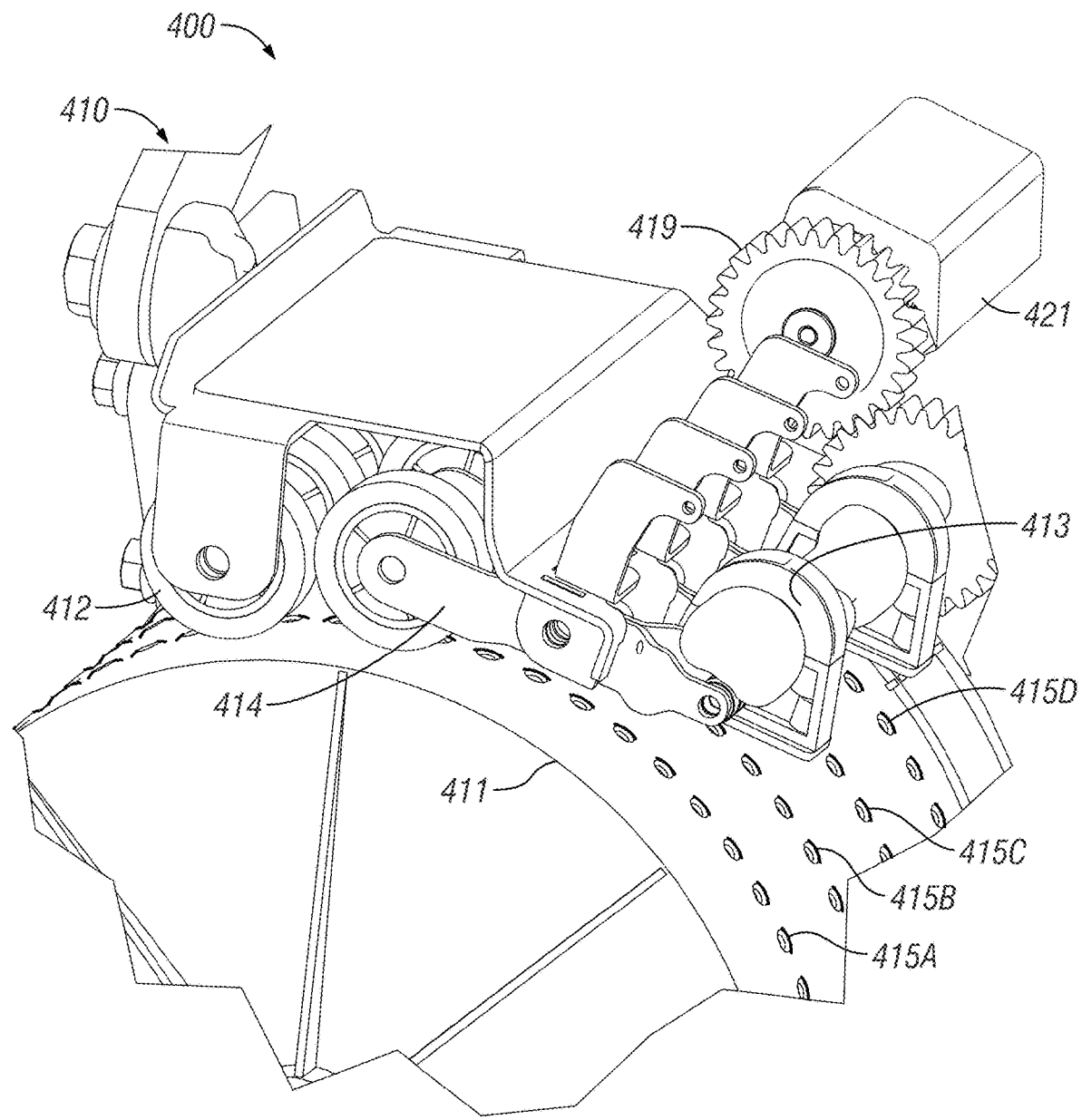
FIG. 72 is an enlarged view of a portion of the row unit of FIG. 67.

FIGS. 67-74 disclose yet additional aspects of a method and means for selective planting one or several possibilities of seed hybrid varieties during on-the-go planting in the field, for example based upon location of the planter in the field. The row unit 400 shown in FIGS. 67-74 are used to plant a particular seed variety or combination of seed hybrid varieties based upon, for example, the position of known field characteristics or conditions that have been mapped out to a positioning system. The choice can also be made by operator, who can automatically select a particular seed hybrid variety to be planted. Therefore, the row unit 400 shown in FIGS. 67-74 provide for yet additional ways to allow a farmer or operator to automatically or manually plant a seed hybrid variety or combination of varieties that will provide the highest yield per acre for the crop. FIG. 67 is a side elevation view of a row unit 400. The row unit 400 includes many of the similar components that have been previously shown and disclosed. However, the row unit 400 does not include a standard seed meter, as has been shown and disclosed. In place of a seed meter is a seed meter 410 comprising a seed drum 411 attached to the components of the row unit 400. The seed drum 411, according to some aspects of the invention, is connected to the four-bar linkage 402 of the row unit 400 and includes a seed chute 417 and a seed dispenser 418 from passing seed from the seed drum and into the field. The drum 411 is a cylindrically shaped object that is rotatable about a shaft 416. The orientation and configuration of the drum 411 is not to be limited to that shown in the figures, and the orientation of the drum in the figures for exemplary purposes only.

Figure 73:
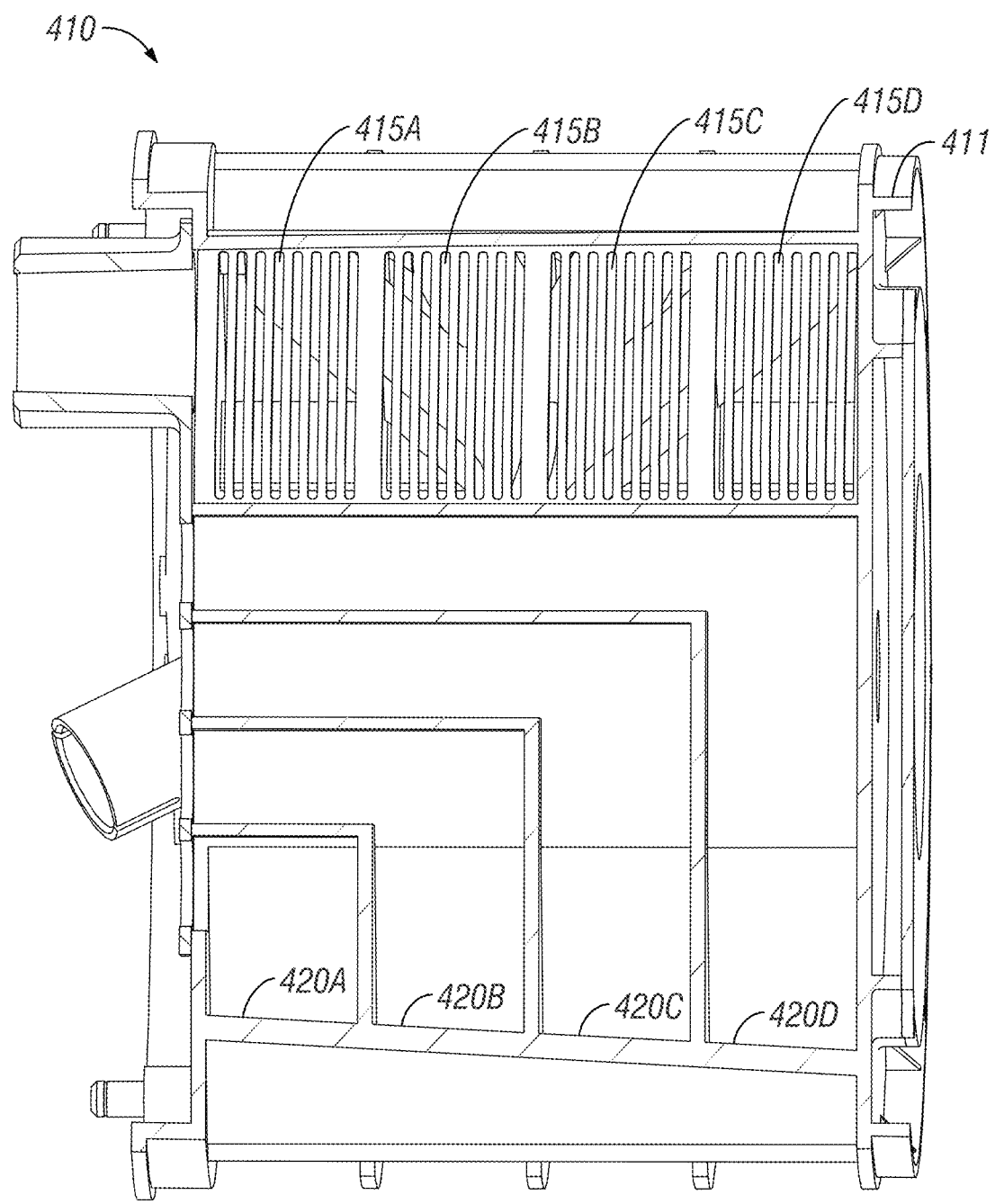
FIG. 73 is an enlarged view of a portion of the row unit of FIG. 67.

As shown throughout the figures, the drum includes a plurality of seed aperture paths 415A, 415B, 415C, and 415D. The seed aperture paths 415 of the drum 411 each correspond to a different seed hybrid variety, type, or the like of seed in a seed pool within the drum. For example, the interior of the drum, which is shown in FIG. 73, includes a seed pool corresponding to each of the seed aperture pass. The figures show a first seed pool 420A, second seed pool 420B, third seed pool 420C, and fourth seed pool 420D. The seed pools 420 are located within the drum and are positioned such that when the apertures pass the seed pools, a positive or negative pressure differential between the interior and exterior of the drum will adhere a seed to each of the apertures along the seed paths.

Shown to be positioned generally at the upper portion of the drum 411 is a plurality of seed aperture path wheels 412. They are shown to be at least one wheel position at each of the seed aperture paths 415. The seed wheels 412 are configured such that they aid in blocking or plugging an aperture at a location where there would otherwise be no pressure differential, such that the seed would fall from the aperture. Thus, when no seeds are to be released from the seed drum 411, each of the wheels 412 corresponding to each of the seed aperture paths would be in contact with the drum to close the seed aperture paths at the location of the wheels 412. As the closed aperture ensures that there is a pressure differential between interior and exterior of the seed drum 411, the seeds will pass through the area while adhering to the interior of the seed drum 411 and would fall back into the respective seed pools, as opposed to a seed chute for planting.

Figure 74:
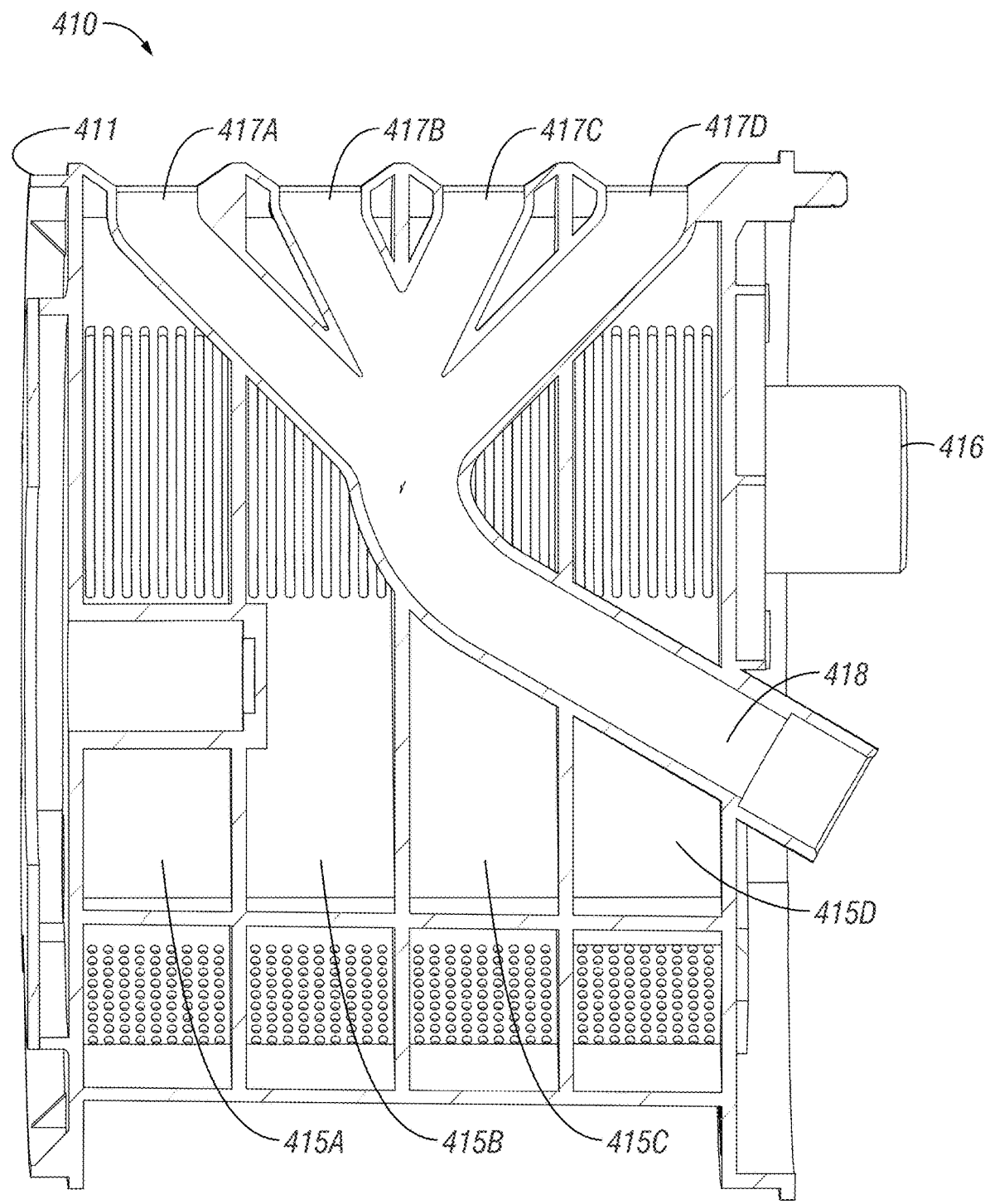
FIG. 74 is an enlarged view of a portion of the row unit of FIG. 67.

However, when a selected seed type, hybrid, or variety is to be planted, a seed arm 414 attached to the seed wheels 412 can be operated such that each wheel 412 can be independently displaced from the exterior of the seed drum 411. This creates no pressure differential at the location of the seed wheel 412 such that when the seed approaches the area adjacent the wheel 412, the lack of pressure differential will cause the seed to become dislodged from the interior of the drum 411. The seed can then be directed into a corresponding chute 417 and towards the seed dispenser 418 and into a furrow created in the ground. The seed chutes 417 are shown in FIG. 74. As shown in the figure, there are an equal number of chutes corresponding to the number of seed aperture paths. Therefore, there is first seed chute opening 417A, a second seed chute opening 417B, a third seed chute opening 417C and a fourth seed chute opening 417D. The seed chutes 417 combine at a centralized location such that each of the seed varieties of the seed drum 411 may be dispensed about a common seed chute into the common seed dispenser 418 where they are taken to the furrow in the ground.

Also included in the row unit 400 are a wheel drive 419 and a drive mechanism 421. The drive mechanism 421 may be an electro turbo motor that rotates one or more gears driving the wheel drive 419. The wheel drive 419 includes gears that operate to rotate the drum 411 in a circular manner such that the seed aperture paths pass adjacent the corresponding seed pools in the interior of the drum 411. A separate mechanism will operate the wheel arm 414 to selectively lift one or more of the aperture wheels 412 away from the seed aperture paths on the exterior of the wheel drum 411 to allow the one or more seed types, hybrids and/or varieties to drop from the seed drum 411 and into the seed chute 417.

In addition, instead of aperture wheels, any dislodging member is contemplated to be used with the row unit 400. For example, a finger or other pecking member may be used to selectively knock one or more seeds from a particular seed path to select a specific seed type, hybrid and/or variety to pass through the seed chute 417 and dispenser to be planted. Other members may also be used to dislodge the seed from the interior of the seed drum 411 along the seed aperture path for passing into the seed dispenser.

The row unit 400 provides the advantage of providing a system that does not waste unused seed hybrid or types. The seeds that do not get dislodged from the drum 411 for dispensing and planting continue to be adhered to the respective seed apertures of the paths beyond a dislodging point. The seed remain engaged to the interior of the seed drum 411 until passing over a wall within the seed drum, which creates a pressure difference to dislodge the seed from the seed apertures. The seeds then pass back into their respective seed pools where they await to be re-adhered to the seed drum 411 for passing along the seed aperture path. Thus, the seeds are not dislodged from the row unit and are simply reused in the seed pool until such time that they are to be planted in the field. This reduces waste and costs associated therewith of unwanted dislodging or unwanted use of the seed.

There is also the advantage that, due to the seeds being dislodged on an as needed basis, there is greater control over the planting of the desired seed type. For example, the seeds are only adhered to the interior of the drum from approximately a 7 o'clock position to a 12 o'clock along the interior of the seed drum 411. The seed dislodging member, such as the wheel 413, can selectively knock off or dislodge each individual seed adhered to the seed aperture. There can be a change from one seed hybrid dislodging to another from one seed aperture to the next along the seed aperture path. This provides greater control and accuracy over the selection of seed hybrid being dislodged and planted in a field at a particular location.

In addition, as the dislodging member can be operatively connected to a positioning system of the planter, the positioning system will control the dislodging of the particular seed hybrid variety based upon program field conditions along the varying locations in the field. The row unit 400 will provide another way to obtain on-the-go selection of accurately planting one of a plurality of seed types, hybrids, and/or varieties based on the location of the planter in the field, and can provide substantially instantaneous changing or selection of a particular seed type, hybrid and/or variety to be planted.

Figure 75:
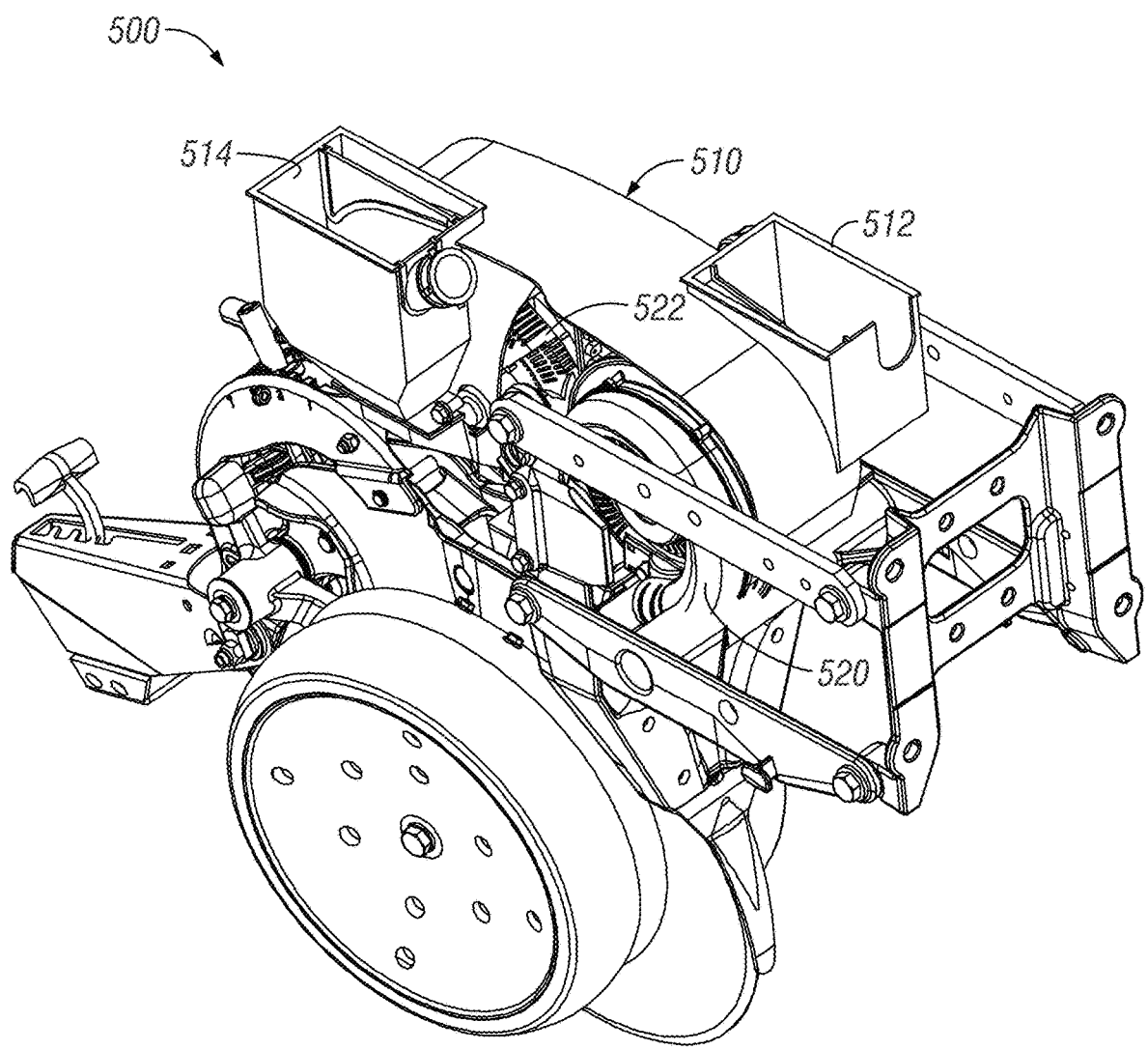
FIG. 75 is a perspective view of another row unit including aspects of the invention.
Figure 76:
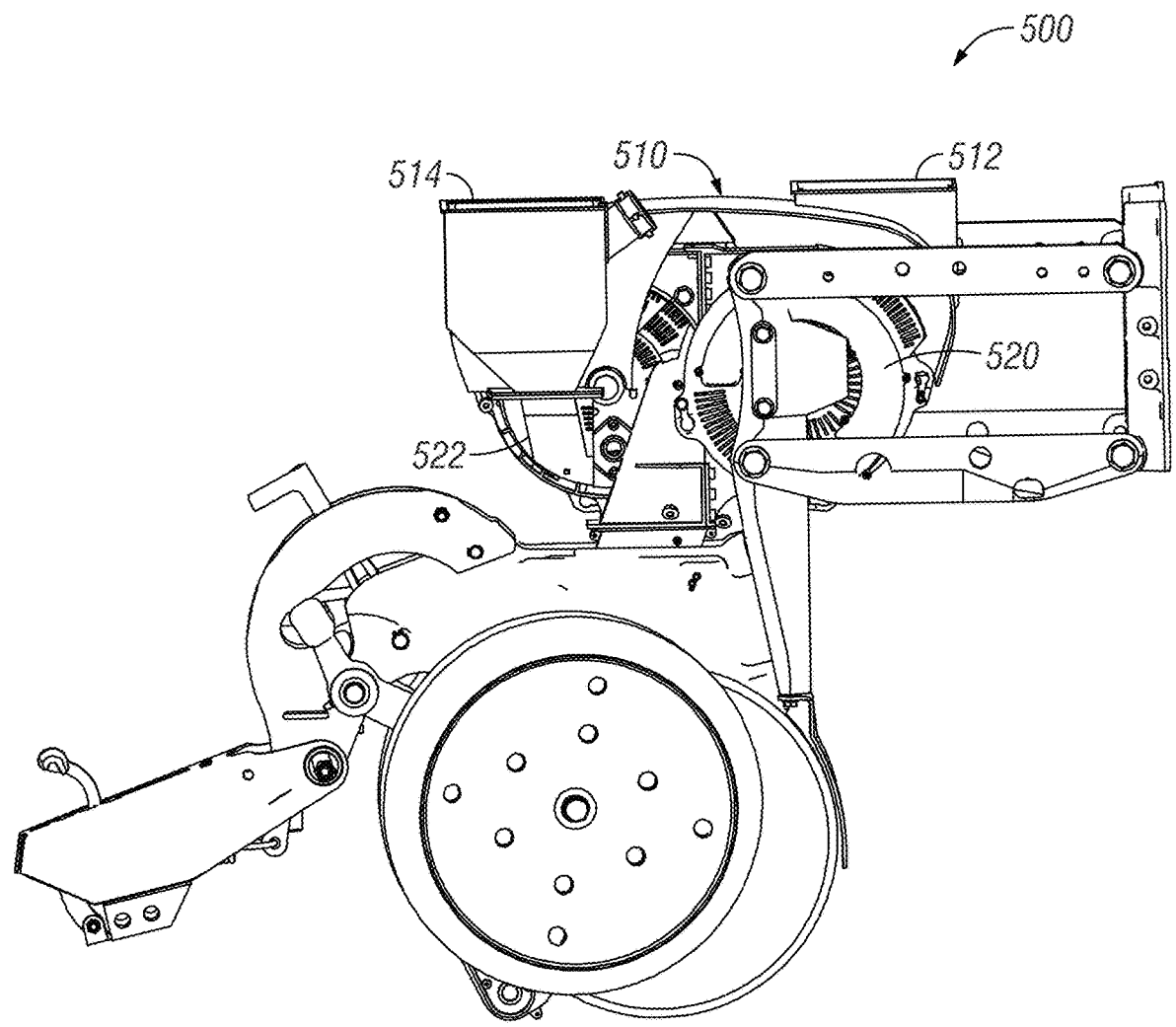
FIG. 76 is a side elevation view of the row unit of FIG. 75.

FIGS. 75 and 76 disclose yet another row unit 500 which includes a plurality of seed meters for changing on-the-go planting of one seed type, hybrid and/or variety to another. The row unit 500 is similar to previously shown and described row units in that a first seed meter 520 and second seed meter 522 include a shared housing 510 for a metering system 505. The shared housing 510 of the metering system 505 includes a first hopper inlet 512 and a second hopper inlet 514. The first hopper 512 is configured to store and receive a first seed type associated with the first seed meter 520. The second hopper member 514 is configured to receive and store a second seed type associated with the second seed meter 522. The housing 510 is similar to the housing 78 associated with the previous figures in that the housing 510 provides a single unitary member for the seed meter side of the seed meters, while the vacuum side is attached thereto for each of the meters. Furthermore, as will be understood, the housing 510 of the metering system 505 includes a situation in which the seed meters may have a partial overlap such that they share a substantially similar common release point for the seed being metered and released by the seed disks (not shown).

FIGS. 77-79 include more detailed use of the metering system 505 of the row unit 500. As shown, the housing 510 provides for the shared housing for at least a portion of the first meter 520 and second meter 522 and also includes the hopper portion 512 and second hopper portion 514. Thus, seed can be delivered, such as by air seed delivery to the hopper portions 512, 514 to be delivered to the seed meters 520, 522. Furthermore, one of the seed meters will be operating to meter and dispense one of the seed types at a time. For example, either the first or the second meter 520, 522 will be operated but not both at the same time. The operating meter will release a seed approximately at the location of the common or shared seed chute 521, which is adjacent a seed-to-ground delivery system 550. However, it is also contemplated that both of the meters could be operated at the same time. This would be a way to do very high planting rates, effectively cutting the needed metering rate by each meter in half. The operation of both meters would ensure that the meters are on-the-ready to plant when needed, or could simply be planting alternatively as the planter goes through the field.

The seed-to-ground delivery system 550 is not a seed tube, as has been shown and described. Instead, the seed-to-ground delivery system 550 is a system which includes a first belt 552 and a second belt 553. The belts are tensioned and comprise an elastomeric material. Any pliable material is contemplated to be used for the belt materials. The first belt 552 is positioned on a first roller 556 and includes a motor for rotating the belt. Likewise, the second belt 553 includes a second roller 558 that is operably attached to a motor that provides for the rotation of the second belt 553. The belts will rotate in a manner such that they will move substantially in sync with one another. Spacing between the first and second belts at the location 555 can be taller such that a seed can fit in between the pliable materials of the belts, but can be held in place thereat. Thus, when seed is released by one of the first or second meters 520, 522, the seed can be placed between the two belts. As the belts rotate, they will carry or deliver the seed between the belts towards the exit 560, which is substantially adjacent, a furrow in the field.

The rotational speed of the belts can be configured with the travel speed of the planter in with the known height about the furrow bottom of the belt opening 560 such that the seed will experience generally zero relative velocity when landing in the furrow. This will prevent the seed from bouncing or otherwise moving in the furrow which will increase the accuracy of the seed spacing between adjacent and subsequent seeds.

It should be contemplated that the seed belt of the seed-to-ground system shown in FIGS. 77-79 can be utilized with any of the row units that have been previously shown and described. While the seed tube has previously been disclosed, the seed belt can be utilized as well or in place of the seed tube to minimize the possibility of bounce or interference after the seed is released from the seed meter and before it reaches the bottom of the furrow. The seed belt provides the advantage of controlling the seed from the release of the seed from a seed meter and fill at the location of the seed-to-ground opening 560, which is substantially adjacent the bottom of a furrow in the field. Thus, the control delivery of the seed will provide for greater accuracy and seed spacing and seed placement in the ground such that it will have its best chance of growing when recovered with dirt.

Figure 80:
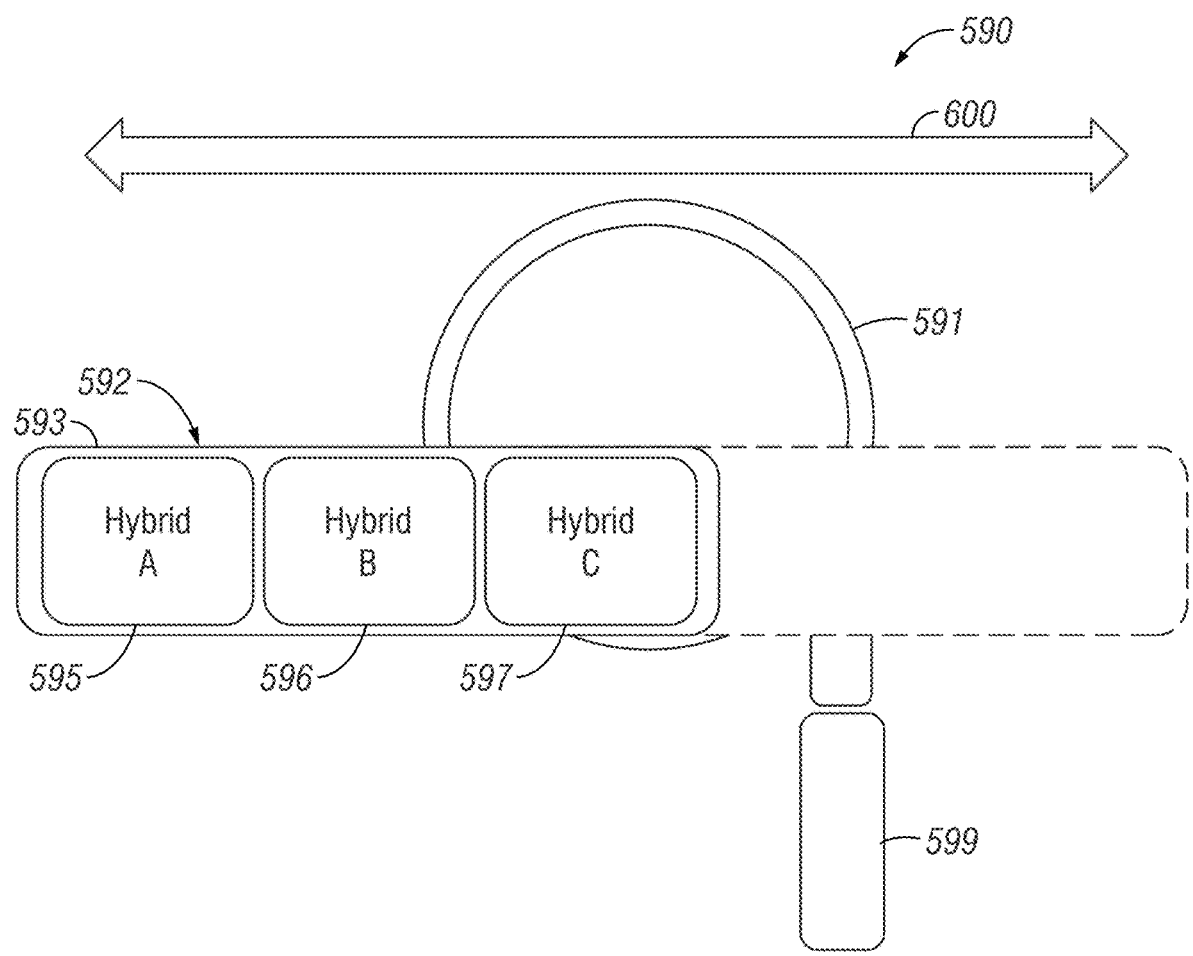
FIG. 80 is a diagram of still another exemplary embodiment of a seed delivery or planting system according to the present invention.
Figure 81:
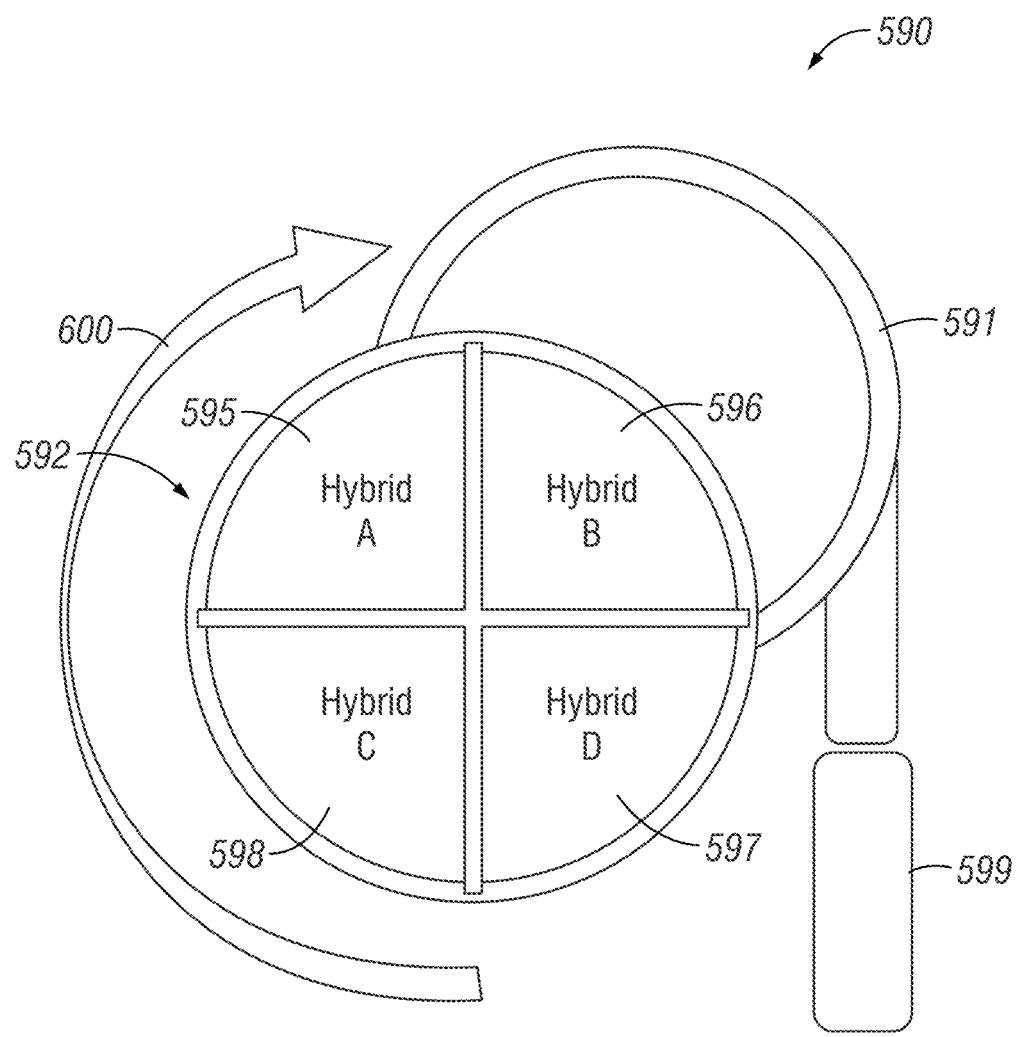
FIG. 81 is a diagram of still another exemplary embodiment of a seed delivery or planting system according to the present invention.

FIGS. 80 and 81 are diagrams of seed meter and/or planting systems 590 for use with the present invention and configured to provide the ability to plant one or more of a plurality of seed hybrid varieties at a time by a row unit as a planter moves through a field. The seed meter systems 590 shown in FIGS. 80 and 81 include seed meters 591. The seed meters 591 can be attached to and located at each of the plurality of row units of the planter. As is known, a seed disk of a seed meter may pass through a seed pool containing a plurality of a type of seed to adhere or otherwise attach a seed along the seed path of seed disk (such as at a seed aperture path) to move the seed from the seed pool to a location where the seed is released from the disk and positioned in the field for planting.

The aspects of the seed meter systems 590 shown in FIGS. 80 and 81 provide for ways in which the seed meter 591 can be associated with different seed pools that containing individual or separate types of seed hybrid varieties to allow for the planting of different types, varieties, and/or combinations of seed as the planter moves through the field. For example, the seed meter system 590 shown in FIG. 80 includes a lateral index system 593. The lateral index system 593 of the seed supply system 592 includes a plurality of openings associated with different seed hybrid varieties. The openings may be hoses, doors, apertures, and/or access ports. For example, the opening 595 shown in FIG. 80 is associated with a first hybrid A and may be a hose associated with a first bulk fill hopper, while the opening 596 is associated with a second hybrid B that may also be associated with a bulk fill hopper or an individual row hopper, and the third opening 597 is associated with a separate hybrid C that may also be associated with a bulk fill hopper or an individual row hopper. The openings 595, 596, 597 can be aligned with a seed pool opening of the seed meter 591 such that when a particular opening is aligned with the seed meter 591, the seed hybrid associated with the opening can pass through said opening and into the seed meter 591 for dispensing out a seed tube 599. However, when a separate or another type of seed hybrid variety is to be planted in the field, the system can be indexed to align a different opening associated with a different seed hybrid variety to be aligned with seed meter 591. The system shown in FIG. 80 is a lateral indexing system 593. The openings, which are associated with the seed sources of the seed hybrid varieties can be indexed in the direction shown by the arrow 600. Thus, the openings are moved generally in a horizontal manner relative to the seed disk 591. However, it is to be appreciated that the indexing may be in generally any direction, i.e., lateral, vertical, angular, rotation, etc. In addition, it should be appreciated that the lateral indexing system can be operated such that two of the openings are each partially aligned with the seed meter to allow a combination of the seed hybrids to be planted.

The seed meter system 590 shown in FIG. 80 works as follows. When a particular seed hybrid variety is to be planted, for instance based upon the location of the planter and the known field conditions at said location, an opening of the indexing system is aligned with the seed meter. For example, as shown in FIG. 80, the opening 597 corresponding with the hybrid C is aligned with the seed meter 591. Thus, the seed source containing the hybrid C will provide seed through the seed opening 597 into the seed meter 591, wherein the seed meter 591 passes the seed through a seed tube 599 into the field for planting. However, when the positioning system or other control system indicates that a different seed hybrid variety is to be planted at an updated location, the seed system 590 can automatically index the system 593 to align one of the other openings 596 with the seed meter 591. For example, if the hybrid A is to be planted next, the indexing system will laterally move the openings in the direction to the right as viewed in FIG. 80 to align the opening 595 with the seed meter 591. The seed source (bulk fill hopper, row hopper, etc.) containing hybrid A will then provide seed through the opening 595 to the seed meter 591 for dispensing out the seed tube 599. It should be appreciated that the number of hybrids to be used with the system 590 of FIG. 80 may be more or less than three, as is shown. For example, the present invention contemplates that generally any number of seed hybrids can be used. Therefore, the number of openings will correspond with the number of hybrids to be passed to the seed meter 591.

The seed system 590 of FIG. 81 operates in a manner similar to that shown and described in relation to the seed meter system of FIG. 80. For example, the seed meter 591 is rotated relative to a seed pool, wherein the seed hybrid variety of the seed pool is selected based upon an opening of a seed supply system 592. The seed supply system 592 shown in FIG. 81 is generally a circular system that can be rotated relative to the seed meter 591. The rotating index system 594 includes two or more openings, with four different openings 595, 596, 597, 598 shown in FIG. 81. The openings correspond with seed sources containing four seed hybrid varieties. In FIG. 81, it is shown that the openings correspond with hybrid A, hybrid B, hybrid C, and hybrid D. Therefore, when one of the openings is aligned with the seed pool opening of the seed disk 591, the seed hybrid variety corresponding to the opening will provide seed to the seed meter 591 for passing the seed hybrid variety through the seed tube 599 and planting in the field. To change the hybrid being planted, the rotating indexing system 594 can be rotated such as in the arrow 600 in FIG. 81. The rotation of the indexing system 594 will change the type of seed being planted at the particular location. In addition, it should be appreciated that the rotating index 592 can be rotated such that two of the openings are partially aligned with the seed meter such that a combination of the hybrids can be delivered to the seed meter for planting.

For example, in FIG. 81 it is shown that the opening 596 corresponding with seed hybrid B is aligned with the seed meter 591. As the planter moves through the field, the seed hybrid B will be planted. When a positioning or other control system (manual or automatic) updates to indicate that a different seed hybrid is to be planted, the positioning or control system communicates to the rotating index system 594 of the seed supply system 592 to rotate the indexing system 594 to align a different opening with the seed meter 591. For example, when the hybrid A is to be planted, the indexing system 594 may rotate a quarter turn to align the opening 595 with the seed meter 591. The seed source containing hybrid A will then provide seed to the seed meter 591 for passing through the seed meter 599 into the field for planting. Thus, the system 590 shown in FIG. 81 can provide an up-to-date and on-the-go method and means for changing the seed hybrid variety being planted, while also being manually controllable by a user. Due to the constant updating and on-the-go changing of the seed hybrid, the system 590 shown in FIG. 81 is a system and method capable of changing seed within feet or seconds of one another in the field as the planter travels through the field. It is contemplated that the changing of product being planted can occur near instantaneously as a planter moves through a field. The positioning system associated with the seed meter system 590 both can be preprogrammed with the location for the varying seed hybrid varieties such that the system can operate independently of an operator and can operate on-the-go of the planting system.

In either system shown in FIG. 80 or 81, the multiple hose/door/aperture/access port can be associated with a seed delivery system or other seed source. For example, the seed delivery system can be row hopper, bulk hopper, air seed delivery, or the like. In addition, the present invention contemplates that a combination of the seed delivery system can be used with the indexing systems shown in FIGS. 80 and 81. The openings or ports of either the lateral or rotating index system is selectably aligned with the seed meter reservoir opening to provide a selected seed hybrid variety for planting at a particular location. The opening or port is then changed to provide a different or updated seed hybrid variety while the planter continues moving through the field.

Figure 82:
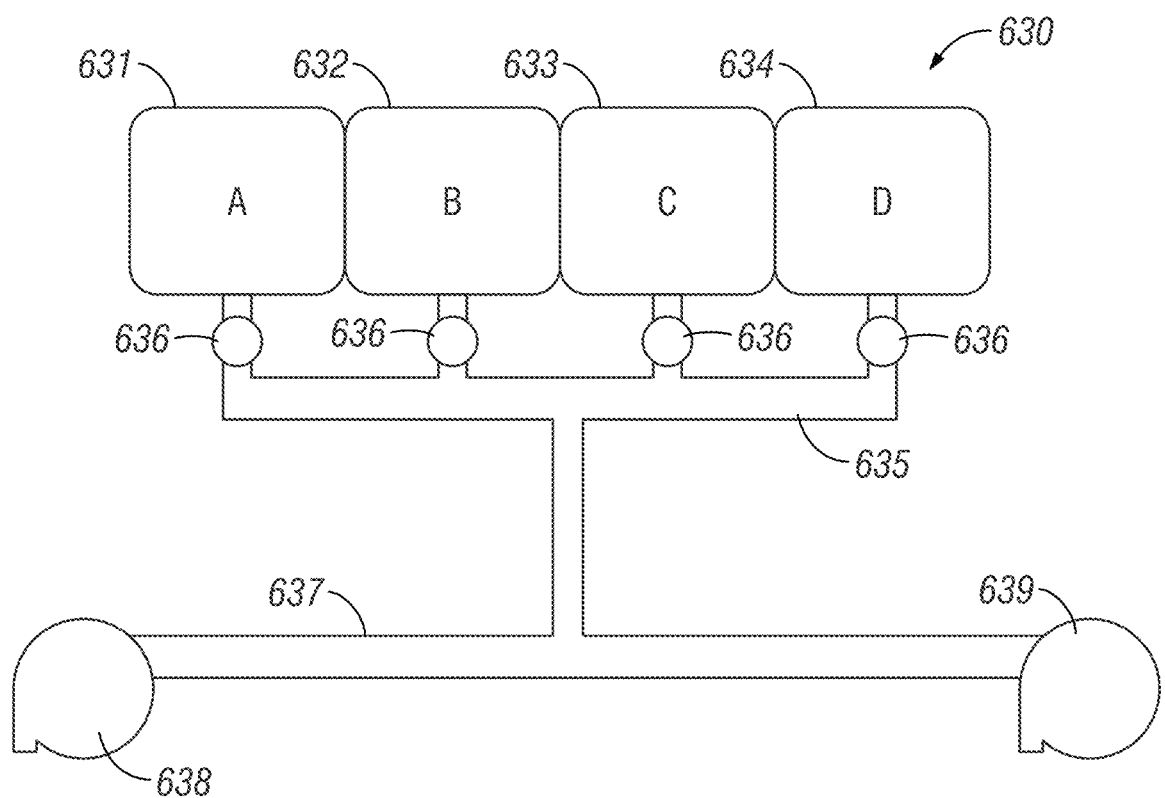
FIG. 82 is a diagram of still another exemplary embodiment of a seed delivery and/or planting system according to the present invention.

FIG. 82 is another aspect of the present invention and includes the use of a seed delivery and/or planting system 630. The seed delivery system 630 provides for an alternative approach wherein the type of seed hybrid variety to be planted at a particular location in the field is selected or controlled at the hoppers, as opposed to the seed meters. The seed delivery system 630 includes a plurality of hoppers, which may be bulk fill hoppers, row hoppers, etc. As shown in FIG. 82, the system includes a first hopper 631 containing a hybrid A, the second hopper 632 containing a hybrid B, a third hopper 633 containing a hybrid C, and a fourth hopper 634 containing a hybrid D. It should be appreciated that the number of hoppers and corresponding hybrids may be more or less than that shown in FIG. 82. The numbers shown in FIG. 82 is for exemplary purposes only. The hoppers are mounted on a central toolbar, row unit tool bar, or another bar, as desired. Adjacent each of the hoppers is a metering valve 636. The valve 636 selectively opens and closes access from a delivery hose 637 to the seed varieties in the hoppers. For example, only one valve may be opened at a time to deliver a seed hybrid variety from a particular hopper to the first and/or second seed meter 638, 639. However, it should also be appreciated that multiple valves may be opened, partially or otherwise, to supply a combination of seed varieties to a seed meter.

The invention shown in FIG. 82 can be used as follows. Each of the hoppers contains a seed hybrid variety. A positioning or control system (not shown) can be operatively connected to the system 630. When a positioning system is used, the positioning system contains a preprogrammed mapping of the field to indicate historical field conditions or known field conditions. A selected hybrid variety is determined to be used at a location of the field based upon the known field conditions. Therefore, the positioning system communicates to one or more of the valves 636 associated with a particular hopper to allow seed to pass from one or more of the hoppers via the delivery hose 637 and to one and/or the other of the seed meters 638, 639 for planting of the particular seed hybrid variety or combination. The seed meters may be positioned on a common row unit, or may be positioned at individual row units. In addition, the seed meters may include one or more of the other embodiments included in the present invention. When the positioning system determines that a separate or different seed hybrid variety is to be used, the positioning system communicates to the open valve to close, and to one of the closed valves to open. The newly opened valve allows for a different seed hybrid variety to be passed via the delivery hose 637 into one and/or both of the seed meters. The seed delivery hose 637 may be an air seed delivery hose for delivering seed from one or more of the hoppers to the one or more of the seed meters. In addition, other methods and means may be used to move the seed hybrid variety from the hopper to the one or more seed meters. The hoppers can be actuated to selectively allow an amount of seed into the hose to be directed to the meter.

In addition, it is contemplated that the system 630 shown in FIG. 82 may be used to combine selected seed hybrid varieties. For example, different seed types may be mixed according to percentages (e.g., 10% A and 90% B) at the bulk seed tanks and then fed to the meters. The percentages of the seed varieties to be planted can be changed according to need by opening and closing the meter valves more or less. Thus, the meter valves may be baffles that can be fully opened or closed or partially opened or closed to allow for differing amounts of the seed hybrid in the hoppers to be passed through the hose and into the meter. Further examples of controlling the seed passing via the system 630 is shown and described in FIGS. 24A and 24B. In addition, the invention contemplates the use of an auger to dispense different seed at different rates into the bulk delivery systems.

As has been mentioned, the system shown and described allows an operator to plant one of a plurality of varieties of seed types or hybrids. In addition, the systems allow for the interchanging of seed and seed refuge (e.g., planting of certain percentage of non-insect resistant crop dispersed throughout the resisting crop), pollen donation, or other agricultural product. Additionally, multiple hybrids may be planted in the same general area to take advantage of cross pollination between different plant types, further increasing the yield potential. The invention contemplates generally any scenario wherein it is desired or needed to change the planting from one seed variety to another.

It is to be appreciated that the embodiments of the invention provide numerous advantages. The invention includes numerous methods, means, and systems for providing on-the-go selection and planting of one of a plurality of different seeds. This will allow an operator to increase and maximize their yield per acre based upon historical data and other field characteristics or conditions. As seed hybrid varieties are ever changing to account for different conditions, including soil and climate, it is useful that an operator be able to utilize varying hybrids without having to stop planting one variety and changing the seed manually. The on-the-go manner of the invention allows for efficient planting of multiple and different seed varieties, types and/or hybrids.

Figure 83:
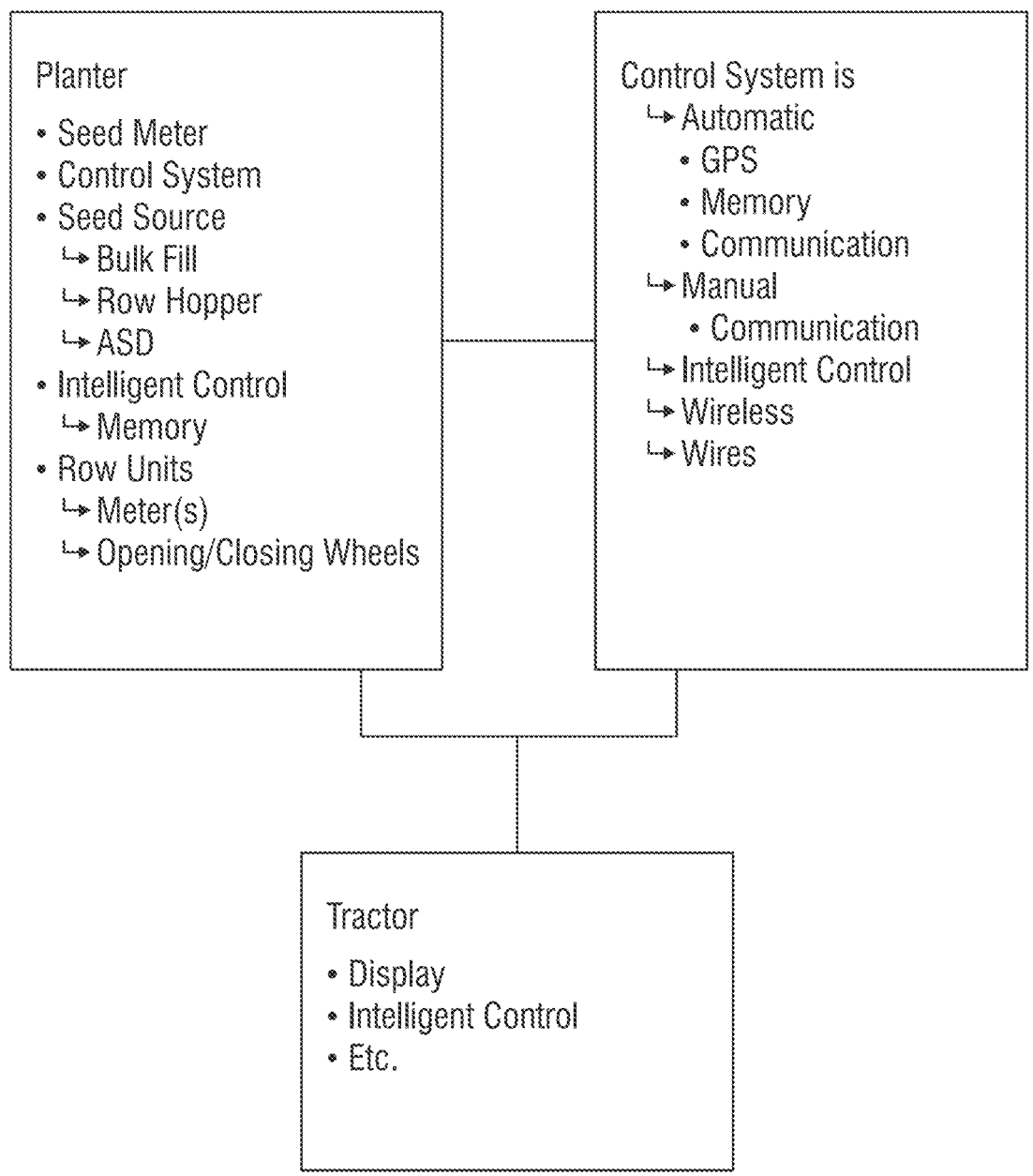
FIG. 83 is a block diagram showing additional aspects of seed delivery systems according to the present invention.

Furthermore, a control system may be provided with any of the aspects of the invention, such as the control system shown in the diagram of FIG. 83. FIG. 83 is a block diagram of a system for the various means and methods of selectively planting one of a plurality of seed hybrid varieties based upon a location of a planter in a field. The control system may include an automatic (GPS) positioning system, or a manual control system. The positioning system may include memory, an intelligent control, and a communication means. For example, the communication means may be wireless communication or wire communication electrically connecting the components of the system. The memory is included to provide data to the system, which includes field conditions and/or characteristics. These include historical data based upon testing of the field at various locations and can include, but is not limited to, moisture content, sunlight, amount of rain, water retention, wind conditions, soil compaction, and the like. Other data may also be included to be input into the positioning system memory. From that information, a user is able to determine the preferred seed hybrid variety to be planted at the various locations of a field based upon the data input. Thus, a hybrid that is better to be planted in dry conditions can be planted at a location that has lower moisture content or may receive less rain than other locations in the field. Other seed hybrid varieties can also be used based upon the field conditions and/or characteristics that are input into the system. In addition, a farmer is able to create sections of a single variety of seed, or they can control the ratio of the seed type throughout the section or area.

Data, such as the data as to which seed type is being planted, along with other information including, but not limited to, remaining seed, field map, upcoming switch, etc., can be viewed in the tractor and/or at a remote location on a display. This logged data can then be reviewed after the planting and/or harvesting seasons in order to help determine the type of seed to be used the next year, in order to maximize the yield obtained from the seed. For example, a farmer may be able to work with a seed provided in order to determine the soil conditions and an optimized seed type to use with such condition. After the season, the yield from the particular harvest can be reviewed in order to determine if the best seed type was selected, and to update if needed, with the goal of maximizing the yield obtained. Furthermore, a higher return on investment can be achieved utilizing the invention herein disclosed. In addition to high yield, an operator may also lower planting rates and use a less expensive seed in less productive areas, which would lower input costs, while still maintaining yield, which would increase the return on the investment for the operator, which may be the farmer.

As has been mentioned, the systems shown and described allow a farmer to change the seed variety being planted throughout the sections of a field. In addition, the systems allow for the interchanging of seed and seed refuge (e.g., planting a certain percentage of non-insect resistant crop dispersed throughout the resistant crop), pollen donation (e.g., planting a certain percentage of a plant line with desirable pollen intermixed with the remaining plant line that will receive the pollen), or other agricultural product. Additionally, multiple hybrids may be planted in the same general area to take advantage of cross pollination between different plant types, further increasing the yield potential. The invention contemplates generally any scenario wherein it is desired or needed to changing the planting from one seed variety to another seed variety or other agricultural product.

The manual control can function in much the same way, but is determinative upon a farmer's commands to control which of the plurality of seed types are to be planted. Either control will communicate to the planter as to what seed delivery or planting system to activate in order to provide the proper seed hybrid type.

The control system is operatively connected to a planter. The planter may include seed sources such as bulk fill hoppers including seed delivery systems, row hoppers, air seed delivery systems, seed meters, row units, control systems, and other intelligent controls. The control system indicates to the planter what type of seed hybrid variety to plant based upon the location of the planter in the field or the instructions of a user. The communication may be wired or wireless. Once the positioning system indicates that a different type of seed hybrid variety is to be planted, the intelligent control of the planter can control the seed delivery systems, seed sources, seed meters, and/or row units to change the seed type to be planted. The system provides for varying planting of different seed hybrid varieties almost instantaneously. For example, it is contemplated that various seed hybrid varieties can be planted within feet or even seconds of one another as a planter moves on-the-go through the field.

In addition, the planter and positioning systems are operatively connected to the tractor such that a display in the tractor may provide to the user the location of the tractor and planter in the field, as well as the type of seed hybrid being planted based upon that location. The display may also have additional controls to allow the farmer to manually select one of the types of seed variety to be planted. It is contemplated that the display may include a map to show the location of the tractor and planter, along with what seed types will be planted in the locations adjacent and about the field. Therefore, the user may be aware beforehand when the planter will be switching from one seed variety to another. In addition, the display may indicate any quantitative value such as the amount of the different seed hybrid varieties being planted in the field so that the user knows when one or more of the seed hybrid quantities are getting low, such as to be replaced. Other data and information is contemplated to be displayed in the tractor as well.

It is to be appreciated that the embodiments of the present invention provide numerous advantages over the art. For example, the invention includes numerous methods, means, and systems for providing on-the-go selection in planting of one of a plurality of different seed hybrid varieties, or a combination thereof. The present invention will allow a farmer to increase and maximize his or her yield per acre based upon historical data of field characteristics or conditions. As seed hybrid varieties are ever changing to account for extreme conditions, it is useful that a farmer be able to utilize the varying seed hybrids without having to stop planting one variety and changing the seed type manually. The on-the-go manner of the present invention allows an efficient planting of multiple and different seed varieties.

Therefore, the system, method, and means of planting one of a plurality of seed variety types based upon the location of a planter in a field have been disclosed. The invention contemplates numerous variations, options, and alternatives, and it is not to be limited to the specific embodiments described herein. Those skilled in the art will appreciate that, while the invention has been heretofore disclosed, various other changes may also be included within the scope of the invention.

What is claimed is:

1. An agricultural planter for planting a variety of seed in a field and capable of switching the variety of seed being planted as the agricultural planter travels through the field, the agricultural planter comprising:
   a plurality of row units;
   at least one product storage unit storing at least one of several varieties of seed to be planted;
   a seed meter at each row unit and operatively connected to the at least one of several varieties of seed stored in the at least one product storage unit;
   a seed to ground delivery system for delivering the selected variety of seed to the ground, said seed to ground delivery system comprising at least one belt, and wherein the speed of the belt is configured based upon the ground speed of the agricultural planter; and
   a seed supply system operatively connected to the at least one product storage unit and the seed meter, wherein the seed supply system selectively allows the at least one of the several varieties of seed into a seed pool of the seed meter, wherein the selected variety of seed is determined, at least in part, by the location or other planting based characteristic of the agricultural planter in the field.

2. The agricultural planter of claim 1, wherein the at least one product storage unit comprises:
   a. a bulk fill hopper;
   b. an individual row hopper; or
   c. a combination of a bulk fill hopper and an individual row hopper.

3. The agricultural planter of claim 2, wherein the individual row hopper comprises multiple compartments for holding the different varieties of seed.

4. The agricultural planter of claim 1, wherein the seed supply system comprises several openings, wherein each opening allows a different variety of seed to enter the seed pool of the seed meter.

5. The agricultural planter of claim 4, wherein the openings comprise:
   a. hoses;
   b. doors;
   c. apertures; or
   d. access ports.

6. The agricultural planter of claim 4, wherein the seed supply system comprises an indexing system to selectively align or place in fluid communication with one of the several openings with the seed pool of the seed meter.

7. The agricultural planter of claim 6, wherein the indexing system comprises moving the several openings to selectively align at least one of the openings, and wherein the movement is in a lateral direction, vertical direction, angular direction, rotational direction, or some combination thereof.

8. The agricultural planter of claim 1, further comprising an intelligent control operatively connected the plurality of row units which comprises a location device to determine the selected variety of seed by the location of the agricultural planter in the field.

9. A method for planting an agricultural product in a field comprising:
   storing with at least one product storage unit of an agricultural planter having a plurality of row units several agricultural products to be planted;
   allowing a selected agricultural product into a seed pool of a seed meter at a row unit of the agricultural planter, wherein the selected agricultural product is determined, at least in part, by the location or other planting based characteristic of the agricultural planter in the field; and
   delivering, via a belt of a seed to ground delivery system, the selected agricultural product from the seed meter to the field as the agricultural planter travels through the field.

10. The method of claim 9 further comprising switching the selected agricultural product being delivered to the field to another agricultural product.

11. The method of claim 9 further comprising selectively aligning an opening of an indexing system having multiple openings with the seed pool of the seed meter.

12. The method of claim 11 wherein the selectively aligning step comprises moving the opening in a lateral direction, vertical direction, angular direction, rotational direction, or some combination thereof.

13. The method of claim 9 further comprising continuously updating the location of the agricultural implement in the field.

14. The method of claim 9 wherein the selected agricultural product includes different seed types mixed according to percentages at a bulk seed hopper.

15. The seed meter of claim 14 wherein the seed meter comprises an indexing system in communication with the several openings to selectively align one of the openings with the seed pool of the seed meter housing.

16. A seed metering system for use with an agricultural implement, the seed metering system comprising:
   a seed meter housing defining a seed pool;
   a seed meter hopper operatively connected to the seed meter housing for storing multiple varieties of seed and comprising several openings adapted to open and close such that the seed pool of the seed meter housing selectively receives a selected variety of seed stored in the seed meter hopper via one of the openings; and
   a seed to ground delivery system for delivering the selected variety of seed to the ground, said seed to ground delivery system comprising at least one belt, and wherein the speed of the belt is configured based upon the ground speed of the agricultural planter;
   wherein the selected variety of seed is determined, at least in part, by the location or other planting based characteristic of the agricultural implement;

wherein the seed metering system is capable of planting the selected variety of seed.

17. The seed metering system of claim 16 wherein the selected variety of seed is delivered to the seed pool with a seed supply system.

18. The seed metering system of claim 17 wherein the seed supply system comprises an indexing system that selectively aligns one of the several openings with the seed pool of the seed meter.

* * * * *